(12) United States Patent
Johannesson et al.

(10) Patent No.: US 12,091,163 B2
(45) Date of Patent: Sep. 17, 2024

(54) LOCOMOTION SYSTEMS AND METHODS FOR AERIAL VEHICLES

(71) Applicant: FLIR Unmanned Aerial Systems ULC, Vancouver (CA)

(72) Inventors: Glen Johannesson, Waterloo (CA); Albert Pegg, New Dundee (CA); Dmytro Silin, Waterloo (CA)

(73) Assignee: FLIR Unmanned Aerial Systems ULC, Vancouver (CA)

( * ) Notice: Subject to any disclaimer, the term of this patent is extended or adjusted under 35 U.S.C. 154(b) by 41 days.

(21) Appl. No.: 18/073,474

(22) Filed: Dec. 1, 2022

(65) Prior Publication Data
US 2023/0097186 A1   Mar. 30, 2023

Related U.S. Application Data

(63) Continuation of application No. PCT/US2021/035316, filed on Jun. 1, 2021.
(Continued)

(51) Int. Cl.
*B64C 25/52* (2006.01)
*B64C 39/02* (2023.01)
(Continued)

(52) U.S. Cl.
CPC ............ *B64C 25/52* (2013.01); *B64C 39/024* (2013.01); *B64U 10/70* (2023.01); *B64U 20/87* (2023.01);
(Continued)

(58) Field of Classification Search
CPC ..... B64C 25/52; B64C 39/024; B64U 30/299; B64U 10/70; B64U 60/50; B64U 20/87; B64U 2101/30; G05D 1/0808
See application file for complete search history.

(56) References Cited

U.S. PATENT DOCUMENTS 3,261,420 A   7/1966 Schmidt
3,263,764 A   8/1966 Beriin
(Continued)

FOREIGN PATENT DOCUMENTS

CA    2391252 A1 * 12/2003 ............... B64B 1/02
CN   203623963 U    6/2014
(Continued)

OTHER PUBLICATIONS

Persch, "Flying car guru gets more down to Earth", Sep. 13, 2007, NBC News, Moller International, United States of America.
(Continued)

*Primary Examiner* — Benjamin P Lee
(74) *Attorney, Agent, or Firm* — Haynes and Boone, LLP

(57) ABSTRACT

Provided herein are systems and methods for an unmanned aerial vehicle (UAV) to skid and roll along an environmental surface. A rollable UAV includes an airframe assembly, a propulsion system, and a logic device configured to communicate with the propulsion system. The airframe assembly includes a cylindrical rolling guard configured to allow the UAV to roll along an environmental surface in contact with the cylindrical rolling guard. The logic device is configured to determine a rolling orientation for the UAV corresponding to the environmental surface, maneuver the UAV to place the cylindrical rolling guard of the airframe assembly in contact with the environmental surface, and roll the airframe assembly of the UAV along the environmental surface at approximately the determined rolling orientation while the cylindrical rolling guard is in contact with the environmental surface.

20 Claims, 24 Drawing Sheets

Related U.S. Application Data

(60) Provisional application No. 63/065,427, filed on Aug. 13, 2020, provisional application No. 63/033,592, filed on Jun. 2, 2020.

(51) Int. Cl.
  | | |
  |---|---|
  | *B64U 10/70* | (2023.01) |
  | *B64U 20/87* | (2023.01) |
  | *B64U 30/299* | (2023.01) |
  | *B64U 60/50* | (2023.01) |
  | *G05D 1/00* | (2006.01) |
  | *B64U 101/20* | (2023.01) |
  | *B64U 101/30* | (2023.01) |

(52) U.S. Cl.
  CPC .......... *B64U 30/299* (2023.01); *B64U 60/50* (2023.01); *G05D 1/0808* (2013.01); *B64U 2101/20* (2023.01); *B64U 2101/30* (2023.01)

(56) References Cited

U.S. PATENT DOCUMENTS

| | | | |
|---|---|---|---|
| 8,596,570 B1 | 12/2013 | Carambat | |
| 8,794,566 B2* | 8/2014 | Hutson | B64U 20/87 |
| | | | 244/50 |
| 8,820,672 B2* | 9/2014 | Erben | G01N 1/2273 |
| | | | 244/23 C |
| 8,991,740 B2* | 3/2015 | Olm | B64U 10/70 |
| | | | 244/50 |
| 9,145,207 B2* | 9/2015 | Moschetta | B64C 39/028 |
| 9,364,766 B2* | 6/2016 | Mielniczek | A63H 33/003 |
| 9,688,400 B2* | 6/2017 | Hutson | B64U 50/19 |
| 9,789,415 B2* | 10/2017 | Mielniczek | A63H 33/003 |
| 10,112,700 B1* | 10/2018 | Birch | B64C 29/02 |
| 10,370,119 B2* | 8/2019 | Neely | H04N 5/00 |
| 10,384,772 B2* | 8/2019 | Yamada | B64C 27/08 |
| 10,462,366 B1 | 10/2019 | Bart et al. | |
| D867,207 S * | 11/2019 | O'Brien | D12/16.1 |
| 10,696,372 B2* | 6/2020 | Aldana López | B64U 10/70 |
| 10,812,777 B1* | 10/2020 | Becker | G06T 7/593 |
| 10,988,241 B2* | 4/2021 | Santangelo | B64U 10/14 |
| 11,117,658 B2* | 9/2021 | Neff | B64C 29/0033 |
| 11,338,634 B1* | 5/2022 | Lacaze | B64U 10/14 |
| 11,427,311 B1* | 8/2022 | Ensslin | B64C 25/14 |
| 11,673,663 B2* | 6/2023 | Benedict | B64C 39/024 |
| | | | 244/17.23 |
| 11,794,882 B1* | 10/2023 | Rayner | B64C 25/52 |
| 2013/0292512 A1* | 11/2013 | Erben | B64C 39/024 |
| | | | 244/1 R |
| 2014/0034775 A1* | 2/2014 | Hutson | F16M 13/02 |
| | | | 244/17.23 |
| 2014/0131507 A1* | 5/2014 | Kalantari | B64C 39/028 |
| | | | 244/2 |
| 2016/0137293 A1* | 5/2016 | Santangelo | B64U 60/60 |
| | | | 244/50 |
| 2016/0176514 A1* | 6/2016 | Lavagen | B64C 37/00 |
| | | | 244/50 |
| 2018/0244383 A1* | 8/2018 | Valente | B64C 11/46 |
| 2019/0233077 A1* | 8/2019 | Tian | B64C 27/26 |
| 2019/0248480 A1* | 8/2019 | Whitten, Jr. | B64U 10/14 |
| 2019/0315460 A1* | 10/2019 | Park | B64U 10/13 |
| 2019/0329884 A1* | 10/2019 | Hada | B64C 39/024 |
| 2020/0354059 A1* | 11/2020 | Newman | F41H 9/04 |
| 2021/0061461 A1* | 3/2021 | Williams | B64U 50/30 |
| 2021/0114730 A1* | 4/2021 | Macdonald | B64C 39/024 |
| 2021/0380228 A1* | 12/2021 | Parrott | G01N 33/0004 |
| 2022/0041277 A1* | 2/2022 | Tian | B64C 29/0033 |
| 2022/0055740 A1* | 2/2022 | Foster | B64C 25/26 |
| 2023/0037429 A1* | 2/2023 | Sherman | H04B 5/79 |
| 2023/0133184 A1* | 5/2023 | Liu | B64C 39/024 |
| | | | 244/17.17 |
| 2023/0331376 A1* | 10/2023 | Ensslin | B64C 25/50 |
| 2023/0399096 A1* | 12/2023 | Hachen | B64C 25/16 |

FOREIGN PATENT DOCUMENTS

| | | |
|---|---|---|
| CN | 203793641 U | 8/2014 |
| EP | 2965989 A1 | 1/2016 |
| EP | 3141479 B1 | 3/2017 |
| FR | 2966429 A1 | 4/2012 |
| WO | WO 2017/093839 A1 | 6/2017 |

OTHER PUBLICATIONS

Crowe, "Get Rid of the Wheels—Aerofex Hovercraft Indicates Potential", Aug. 23, 2012, *The Kneeslider*, United States of America.

* cited by examiner

LOCOMOTION SYSTEMS AND METHODS FOR AERIAL VEHICLES

CROSS-REFERENCE TO RELATED APPLICATIONS

This application is a continuation of International Patent Application No. PCT/US2021/035316 filed Jun. 1, 2021 and entitled "LOCOMOTION SYSTEMS AND METHODS FOR AERIAL VEHICLES," which claims priority to and the benefit of U.S. Provisional Patent Application No. 63/065,427 filed Aug. 13, 2020 and entitled "LOCOMOTION SYSTEMS AND METHODS FOR AERIAL VEHICLES" and U.S. Provisional Patent Application No. 63/033,592 filed Jun. 2, 2020 and entitled "AERIAL VEHICLE ARCHITECTURES FOR SKIDDING AND WATER NAVIGATION," all of which are incorporated herein by reference in their entirety.

TECHNICAL FIELD

The present invention relates generally to unmanned aerial vehicles and, more particularly, to systems and methods for contact-based locomotion of unmanned aerial vehicles.

BACKGROUND

Modern unmanned sensor platforms, such as unmanned aerial vehicles (UAVs), remotely operated underwater vehicles (ROVs), unmanned (water) surface vehicles (USVs), and unmanned ground vehicles (UGVs) are able to operate over long distances and in all environments; rural, urban, undeveloped, and even underwater. In particular, UAVs are used to support a wide range of real-world applications including surveillance, reconnaissance, exploration, item transportation, disaster relief, aerial photography, large-scale agriculture monitoring, and others. For example, a UAV may be equipped with a variety of different elements, such as different types of sensors and navigation devices, and may be configured to address a broad variety of operational needs. Such devices may add overall weight to the UAV, require protection, or require proper cooling to operate, and so there is a need in the art for improved UAV architectures that provide improved thrust efficiency, reduced overall mass, improved payload protection, improved internal hardware and/or payload cooling, and/or otherwise facilitate operation of the UAV and/or any coupled or integrated payloads. Furthermore, elements of a UAV generally require electrical power provided by a portable power supply, such as a battery, to operate. As the capacity of such batteries are limited, there exists a need in the art for improved UAV architectures and related methods of operation that provide improved overall energy efficiency.

SUMMARY

UAV architectures, systems, and related techniques are provided to improve the operation of unmanned mobile sensor and/or survey platforms, such as UAVs. One or more embodiments of the described UAV architecture systems may advantageously include an airframe assembly. The airframe assembly may include a top airframe assembly that includes a top airframe core at least partially enclosed within a relatively rigid top airframe shell. The top airframe shell and the top airframe core may be a foam-polycarbonate composite UAV component where the top airframe shell is a vacuum formed polycarbonate shell overmolded with expanded polystyrene foam that forms the top airframe core. The airframe assembly may also include a bottom airframe assembly that includes a bottom airframe core at least partially enclosed within a relatively rigid bottom airframe shell. The bottom airframe shell and the bottom airframe core may be a foam-polycarbonate composite UAV component where the bottom airframe shell is a vacuum formed polycarbonate shell overmolded with expanded polystyrene foam that forms the bottom airframe core.

In various embodiments, the airframe assembly may include a substantially polygonal support frame disposed between the top and bottom airframe cores and configured to physically couple the top airframe core to the bottom airframe core, and consequently the top airframe assembly to the bottom airframe assembly. The support frame may have at least two UAV propulsion motor mounts each configured to provide a mechanical linkage between the airframe assembly and a corresponding UAV propulsion motor. The top and bottom airframe assemblies may be assembled to form at least two rotor ducts disposed about the at least two UAV propulsion motor mounts. The rotor ducts may be configured to protect rotating rotors disposed therein from physical damage caused by impact with environmental flight hazards and each may comprise an inlet and diffusor outlet shaped to increase thrust efficiency of a propulsion system for the UAV. For example, an overall thrust gain of greater than one may be provided by a density of the top and bottom airframe assemblies and a shape of the rotor ducts when normalized to a combined weight of the top and bottom airframe assemblies. In other words, the weight added to the UAV by including the rotor ducts may be negated or compensated for by an overall thrust gain provided by the rotor ducts.

One or more airflow channels may be defined by the top airframe core and the top airframe shell such that the airflow channel forms an air conduit between a plurality of cooling air inlet orifices and a negative pressure generated by a rotor rotating in a rotor duct corresponding to the airflow channel. As the rotor rotates within the rotor duct and causes the negative pressure to form above a horizontal rotor plane, ambient air may be drawn from the plurality of cooling air inlet orifices to a metal heat sink assembly disposed within the air channel, into a corresponding rotor duct, and out through a diffusor outlet of the rotor duct. As such, power electronics and other internal hardware thermally coupled to the metal heat sink assembly may be cooled to a suitable operating temperature to achieve a desired performance.

Further techniques are provided to improve overall power/flight efficiency of a UAV. For example, a UAV may include a skid assembly that is physically coupled to an airframe assembly of the UAV. A controller of the UAV may be configured to selectively skid the UAV along a solid or liquid environmental surface by controlling a propulsion system of the UAV to provide and/or adjust contact between the skid assembly and the environmental surface. Thus, the UAV may be able to fly and/or skid as needed to maneuver about an environment. In one example method, a UAV with a skid assembly may be configured to surveil or monitor a designated environment or survey area, where a controller of the UAV may be configured to navigate the UAV along an environmental surface to a surveillance location in the environment. The UAV may detect a disturbance in the environment using one or more sensor devices of the UAV coupled to the controller. In response to detecting the disturbance, the controller of the UAV may communicate a notification of the detected disturbance to a base station.

In one embodiment, a UAV includes an airframe assembly configured to support and/or protect a propulsion system for the UAV and a skid assembly comprising a skid member coupled to and extending from a bottom surface of the airframe assembly. The skid member may be configured to contact and/or slide along a solid and/or liquid surface while the propulsion system is energized and the UAV is in motion, and the skid assembly may be configured to allow the airframe assembly to skid along the solid and/or liquid surface at a specified approximate UAV skid height set, at least in part, by a height of the skid member.

In another embodiment, a method of operating such UAV may include controlling a propulsion system of the UAV to navigate the UAV within a designated monitoring area comprising a solid and/or liquid surface, where the UAV includes an airframe assembly configured to support and/or protect the propulsion system and a skid assembly including a skid member coupled to and extending from a bottom surface of the airframe assembly, and where the skid member is configured to contact and/or slide along a solid and/or liquid surface while the propulsion system is energized and the UAV is in motion. The method may additionally include selectively skidding the airframe assembly along the solid and/or liquid surface at a specified approximate UAV skid height set, at least in part, by a height of the skid member, by controlling physical contact between the skid member and the solid and/or liquid surface.

Further embodiments provide techniques to improve overall power efficiency and operational flexibility of a UAV by allowing the UAV to navigate an environment via rolling along a surface in addition to flight. In one embodiment, a UAV may include an airframe assembly configured to support and/or protect a propulsion system for the UAV and a logic device configured to communicate with the propulsion system for the UAV. The airframe assembly may include a cylindrical rolling guard fixed relative to a rotor plane of the UAV and configured to allow the UAV to roll along an environmental surface in contact with the cylindrical rolling guard. The logic device may be configured to determine a rolling orientation for the UAV corresponding to at least a portion of the environmental surface; maneuver the UAV to place the cylindrical rolling guard of the airframe assembly in contact with the at least portion of the environmental surface; and roll the airframe assembly of the UAV along the environmental surface at approximately the determined rolling orientation while the cylindrical rolling guard is in contact with the environmental surface.

In another embodiment, a method may include determining a rolling orientation for a UAV corresponding to at least a portion of an environmental surface in view of the UAV, where the UAV comprises an airframe assembly configured to support and/or protect a propulsion system for the UAV, and where the airframe assembly comprises a cylindrical rolling guard fixed relative to a rotor plane of the UAV and configured to allow the UAV to roll along the environmental surface while the cylindrical rolling guard is in contact with the environmental surface. The method may also include maneuvering the UAV to place the cylindrical rolling guard of the airframe assembly in contact with the at least portion of the environmental surface; and rolling the airframe assembly of the UAV along the environmental surface at approximately the determined rolling orientation while the cylindrical rolling guard is in contact with the environmental surface.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

Figure 1:
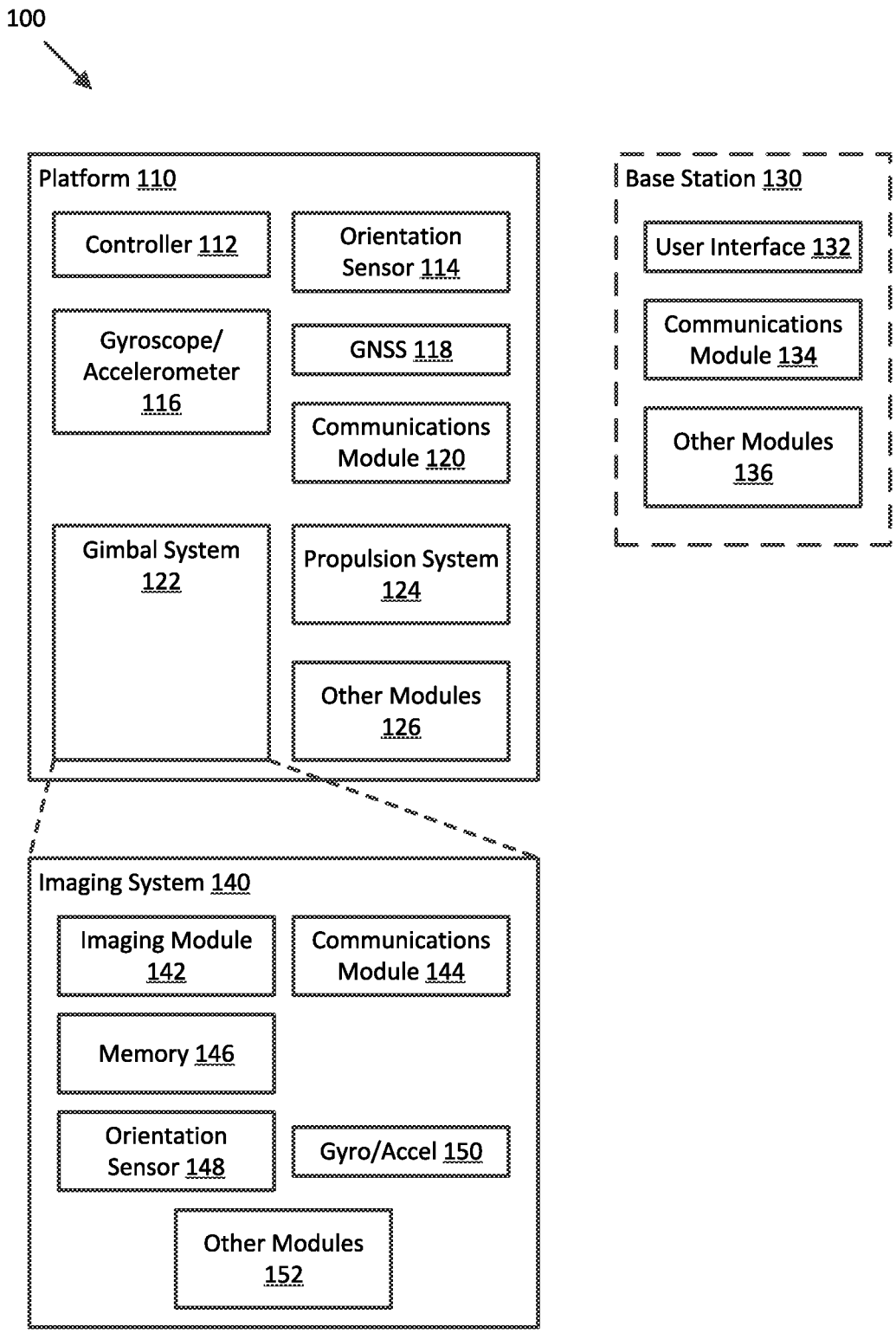
FIG. 1 illustrates a block diagram of a survey system in accordance with an embodiment of the disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

Modern unmanned sensor platforms, such as unmanned aerial vehicles (UAVs), are able to operate over long distances and in a variety of environments. Embodiments described herein provide systems and methods related to a UAV architecture that lends itself to aircraft safety and durability in traversing constrained areas of such environments while also providing improved propulsion efficiency for the UAV. In particular embodiments, such UAV architecture provides for upside-down landing and take-off for the UAV, for example, and may provide sufficient buoyancy to allow for the UAV to float in water and take-off from a floating state. In some embodiments, the UAV may be sufficiently buoyant such that rotors disposed within rotor ducts of the UAV may be positioned to be substantially above a water surface. In other embodiments, the UAV architecture may be sufficiently buoyant to allow for the UAV to float though the rotors may be partially or completely submerged, for example, and the UAV may be configured to operate the rotors under water and provide sufficient thrust to escape from the water surface and lift the UAV into the air.

According to various embodiments described herein, an airframe assembly for a UAV may include a top airframe assembly that itself includes a top airframe core at least partially enclosed within a relatively rigid top airframe shell. The top airframe shell and the top airframe core may be implemented as a foam-polycarbonate composite UAV component where the top airframe shell is a vacuum formed polycarbonate shell overmolded with expanded polystyrene foam that forms the top airframe core. The airframe assembly may further include a bottom airframe assembly that itself includes a bottom airframe core at least partially enclosed within a relatively rigid bottom airframe shell. The bottom airframe shell and the bottom airframe core may be implemented as a foam-polycarbonate composite UAV component where the bottom airframe shell is a vacuum formed polycarbonate shell overmolded with expanded polystyrene foam that forms the bottom airframe core.

In various embodiments, the airframe assembly may further include a substantially polygonal support frame disposed between the top and bottom airframe cores and configured to physically couple the top airframe core to the bottom airframe core. The support frame may have at least two UAV propulsion motor mounts each configured to provide a mechanical linkage between the airframe assembly and a corresponding UAV propulsion motor. In some embodiments, the top and bottom airframe assemblies may be assembled to form at least two rotor ducts disposed about the at least two UAV propulsion motor mounts of the support frame. The rotor ducts may be configured to protect rotating rotors disposed therein from physical damage caused by impact with environmental flight hazards. Each rotor duct may comprise an inlet and diffusor outlet shaped to increase thrust efficiency of a propulsion system for the UAV. For example, an overall thrust gain of greater than one may be provided by a density of the top and bottom airframe assemblies and a shape of the rotor ducts when normalized to a combined weight of the top and bottom airframe assemblies. In other words, a weight added to the UAV by the rotor ducts may be offset/outweighed by the thrust gain provided by the rotor ducts.

Further embodiments are provided to improve overall power efficiency of a UAV. For example, in some embodiments, a UAV may include a skid assembly coupled to an airframe assembly of the UAV. A controller of the UAV may selectively skid the UAV along a solid or liquid environmental surface by controlling contact between the skid assembly and the environmental surface. Thus, the UAV may be able to fly and/or skid as needed to maneuver about the environment, which allows the UAV to preserve its battery as propulsion power required for some aspects of flight may be at least partially avoided while the UAV is skidding through the environment. In various embodiments, method of using such UAV to surveil an environment are provided. Such methods may include skidding the UAV as it navigates to a surveillance location or within a designated monitoring area in an environment, surveilling the environment to detect a disturbance in the environment using one or more environmental sensors of the UAV, and transmitting a corresponding disturbance notification to a base station or other user device.

Additional embodiments provide locomotion related structures, systems, and methods for improving power efficiency of a UAV as well as additional techniques for navigating relatively narrow environmental passageways and spaces, as described herein. For example, an airframe assembly for a UAV may include a cylindrical rolling guard disposed about, fixed relative to, and/or aligned substantially within a rotor plane of the UAV. The cylindrical rolling guard may be configured to allow the UAV to roll along an environmental surface adjoining the cylindrical rolling guard. An unmanned aircraft system (UAS) including the UAV may further be configured to maneuver the UAV to place the cylindrical rolling guard in contact with the environmental surface and control the propulsion system of the UAV to roll the UAV along the environmental surface while the cylindrical rolling guard is in contact with the environmental surface. Such embodiments are able to traverse terrain otherwise impassable while in flight. Moreover, the power expended to orient and roll a UAV can be substantially less than the power needed to traverse a commensurate distance in flight, and so embodiments increase the operational flexibility of the UAS and/or UAVs of the UAS.

FIG. 1 illustrates a block diagram of a survey system 100 including a mobile platform 110, in accordance with an embodiment of the disclosure. In various embodiments, system 100 and/or elements of system 100 may be configured to fly over a scene or survey area, to fly through a structure, or to approach a target and image or sense the scene, structure, or target, or portions thereof, using gimbal system 122 to aim imaging system/sensor payload 140 at the scene, structure, or target, or portions thereof, for example. Resulting imagery and/or other sensor data may be processed (e.g., by sensor payload 140, mobile platform 110, and/or base station 130) and displayed to a user through use of user interface 132 (e.g., one or more displays such as a multi-function display (MFD), a portable electronic device such as a tablet, laptop, or smart phone, or other appropriate interface) and/or stored in memory for later viewing and/or analysis. In some embodiments, system 100 may be configured to use such imagery and/or sensor data to control operation of mobile platform 110 and/or sensor payload 140, as described herein, such as controlling gimbal system 122 to aim sensor payload 140 towards a particular direction, or controlling propulsion system 124 to move mobile platform 110 to a desired position in a scene or structure or relative to a target.

In the embodiment shown in FIG. 1, survey system 100 includes mobile platform 110, optional base station 130, and at least one imaging system/sensor payload 140. Mobile platform 110 may be implemented as a mobile platform configured to move or fly and position and/or aim sensor payload 140 (e.g., relative to a designated or detected target). As shown in FIG. 1, mobile platform 110 may include one or more of a controller 112, an orientation sensor 114, a gyroscope/accelerometer 116, a global navigation satellite system (GNSS) 118, a communications module 120, a gimbal system 122, a propulsion system 124, and other modules 126. Operation of mobile platform 110 may be substantially autonomous and/or partially or completely controlled by optional base station 130, which may include one or more of a user interface 132, a communications module 134, and other modules 136. In other embodiments, mobile platform 110 may include one or more of the elements of base station 130, such as with various types of manned aircraft, terrestrial vehicles, and/or surface or subsurface watercraft. Sensor payload 140 may be physically coupled to mobile platform 110 and be configured to capture sensor data (e.g., visible spectrum images, infrared images, narrow aperture radar data, and/or other sensor data) of a target position, area, and/or object(s) as selected and/or framed by operation of mobile platform 110 and/or base station 130. In some embodiments, one or more of the elements of system 100 may be implemented in a combined housing or structure that can be coupled to or within mobile platform 110 and/or held or carried by a user of system 100.

Controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of mobile platform 110 and/or other elements of system 100, such as the gimbal system 122, for example. Such software instructions may also implement methods for processing infrared images and/or other sensor signals, determining sensor information, providing user feedback (e.g., through user interface 132), querying devices for operational parameters, selecting operational parameters for devices, or performing any of the various operations described herein (e.g., operations performed by logic devices of various elements of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user using user interface 132. In some embodiments, controller 112 may be integrated with one or more other elements of mobile platform 110, for example, or distributed as multiple logic devices within mobile platform 110, base station 130, and/or sensor payload 140.

In some embodiments, controller 112 may be configured to substantially continuously monitor and/or store the status of and/or sensor data provided by one or more elements of mobile platform 110, sensor payload 140, and/or base station 130, such as the position and/or orientation of mobile platform 110, sensor payload 140, and/or base station 130, for example. In various embodiments, sensor data may be monitored and/or stored by controller 112 and/or processed or transmitted between elements of system 100 substantially continuously throughout operation of system 100, where such data includes various types of sensor data, control parameters, and/or other data, as described herein.

Orientation sensor 114 may be implemented as one or more of a compass, float, accelerometer, and/or other device capable of measuring an orientation of mobile platform 110 (e.g., magnitude and direction of roll, pitch, and/or yaw, relative to one or more reference orientations such as gravity and/or Magnetic North), gimbal system 122, imaging system/sensor payload 140, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile platform 110 and/or other elements of system 100 and providing such measurements as sensor signals and/or data that may be communicated to other devices of system 100 (e.g., user interface 132, controller 112). GNSS 118 may be implemented according to any global navigation satellite system, including a GPS, GLONASS, and/or Galileo based receiver and/or other device capable of determining absolute and/or relative position of mobile platform 110 (e.g., or an element of mobile platform 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, GNSS 118 may include an altimeter, for example, or may be used to provide an absolute altitude.

Communications module 120 may be implemented as any wired and/or wireless communications module configured to transmit and receive analog and/or digital signals between elements of system 100. For example, communications module 120 may be configured to receive flight control signals and/or data from base station 130 and provide them to controller 112 and/or propulsion system 124. In other embodiments, communications module 120 may be configured to receive images and/or other sensor information (e.g., visible spectrum and/or infrared still images or video images) from sensor payload 140 and relay the sensor data to controller 112 and/or base station 130. In some embodiments, communications module 120 may be configured to support spread spectrum transmissions, for example, and/or multiple simultaneous communications channels between elements of system 100. Wireless communication links may include one or more analog and/or digital radio communication links, such as WiFi and others, as described herein, and may be direct communication links established between elements of system 100, for example, or may be relayed through one or more wireless relay stations configured to receive and retransmit wireless communications. Communication links established by communication module 120 may be configured to transmit data between elements of system 100 substantially continuously throughout operation of system 100, where such data includes various types of sensor data, control parameters, and/or other data, as described herein.

Gimbal system 122 may be implemented as an actuated gimbal mount, for example, that may be controlled by controller 112 to stabilize sensor payload 140 relative to a target or to aim sensor payload 140 or components coupled thereto according to a desired direction and/or relative orientation or position. As such, gimbal system 122 may be configured to provide a relative orientation of sensor payload 140 (e.g., relative to an orientation of mobile platform 110) to controller 112 and/or communications module 120 (e.g., gimbal system 122 may include its own orientation sensor 114). In other embodiments, gimbal system 122 may be implemented as a gravity driven mount (e.g., non-actuated). In various embodiments, gimbal system 122 may be configured to provide power, support wired communications, and/or otherwise facilitate operation of articulated sensor/sensor payload 140. In further embodiments, gimbal system 122 may be configured to couple to a laser pointer, range finder, and/or other device, for example, to support, stabilize, power, and/or aim multiple devices (e.g., sensor payload 140 and one or more other devices) substantially simultaneously.

In some embodiments, gimbal system 122 may be adapted to rotate sensor payload 140 +−90 degrees, or up to 360 degrees, in a vertical plane relative to an orientation and/or position of mobile platform 110. In further embodiments, gimbal system 122 may rotate sensor payload 140 to be parallel to a longitudinal axis or a lateral axis of mobile platform 110 as mobile platform 110 yaws, which may provide 360 degree ranging and/or imaging in a horizontal plane relative to mobile platform 110. In various embodiments, controller 112 may be configured to monitor an orientation of gimbal system 122 and/or sensor payload 140 relative to mobile platform 110, for example, or an absolute or relative orientation of an element of sensor payload 140. Such orientation data may be transmitted to other elements of system 100 for monitoring, storage, or further processing, as described herein.

Propulsion system 124 may be implemented as one or more propellers, rotors, turbines, or other thrust-based propulsion systems, and/or other types of propulsion systems that can be used to provide motive force and/or lift to mobile platform 110 and/or to steer mobile platform 110. In some embodiments, propulsion system 124 may include multiple propellers (e.g., a tri, quad, hex, oct, or other type "copter") that can be controlled (e.g., by controller 112) to provide lift and motion for mobile platform 110 and to provide an orientation for mobile platform 110. In other embodiments, propulsion system 124 may be configured primarily to provide thrust while other structures of mobile platform 110 provide lift, such as in a fixed wing embodiment (e.g., where wings provide the lift) and/or an aerostat embodiment (e.g., balloons, airships, hybrid aerostats). In various embodiments, propulsion system 124 may be implemented with a portable power supply, such as a battery and/or a combustion engine/generator and fuel supply.

Other modules 126 may include other and/or additional sensors, actuators, communications modules/nodes, and/or user interface devices, for example, and may be used to provide additional environmental information related to operation of mobile platform 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), an irradiance detector, and/or other environmental sensors providing measurements and/or other sensor signals that can be displayed to a user and/or used by other devices of system 100 (e.g., controller 112) to provide operational control of mobile platform 110 and/or system 100.

In some embodiments, other modules 126 may include one or more actuated and/or articulated devices (e.g., multi-spectrum active illuminators, visible and/or IR cameras, radars, sonars, and/or other actuated devices) coupled to mobile platform 110, where each actuated device includes one or more actuators adapted to adjust an orientation of the device, relative to mobile platform 110, in response to one or more control signals (e.g., provided by controller 112). In particular, other modules 126 may include a stereo vision system configured to provide image data that may be used to calculate or estimate a position of mobile platform 110, for example, or to calculate or estimate a relative position of a navigational hazard in proximity to mobile platform 110. In various embodiments, controller 112 may be configured to use such proximity and/or position information to help safely pilot mobile platform 110 and/or monitor communication link quality, as described herein.

User interface 132 of base station 130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by communications module 134 of base station 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links and transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of mobile platform 110 and/or other elements of system 100. For example, user interface 132 may be adapted to display a time series of positions, headings, and/or orientations of mobile platform 110 and/or other elements of system 100 overlaid on a geographical map, which may include one or more graphs indicating a corresponding time series of actuator control signals, sensor information, and/or other sensor and/or control signals.

In some embodiments, user interface 132 may be adapted to accept user input including a user-defined target heading, waypoint, route, and/or orientation for an element of system 100, for example, and to generate control signals to cause mobile platform 110 to move according to the target heading, route, and/or orientation, or to aim sensor payload 140 accordingly. In other embodiments, user interface 132 may be adapted to accept user input modifying a control loop parameter of controller 112, for example. In further embodiments, user interface 132 may be adapted to accept user input including a user-defined target attitude, orientation, and/or position for an actuated or articulated device (e.g., sensor payload 140) associated with mobile platform 110, for example, and to generate control signals for adjusting an orientation and/or position of the actuated device according to the target altitude, orientation, and/or position. Such control signals may be transmitted to controller 112 (e.g., using communications modules 134 and 120), which may then control mobile platform 110 accordingly.

Communications module 134 may be implemented as any wired and/or wireless communications module configured to transmit and receive analog and/or digital signals between elements of system 100. For example, communications module 134 may be configured to transmit flight control signals from user interface 132 to communications module 120 or 144. In other embodiments, communications module 134 may be configured to receive sensor data (e.g., visible spectrum and/or infrared still images or video images, or other sensor data) from sensor payload 140. In some embodiments, communications module 134 may be configured to support spread spectrum transmissions, for example, and/or multiple simultaneous communications channels between elements of system 100. In various embodiments, communications module 134 may be configured to monitor the status of a communication link established between base station 130, sensor payload 140, and/or mobile platform 110 (e.g., including packet loss of transmitted and received data between elements of system 100, such as with digital communication links), as described herein. Such status information may be provided to user interface 132, for example, or transmitted to other elements of system 100 for monitoring, storage, or further processing, as described herein.

Other modules 136 of base station 130 may include other and/or additional sensors, actuators, communications modules/nodes, and/or user interface devices used to provide additional environmental information associated with base station 130, for example. In some embodiments, other modules 136 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by other devices of system 100 (e.g., controller 112) to provide operational control of mobile platform 110 and/or system 100 or to process sensor data to compensate for environmental conditions, such as an water content in the atmosphere approximately at the same altitude and/or within the same area as mobile platform 110 and/or base station 130, for example. In some embodiments, other modules 136 may include one or more actuated and/or articulated devices (e.g., multi-spectrum active illuminators, visible and/or IR cameras, radars, sonars, and/or other actuated devices), where each actuated device includes one or more actuators adapted to adjust an orientation of the device in response to one or more control signals (e.g., provided by user interface 132).

In embodiments where imaging system/sensor payload 140 is implemented as an imaging device, imaging system/sensor payload 140 may include imaging module 142, which may be implemented as a cooled and/or uncooled array of detector elements, such as visible spectrum and/or infrared sensitive detector elements, including quantum well infrared photodetector elements, bolometer or microbolometer based detector elements, type II superlattice based detector elements, and/or other infrared spectrum detector elements that can be arranged in a focal plane array. In various embodiments, imaging module 142 may include one or more logic devices (e.g., similar to controller 112) that can be configured to process imagery captured by detector elements of imaging module 142 before providing the imagery to memory 146 or communications module 144. More generally, imaging module 142 may be configured to perform any of the operations or methods described herein, at least in part, or in combination with controller 112 and/or user interface 132.

In some embodiments, sensor payload 140 may be implemented with a second or additional imaging modules similar to imaging module 142, for example, that may include detector elements configured to detect other electromagnetic spectrums, such as visible light, ultraviolet, and/or other electromagnetic spectrums or subsets of such spectrums. In various embodiments, such additional imaging modules may be calibrated or registered to imaging module 142 such that images captured by each imaging module occupy a known and at least partially overlapping field of view of the other imaging modules, thereby allowing different spectrum images to be geometrically registered to each other (e.g., by scaling and/or positioning). In some embodiments, different spectrum images may be registered to each other using pattern recognition processing in addition or as an alternative to reliance on a known overlapping field of view.

Communications module 144 of sensor payload 140 may be implemented as any wired and/or wireless communications module configured to transmit and receive analog and/or digital signals between elements of system 100. For example, communications module 144 may be configured to transmit infrared images from imaging module 142 to communications module 120 or 134. As another example, communications module 144 may be configured to transmit measurement ranges from SER 145 to communications module 120 or 134. In other embodiments, communications module 144 may be configured to receive control signals (e.g., control signals directing capture, focus, selective filtering, and/or other operation of sensor payload 140) from controller 112 and/or user interface 132. In some embodiments, communications module 144 may be configured to support spread spectrum transmissions, for example, and/or multiple simultaneous communications channels between elements of system 100. In various embodiments, communications module 144 may be configured to monitor and communicate the status of an orientation of the sensor payload 140 as described herein. Such status information may be provided or transmitted to other elements of system 100 for monitoring, storage, or further processing, as described herein.

Memory 146 may be implemented as one or more machine readable mediums and/or logic devices configured to store software instructions, sensor signals, control signals, operational parameters, calibration parameters, infrared images, and/or other data facilitating operation of system 100, for example, and provide it to various elements of system 100. Memory 146 may also be implemented, at least in part, as removable memory, such as a secure digital memory card for example including an interface for such memory.

Orientation sensor 148 of sensor payload 140 may be implemented similar to orientation sensor 114 or gyroscope/accelerometer 116, and/or any other device capable of measuring an orientation of sensor payload 140, imaging module 142, and/or other elements of sensor payload 140 (e.g., magnitude and direction of roll, pitch, and/or yaw, relative to one or more reference orientations such as gravity, Magnetic North, and/or an orientation of mobile platform 110) and providing such measurements as sensor signals that may be communicated to various devices of system 100. Gyroscope/accelerometer (e.g., angular motion sensor) 150 of sensor payload 140 may be implemented as one or more electronic sextants, semiconductor devices, integrated chips, accelerometer sensors, accelerometer sensor systems, or other devices capable of measuring angular velocities/accelerations (e.g., angular motion) and/or linear accelerations (e.g., direction and magnitude) of sensor payload 140 and/or various elements of sensor payload 140 and providing such measurements as sensor signals that may be communicated to various devices of system 100.

Other modules 152 of sensor payload 140 may include other and/or additional sensors, actuators, communications modules/nodes, cooled or uncooled optical filters, and/or user interface devices used to provide additional environmental information associated with sensor payload 140, for example. In some embodiments, other modules 152 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by imaging module 142 or other devices of system 100 (e.g., controller 112) to provide operational control of mobile platform 110 and/or system 100 or to process imagery to compensate for environmental conditions.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100. In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements. Each element of system 100 may include one or more batteries, capacitors, or other electrical power storage devices, for example, and may include one or more solar cell modules or other electrical power generating devices. In some embodiments, one or more of the devices may be powered by a power source for mobile platform 110, using one or more power leads. Such power leads may also be used to support one or more communication techniques between elements of system 100.

Figure 2:
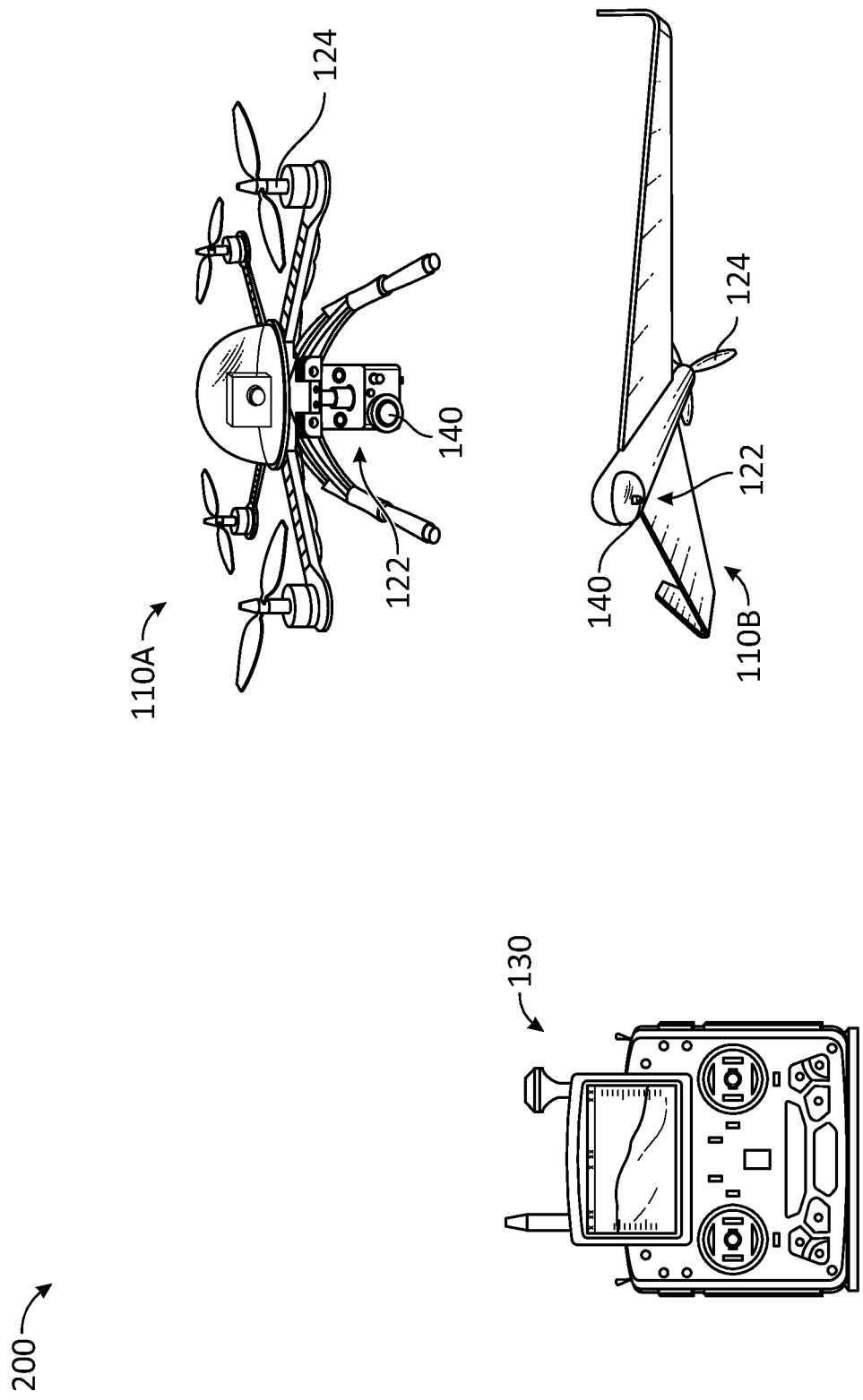
FIG. 2 illustrates a diagram of a survey system including mobile platforms in accordance with an embodiment of the disclosure.

FIG. 2 illustrates a diagram of survey system 200 including mobile platforms 110A and 110B, each with sensor payloads 140 and associated gimbal systems 122 in accordance with an embodiment of the disclosure. In the embodiment shown in FIG. 2, survey system 200 includes base station 130, mobile platform 110A with articulated imaging system/sensor payload 140 and gimbal system 122, and mobile platform 110B with articulated imaging system/sensor payload 140 and gimbal system 122, where base station 130 may be configured to control motion, position, and/or orientation of mobile platform 110A, mobile platform 110B, and/or sensor payloads 140. More generally, survey system 200 may include any number of mobile platforms 110, 110A, and/or 110B.

Figure 3A:
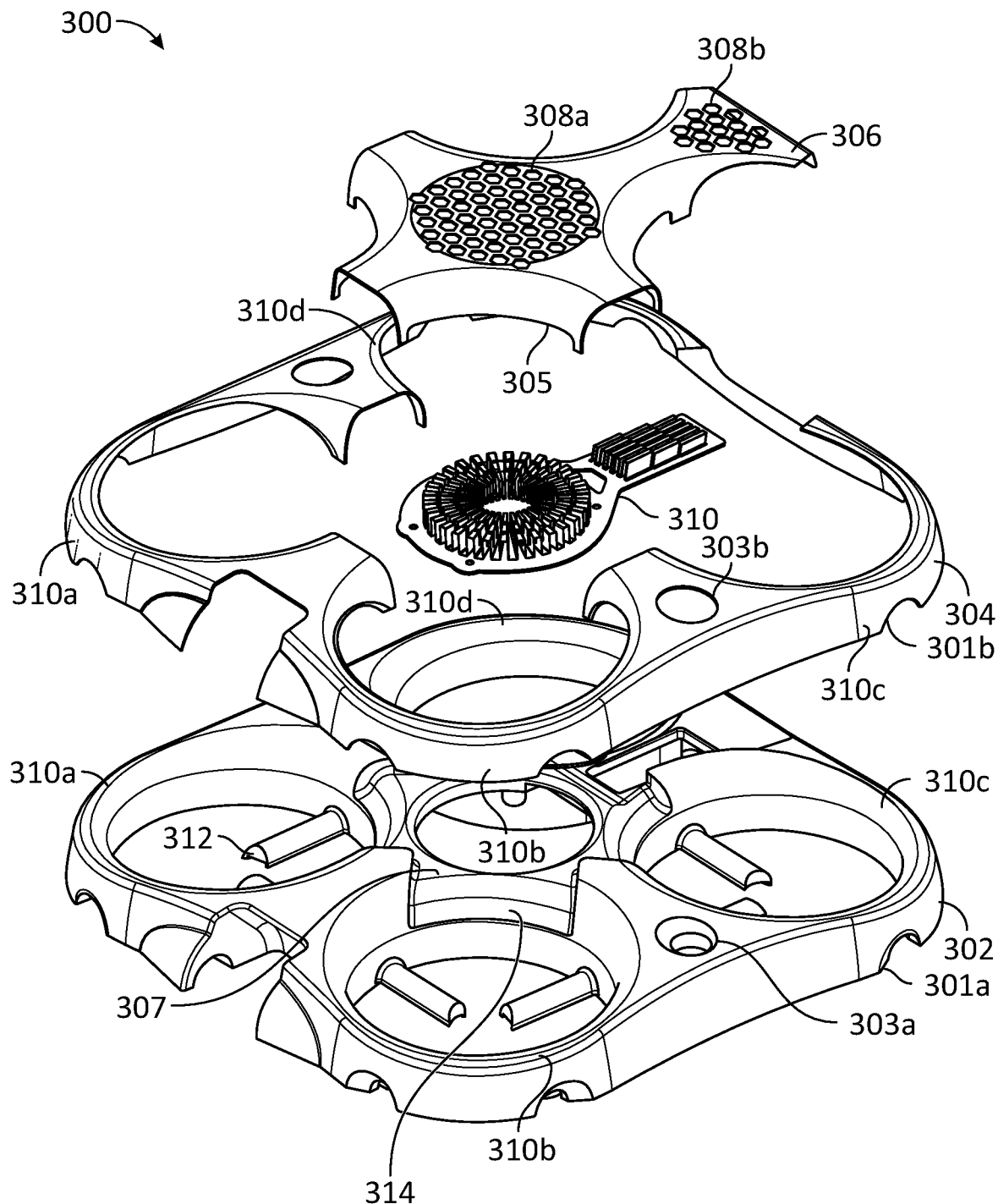
FIG. 3A illustrates a top perspective exploded view of a top airframe assembly for a UAV in accordance with an embodiment of the disclosure.

FIG. 3A illustrates a top perspective exploded view of a top airframe assembly 300 for a UAV in accordance with an embodiment of the disclosure. For example, the UAV may be, may be part of, or may include mobile platform 110 of FIG. 1. Top airframe assembly 300 may include a top airframe core 302 and a top airframe shell 304. Top airframe shell 304 may be formed using a polycarbonate material or other relatively rigid material and may be approximately 0.3 mm to 0.5 mm thick in some embodiments. Top airframe shell 304 may include a secondary cover 306 comprising cooling air inlet orifices (e.g., orifices 308a and 308b). In some cases, secondary cover 306 may be part of a single body of top airframe shell 304 or in some cases may be removably connected to top airframe shell 304. The cooling air inlet orifices may be disposed in a location about top airframe shell 304 and/or secondary cover 306 to facilitate air flow to heat sink 310 through airflow channels as discussed herein.

Heat sink 310 may be disposed at least partially between top airframe core 302 and top airframe shell 304 in some embodiments. Heat sink 310 may be a metal heat sink assembly configured to cool power electronics and other internal hardware of the UAV. For example, ambient air may flow through the air inlet orifices of top airframe shell 304 to reach dissipation surfaces of heat sink 310 as further discussed below. Heat sink 310 may be thermally coupled to the power electronics or other internal hardware such that heat sink 310 may dissipate heat away from the power electronics or the internal hardware via conduction. In some instances, heat sink 310 may include folded fins to provide a larger surface area to disperse heat away from the power electronics and other internal hardware of the UAV.

Top airframe core 302 may be partially enclosed within top airframe shell 304 in an assembly (e.g., overmolding process) of top airframe assembly 300. In some embodiments, top airframe core 302 may be formed using an expanded polystyrene (EPS) foam having an approximate density of 20 to 30 kg/m$^3$. Top airframe core 302 and top airframe shell 304 may be assembled to form inlets 310a-310d of rotor ducts disposed about UAV propulsion mounts.

Inlets 310a-310d of the rotor ducts may be assembled to diffusor outlets 410e-410h of rotor ducts as discussed below to form rotor ducts of the UAV. The rotor ducts may be configured to protect rotating rotors disposed within the UAV propulsion mounts from physical damage caused by impact with environmental flight hazards. Each rotor duct may be connected to an inlet and diffusor outlet shaped to increase thrust efficiency of a propulsion system for the UAV. For example, an overall thrust gain of greater than one may be provided by a density of the top and bottom airframe assemblies and a shape of the rotor ducts when normalized to a combined weight of the top and bottom airframe assemblies. In other words, a weight added to the UAV by forming the rotor ducts is offset by the thrust gain provided by the rotor ducts.

An airflow channel may be defined by an internal surface 305 of top airframe shell 304 (e.g., or secondary cover 306 of airframe shell 304) and internal surface 307 of top airframe core 302 when top airframe shell 304 and top airframe core 302 are connected. The airflow channel may extend from the air inlet orifices to the air outflow 314 disposed within an inner wall of inlet 310b of a rotor duct. Air outflow 314 may be defined by a notch of secondary cover 306 and groove defined in top airframe core 302. Each airflow channel defined the top airframe shell 304 and top airframe core 302 may be configured to form an air conduit between the plurality of cooling air inlet orifices and a negative pressure above a rotor plane defined by a rotor rotating in a corresponding rotor duct. The rotor rotating in the corresponding rotor duct may draw ambient air from the plurality of cooling air inlet orifices to a dissipation surface of heat sink 310, into the corresponding rotor duct through air outflow 314, and out of a diffusor outlet of the corresponding rotor duct. As such, airflow may be optimized to enhance flight time characteristics of the UAV.

FIG. 3A shows top propulsion mount supports, one of which is labeled top propulsion mount support 312. Top propulsion mount support 312 may extend from an inner surface of inlet 310a (e.g., inner surface of top airframe core 302) to a central region within inlet 310a. Top propulsion mount support 312 may provide structural support and protection for a propulsion system of the UAV including, e.g., electric motor, rotor, rotor shaft, rotor blades, etc. The description of top propulsion mount support 312 may generally be applied to the additional propulsion mounts shown in FIG. 3A.

In some embodiments, top airframe shell 304 and top airframe core 302 may provide housing for various sensors, imagers, and/or other devices of the UAV. For example, top airframe shell 304 may include housing elements 301b and 303b. Housing elements 301b and 303b of top airframe shell may complement housing elements 301a and 303a of top airframe core 302 to provide a top portion of housing for the sensors/imagers/devices of the UAV. A bottom portion of the housing may be formed from a bottom airframe assembly as discussed below in reference to FIG. 4. In various embodiments, the sensors/imagers/devices may include one or more sensors, imagers, or devices discussed in reference to FIGS. 1 and 2. Such sensors, imagers, and other devices may be placed around the airframe assembly to provide for 360-degree awareness. For example, ultrasound sensors may be used to determine where the UAV is located relative to its surroundings.

Figure 3B:
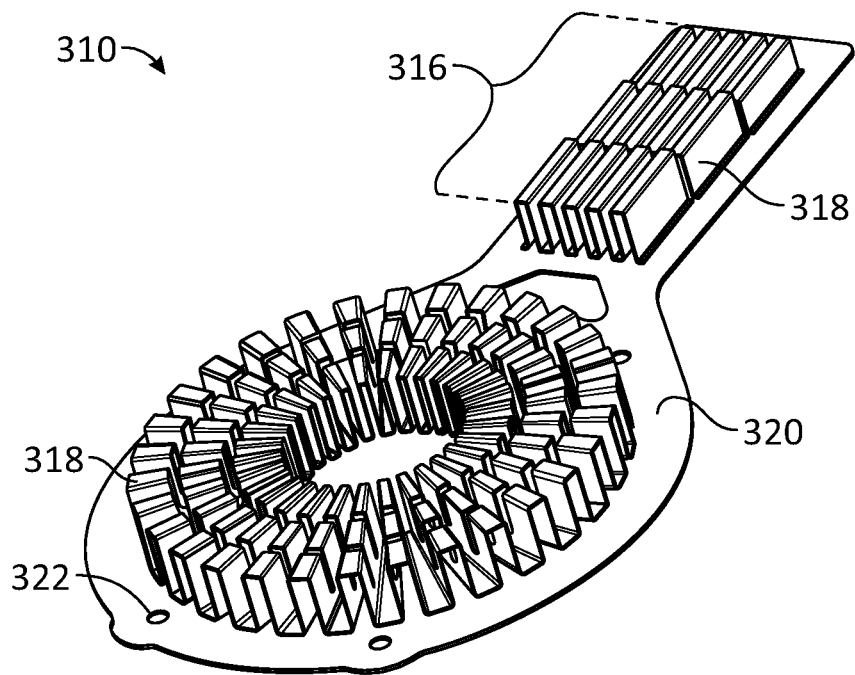
FIGS. 3B and 3C illustrate perspective view of a heat sink of the top airframe assembly of FIG. 3A in accordance with an embodiment of the disclosure.
Figure 3C:
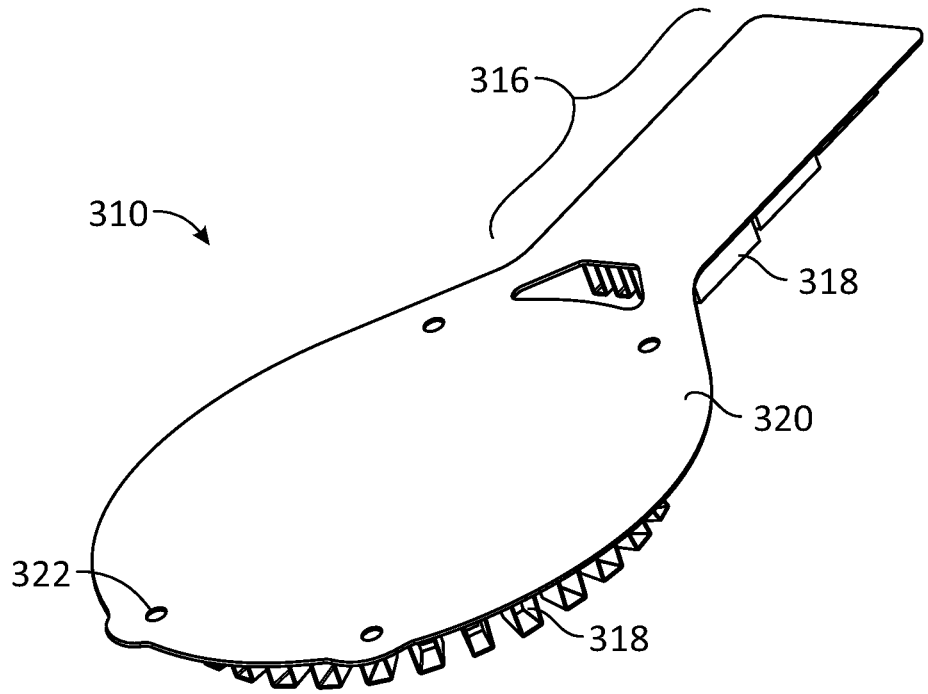

FIG. 3B illustrates a top perspective view of heat sink 310 of FIG. 3A in accordance with one or more embodiments of the disclosure. FIG. 3C illustrates a bottom perspective view of heat sink 310 of FIG. 3B. Heat sink 310 may be a folded fin heat sink having folded fins 318 disposed on a central portion 320 of heat sink 310. In some embodiments, heat sink 310 may include a secondary portion 316 (e.g., leg) that extends from central portion 320 as shown in FIGS. 3B and 3C. Secondary portion 316 may extend from central portion 320 between adjacent rotors to dissipate heat from additional power electronics or other internal hardware within a UAV that is different than the power electronics are hardware corresponding to central portion 320. Although only one portion (secondary portion 316) is shown as extending from central portion 320, additional configurations having more or less extending portions (e.g., legs) may be implemented to provide cooling to separate hardware within the UAV as needed. Such additional extending portions may be disposed between rotor ducts of the UAV and serve to thermally cool various power electronics and internal hardware disposed within the airframe assembly of the UAV. In an aspect, secondary portion 316 may include folded fins 318 to increase heat dissipation performance.

Although secondary portion 316 is shown as substantially rectangular, secondary portion 316 may be shaped as needed to complement a shape of hardware within the UAV that requires cooling. Heat sink 310 may include through-holes (one of which is through-hole 322) to facilitate securing heat sink to top airframe core 302. In this regard, heat sink 310 may be overmolded during molding of top airframe core 302 to reduce part count, weight, and assembly fixturing/issues. Thus, through-holes of heat sink 310 may be used in the overmolding process to secure heat sink 310 to the top airframe core 302 to form a composite component of the UAV.

In one or more embodiments, heat sink 310 may be made of an aluminum or copper material.

Figure 4:
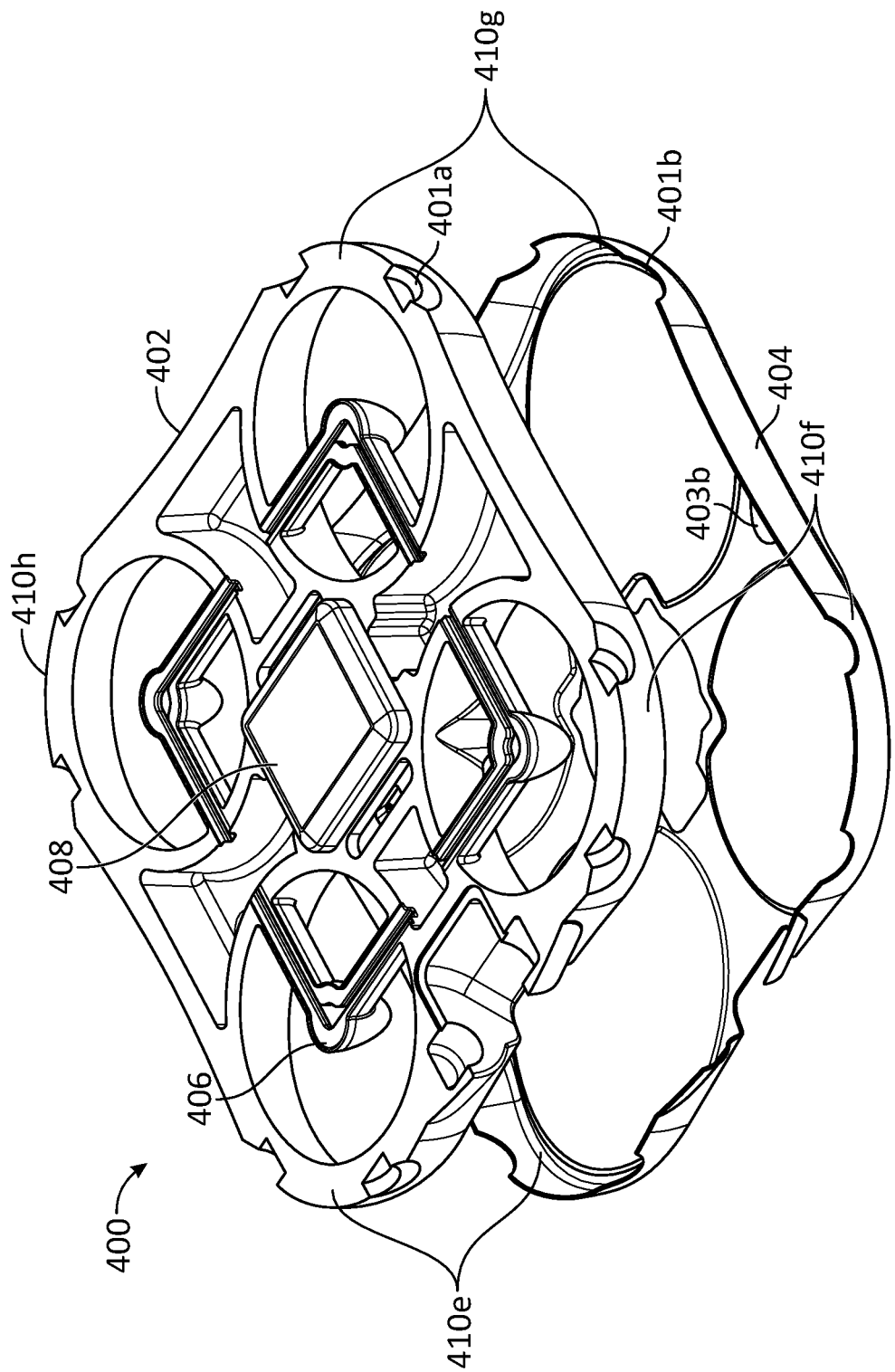
FIG. 4 illustrates a top perspective exploded view of a bottom airframe assembly for a UAV in accordance with an embodiment of the disclosure.

FIG. 4 illustrates a top perspective exploded view of a bottom airframe assembly 400 for a UAV in accordance with an embodiment of the disclosure. For example, the UAV may be, may be part of, or may include mobile platform 110 of FIG. 1. Bottom airframe assembly 400 may include a bottom airframe core 402 and a bottom airframe shell 404. Bottom airframe shell 404 may be a vacuum formed polycarbonate material approximately 0.3 mm to 0.5 mm thick according to some embodiments.

Bottom airframe core 402 may be partially enclosed within bottom airframe shell 404 in an assembly (e.g., overmolding process) of bottom airframe assembly 400. In some embodiments, bottom airframe core 402 may be formed from foam material comparable to that of top airframe core 302 of FIG. 3A (e.g., an expanded polystyrene (EPS) foam having an approximate density of 20 to 30 kg/m$^3$). Bottom airframe core 402 and bottom airframe shell 404 may be assembled to form diffusor outlets 410e-410h of rotor ducts disposed about UAV propulsion mounts. It is noted that part of diffusor outlet 410h made from bottom airframe shell 404 is not shown in FIG. 4. Diffusor outlets 410e-410h of the rotor ducts may align with inlets 310a-310d of the rotor ducts shown in FIG. 3A to form the rotor ducts of the UAV.

In the embodiment shown in FIG. 4, bottom propulsion mount supports (one of which is propulsion mount support 406) of the UAV propulsion mounts extend from two locations of an inner surface of bottom airframe core 402 to a central region within diffusor outlets 410e-410h of the rotor ducts. Bottom propulsion mount supports shown in FIG. 4 may complement top propulsion mount supports shown in FIG. 3A to provide structural support for a propulsion system of the UAV. The description of bottom propulsion mount support 406 may generally be applied to the additional bottom propulsion mount supports shown in FIG. 4.

In some embodiments, bottom airframe shell 404 and bottom airframe core 402 may provide bottom portions of housing for various sensors, imagers, or other devices of the UAV to complement the top portions housing discussed above in reference to FIG. 3A. For example, bottom airframe shell 404 may include housing element 401b and bottom airframe core may include housing element 403b where housing elements 401a and 40b may form a bottom portion of housing that may be complemented by housing elements 301a and 301b that form the top portion of the housing. Thus, when top airframe assembly 300 and bottom airframe assembly 400 are connected to form the airframe assembly, their respective housing elements may complement each other to provide for complete housing for sensors, imagers, and other devices of the UAV.

Bottom airframe core 402 may include a mounting pad 408 disposed within an inner region of a support frame that may be placed on bottom propulsion mount supports of bottom airframe core 402. Power electronics and other internal hardware may be mounted on mounting pad 408 (e.g., using adhesive or overmolded). For example, internal electronics such as controller 112 and communications module 120 discussed in reference to FIG. 1 may be mounted to mounting pad 408 in an embodiment.

Figure 5:
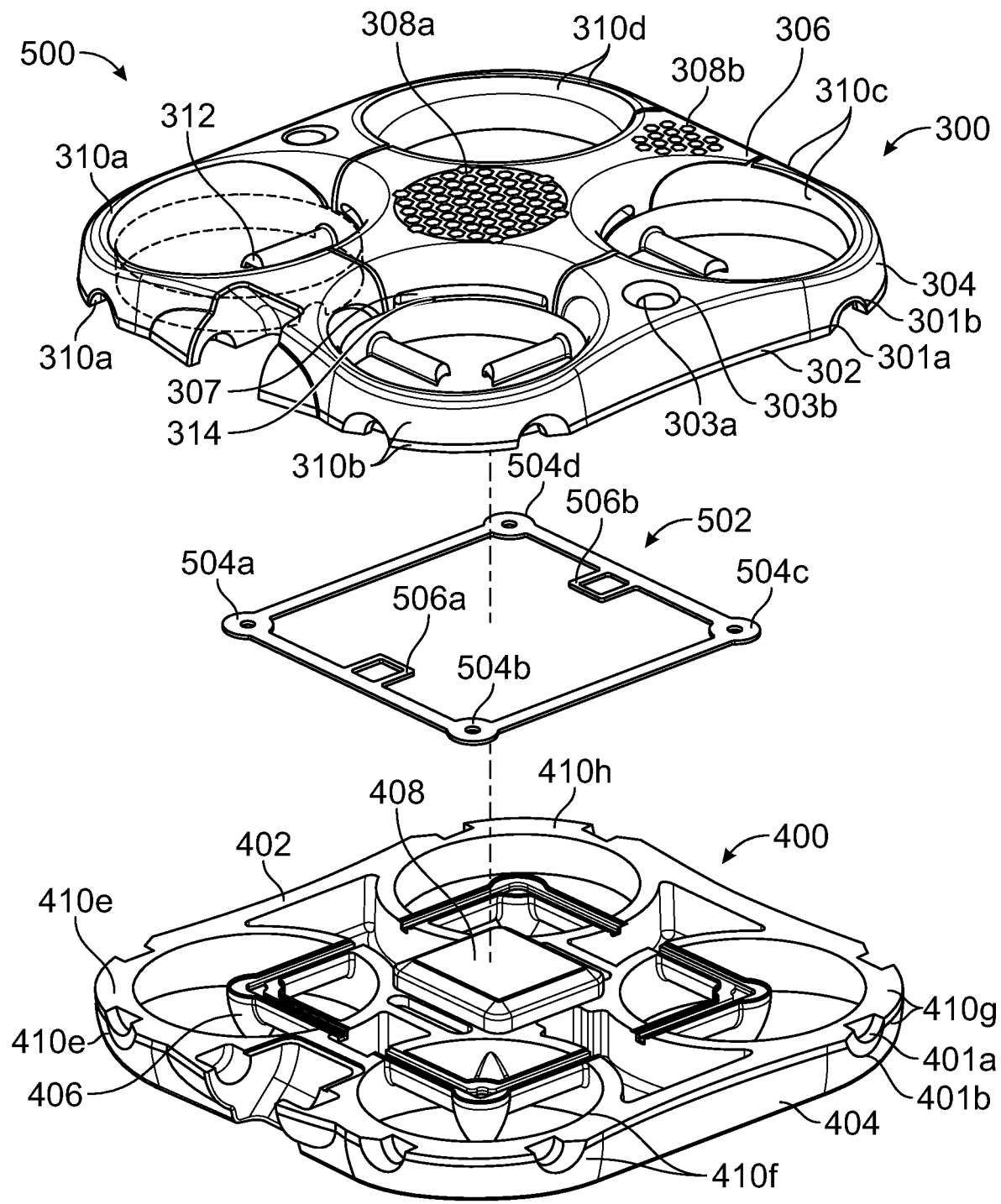
FIG. 5 illustrates a perspective exploded view of an airframe assembly for a UAV in accordance with an embodiment of the disclosure.

FIG. 5 illustrates a perspective exploded view of an airframe assembly 500 for a UAV in accordance with an embodiment of the disclosure. The UAV may be, may be part of, or may include mobile platform 110 of FIG. 1 according to various embodiments. Airframe assembly 500 may include top airframe assembly 300 assembled to bottom airframe assembly 400 where mounting frame 502 is enclosed within top airframe assembly 300 and bottom airframe assembly 400. In some embodiments, an adhesive may be used to couple top airframe assembly 300 to bottom airframe assembly 400. Similarly, an adhesive may be used to couple mounting frame 502 to top airframe assembly 300 and/or bottom airframe assembly 400. In an implementation, mounting frame 502 may be configured to physically couple top airframe core 302 to bottom airframe core 402. In this regard, mounting frame 502 may be disposed at least partially between the top propulsion mount supports of top airframe assembly 300 and the bottom propulsion mount supports of bottom airframe assembly 400.

Mounting frame 502 may be used as a support frame for the UAV as well as a mechanical linkage between airframe assembly 500 and corresponding UAV propulsion motors. In this regard, each mount 504a-504d of mounting frame 502 may correspond to a propulsion motor mount. Mounting frame 502 may include bar stabilizers 506a and 506b to provide stability to the UAV during a flight time. In some embodiments, mounting frame 502 may be a carbon fiber frame to provide lightweight yet rigid structural support for the UAV. Mounting frame 502 may be approximately 2 mm thick in some implementations. Although mounting frame 502 is shown to be substantially polygonal in shape, mounting frame 502 may be various different planar shapes are contemplated to provide structural support for the UAV and its propulsion motor mounts.

Figure 6A:
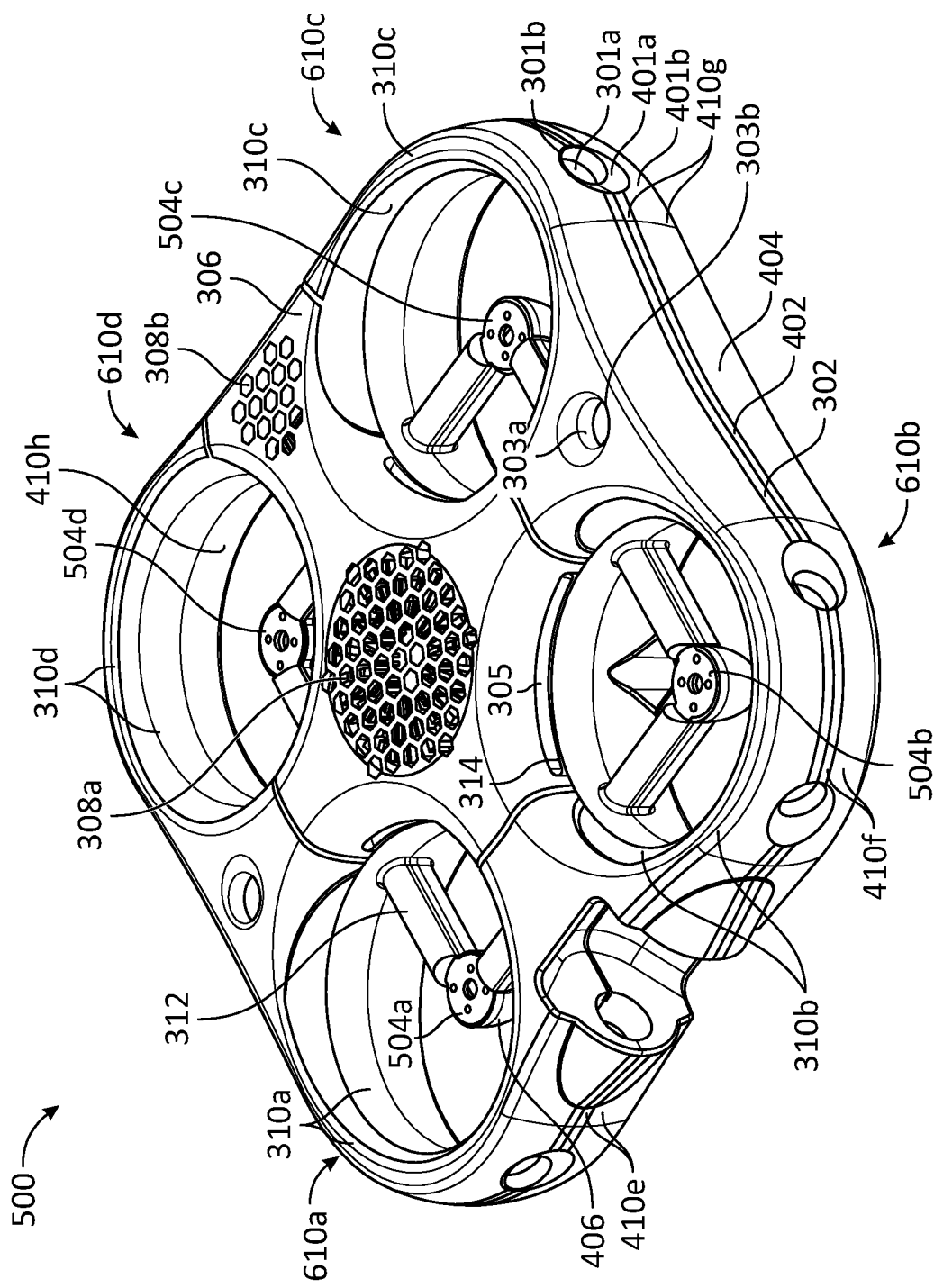
FIG. 6A illustrates a perspective view of the assembled airframe assembly of FIG. 5 in accordance with an embodiment of the disclosure.

FIG. 6A illustrates a perspective view of airframe assembly 500 for the UAV in accordance with an embodiment of the disclosure. As shown in FIG. 6A, mounting frame 502 may be partially enclosed between top airframe assembly 300 and bottom airframe assembly 400 such that mounts 504a-504d of mounting frame 502 are exposed to allow a rotor shaft (or other rotor assembly component) to be inserted through each of mounts 504a-504d and received by bottom propulsion mount supports of bottom airframe assembly 400. As shown in FIG. 6A, inlets 310a-310d and diffusor outlets 410e-410h may be complementarily assembled for form rotors 610a-610d, respectively.

Figure 6B:
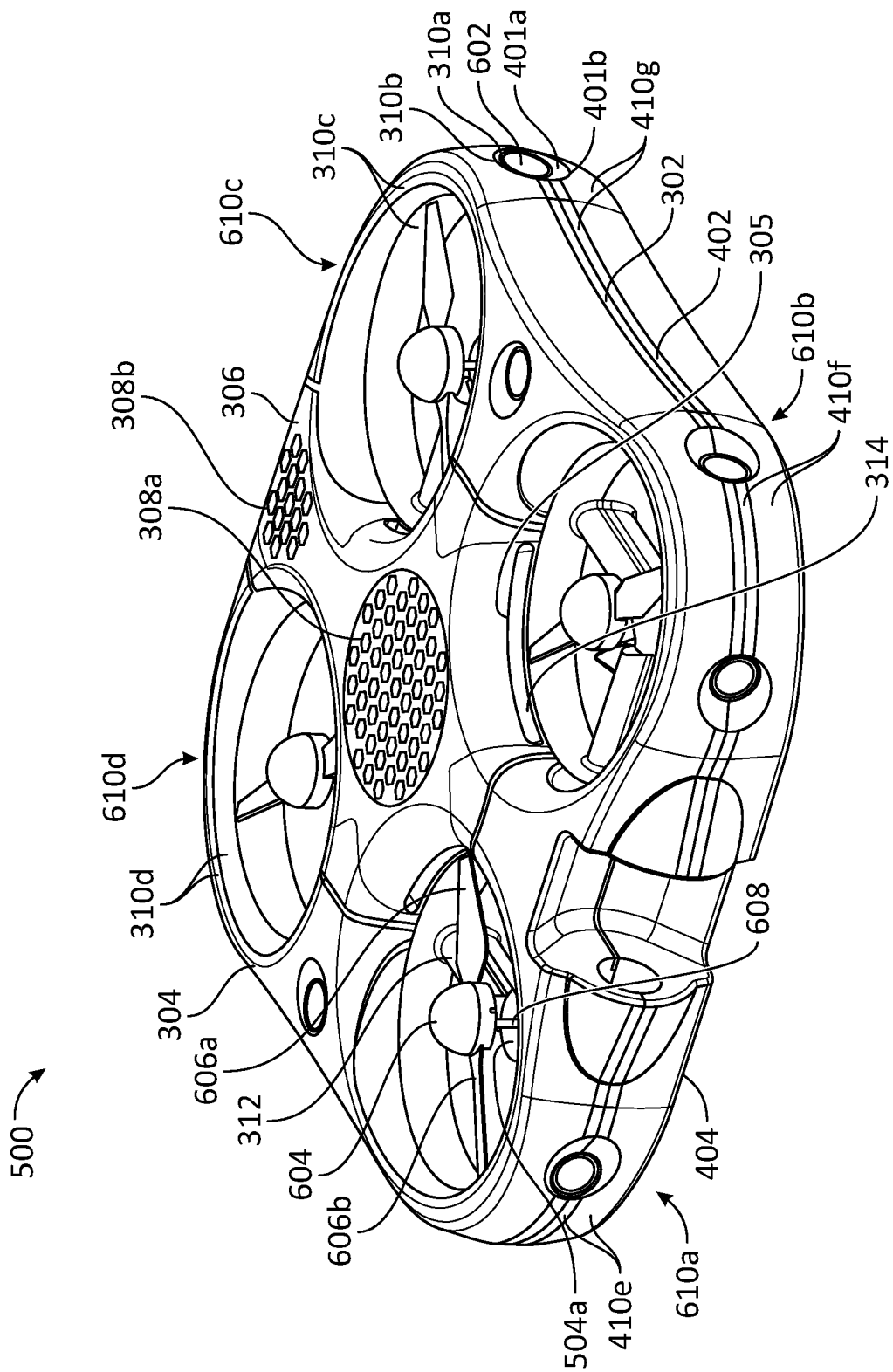
FIG. 6B illustrates a perspective view of the assembled airframe assembly of FIG. 6B in which rotor assemblies are disposed within rotor ducts of the assembled airframe assembly in accordance with an embodiment of the disclosure.

FIG. 6B illustrates a perspective view of airframe assembly 500 of FIG. 6A in which rotor assemblies are disposed within rotor ducts 610a-610d of airframe assembly 500 in accordance with an embodiment of the disclosure. One rotor assembly of the rotor assemblies is labeled as rotor assembly 604 having rotor blades 606a and 606b and rotor shaft 608 inserted through mounts 504a of a mounting frame and received in bottom propulsion mount support 406 (not shown in FIG. 6B) of bottom airframe assembly 402.

In one or more embodiments, airframe assembly 500 may overall dimensions of approximately 350 mm by 350 mm by 90 mm. One or more sensors (e.g., sensor 602) may be disposed between the top and bottom air frame assemblies. The one or more sensors may be configured to perform one or more functions as described in the present disclosure.

Figure 7:
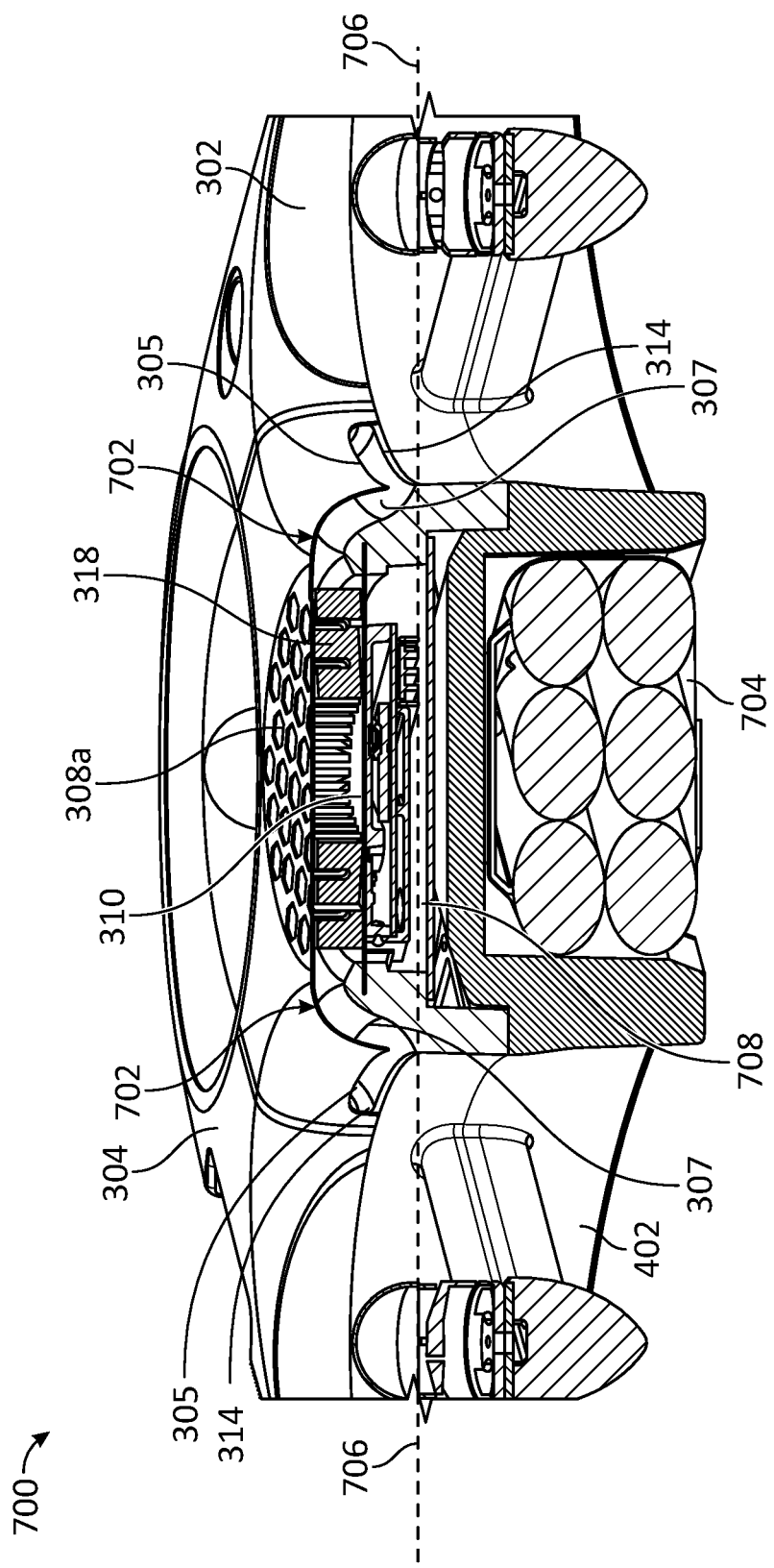
FIG. 7 illustrates a cross-sectional view of an airframe assembly that has an airflow channel in accordance with one or more embodiments of the disclosure.

FIG. 7 illustrates a cross-sectional view of an airframe assembly 500 that has an airflow channel 702 in accordance with one or more embodiments of the disclosure. Airflow channel 702 may be formed between top airframe shell 304 and top airframe core 302. Each rotor duct may have an airflow outlet 314 disposed in an inner wall of the rotor duct above a rotor blade plane 706. Airflow outlet 314 may be formed by an internal surface 305 of top airframe shell 304 and an internal surface 307 of top airframe core 302 when top airframe shell 304 and top airframe core 302 are connected. Each airflow channel corresponding to the rotor ducts of the UAV may be configured to form an air conduit between the plurality of cooling air inlet orifices (one of which is orifice 308a) and a negative pressure generated by a rotor rotating rotor blades in a corresponding rotor duct such that ambient air is drawn through the plurality of cooling air inlet orifices to a dissipation surface of heat sink 310, into at least one of the rotor ducts via the airflow outlet 314 disposed in the rotor duct, and through the diffusor outlet of the corresponding rotor duct.

In various embodiments, power electronics 708 may be disposed on a mounting pad of bottom airframe core 402 and thermally coupled to heat sink 310 such that power electronics 708 may be cooled via the conduction characteristics of heat sink 310 such as the surface area of heat sink 310 that receives cool air through one or more airflow channels of the UAV as discussed above. Power electronics 708 may include one or more electronic devices discussed with reference to FIGS. 1 and 2 according to various embodiments. Airframe assembly 708 may include a portable power supply 704 disposed between bottom airframe core 402 and a bottom airframe shell (not shown in FIG. 7). In some embodiments, portable power supply may be one or more batteries used to supply power to power electronics 708 in some cases.

Figure 8:
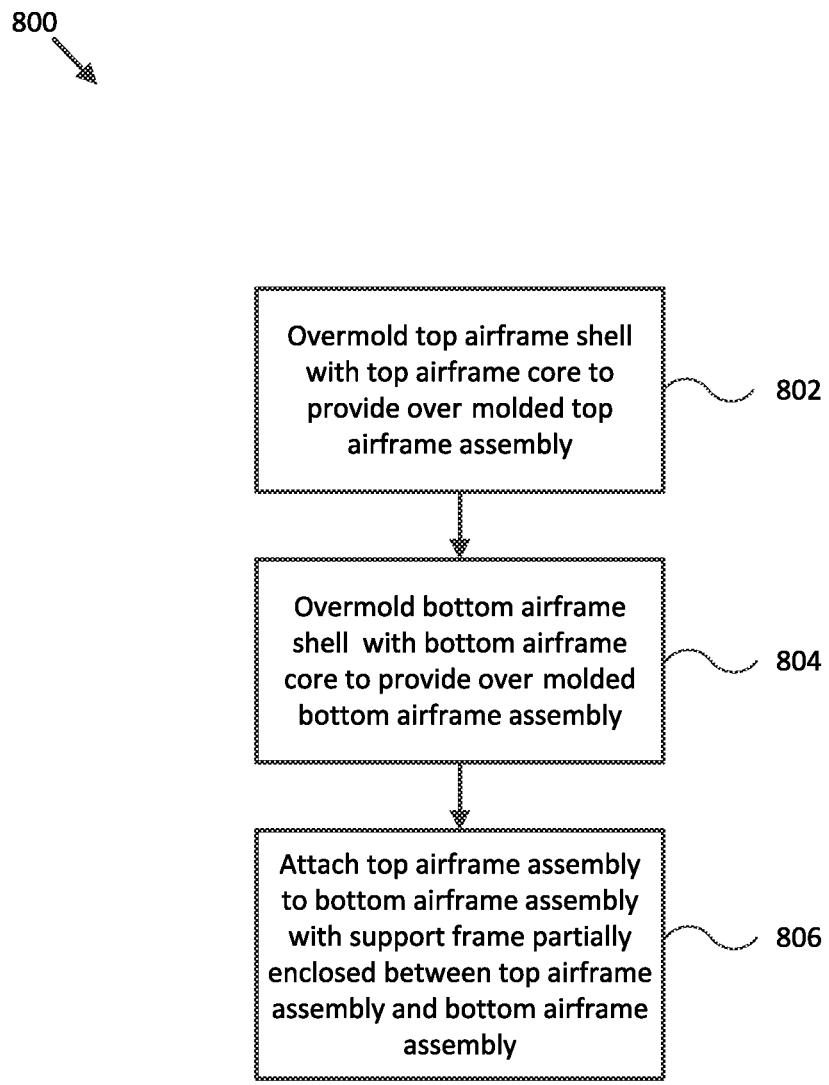
FIG. 8 illustrates a flow diagram of a process for assembling an airframe assembly for a UAV in accordance with an embodiment of the disclosure.

FIG. 8 illustrates a flow diagram of a process 800 for constructing or manufacturing an airframe assembly for a UAV in accordance with an embodiment of the disclosure. The airframe assembly may be, may be part of, or may include airframe assembly 500 as discussed herein. It should be appreciated that any step, sub-step, sub-process, or block of process 800 may be performed in an order or arrangement different from the embodiments illustrated by FIG. 8. For example, in some embodiments, one or more blocks may be omitted from or added to process 800.

At block 802, a top airframe shell may be overmolded with a foam where the foam forms a top airframe core that is at least partially enclosed within the top airframe shell. More generally, a top airframe assembly may include the top airframe shell and a top airframe core. The foam may be expanded polystyrene (EPS) foam having an approximate density of 20 to 30 $kg/m^3$ according to some embodiments. The top airframe shell may be vacuum formed from polycarbonate and may be approximately between 0.3 to 0.5 mm thick, but may be thinner or thicker, uniformly or non-uniformly, to suit a particular application.

In some embodiments, a heat sink may be overmolded into the top airframe core to, for example, reduce part count, weight, and assembly fixturing and issues. The heat sink may be overmolded such that a first side of the heat sink faces a bottom foam airframe core and a second side of the heat sink having folded fins faces an inner surface of the top airframe shell. A top airframe assembly may comprise the top airframe shell, the top airframe core, and the heatsink.

At block 804, a bottom airframe shell may be overmolded with a foam where the foam forms a bottom airframe core that is at least partially enclosed within the bottom airframe shell. More generally, a bottom airframe assembly may include the bottom airframe shell and the bottom airframe core. The foam may be comparable to the foam used to form the top airframe core (e.g., expanded polystyrene (EPS) foam having an approximate density of 20 to 30 $kg/m^3$). Similar to the top airframe shell, the bottom airframe shell may be a vacuum formed polycarbonate shell approximately between 0.3 to 0.5 mm thick but may be thinner or thicker, uniformly or non-uniformly, to suit a particular application.

In various embodiments, the top airframe assembly and the bottom airframe assembly may be implemented as durable foam-polycarbonate composite components. The polycarbonate airframe shells may be relatively rigid to protect against mechanical intrusions and abrasions during flight operation of the UAV. The foam airframe cores may be configured to consume impact energy from rough landings and crashes that the UAV may experience. Furthermore, the foam airframe cores can provide vibration dampening for internal components of the UAV during flight operation.

In some embodiments, power electronics may be attached to a mounting pad of the bottom airframe shell such that the power electronics are disposed between the bottom airframe core and the top airframe core. The power electronics may be thermally attached to the first side of the heat sink such that heat may be dissipated away from the power electronics via conduction of the heat sink and an airflow that flows along heat dissipation surfaces of fold fins of the heat sink.

At block 806, the top airframe assembly is attached to the bottom airframe assembly with a support frame (e.g., carbon fiber frame) enclosed, at least partially, between the top airframe assembly and the bottom airframe assembly. In an implementation, each side of the support frame may be supplied with adhesive such as double-sided adhesive tape to adhere the support frame to the bottom airframe core and the top airframe core. In some implementations, the top airframe core and/or the bottom airframe core may be supplied with adhesive to adhere to the support frame as the top airframe assembly, support frame, and bottom airframe assembly are assembled to create the airframe assembly of the UAV.

In some embodiments, the adhesive supplied to the mounting frame, top airframe assembly, and/or bottom airframe assembly may act as a barrier for internal components of the UAV. For example, the adhesive may be applied such that a water-resistant barrier is formed to protect internal components such as the power electronics when the UAV has landed on/in a water surface.

Techniques discussed in the present disclosure substantially improve the operational flexibility and reliability of unmanned sensor platforms. For example, the present disclosure provides a low cost, low part count UAV architecture that lends itself to UAV safety and durability in constrained areas during a flight time. The UAV architecture improves propulsion efficiency by employing low density materials and forming rotor ducts that provide an overall thrust gain for the UAV. Furthermore, the UAV architecture allows for upside-down landing and take-off since the rotors are protected by the rotor ducts. In some embodiments, the UAV architecture may be sufficiently buoyant to allow for the UAV to float in water even though the rotors may be submerged under water. In such cases, the UAV may operate the rotors under water to provide sufficient thrust to escape from the water and lift the UAV into the air. In some cases, the clearance provided by the rotor ducts may allow for the UAV to float on water surfaces without the rotors being submerged in water to facilitate take off from water surfaces.

In additional embodiments, a UAV architecture may include additional structural features configured to improve overall power efficiency for the UAV. For example, a UAV may include a skid assembly coupled to an airframe assembly of the UAV. A controller of the UAV may selectively skid the UAV along a solid or liquid environmental surface by controlling contact between the skid assembly and the environmental surface, and so the UAV may be able to fly and/or skid as needed to maneuver about the environment, which allows the UAV to preserve its battery as propulsion power required for some aspects of flight may be at least partially avoided while the UAV is skidding through the environment.

Figure 9A:
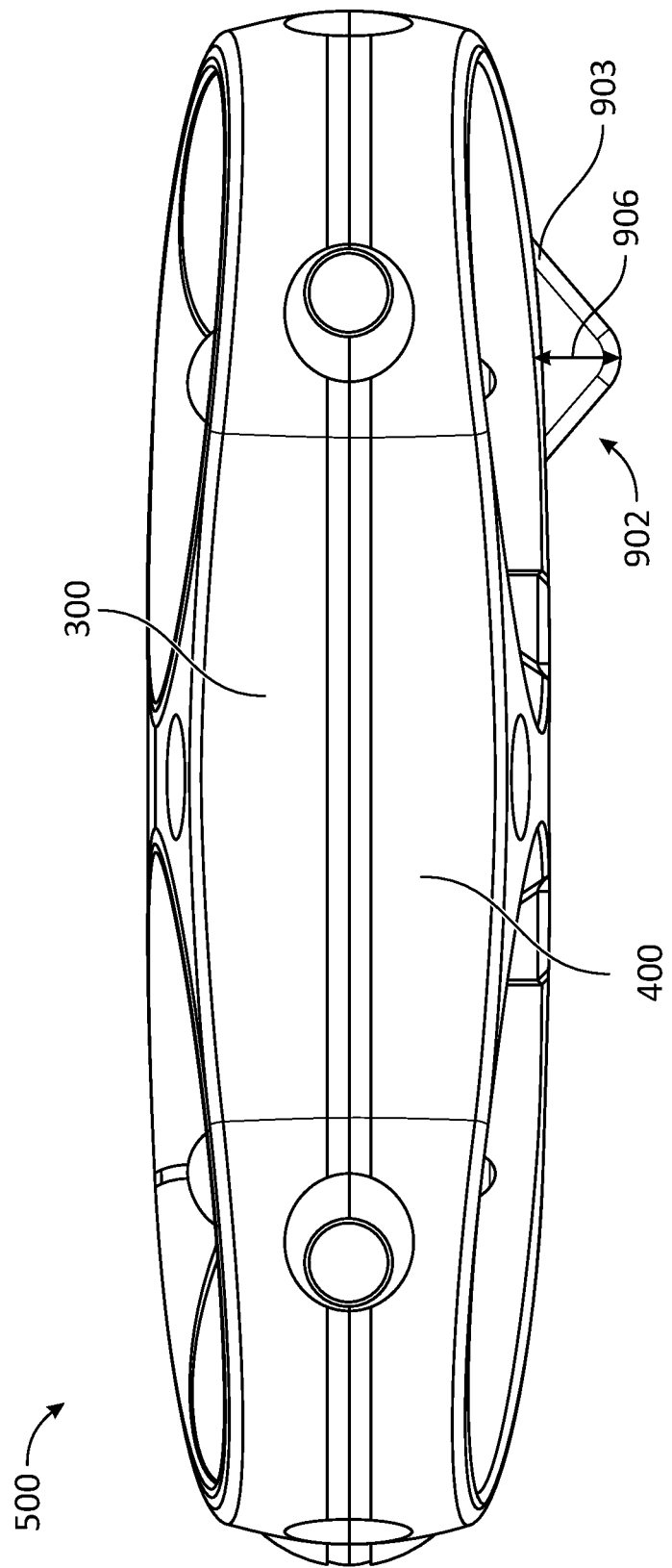
FIG. 9A illustrates a view of an airframe assembly that includes a skid assembly in accordance with one or more embodiments of the disclosure.
Figure 9B:
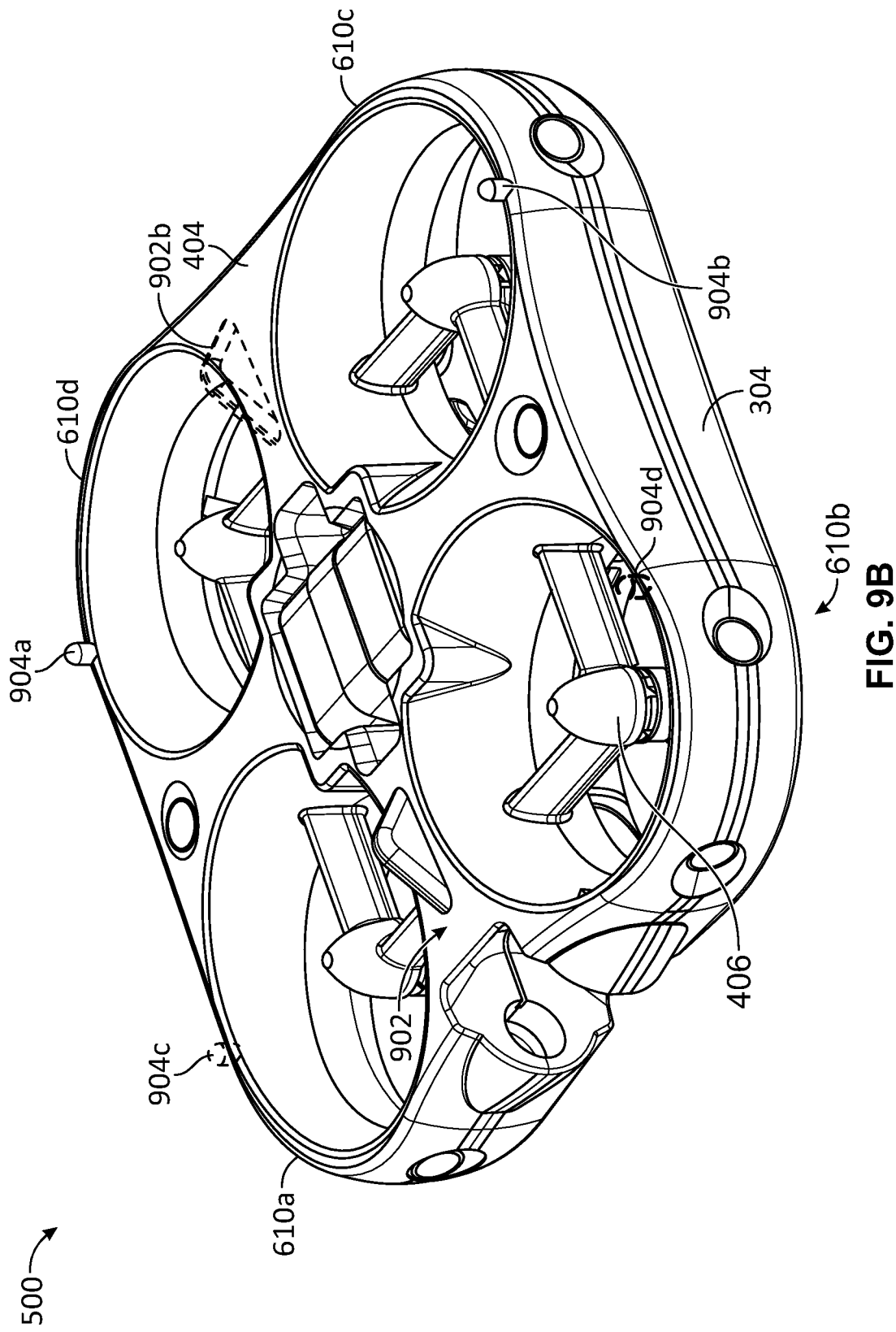
FIG. 9B illustrates a view of an airframe assembly that includes a skid assembly and landing feet in accordance with one or more embodiments of the disclosure.
Figure 9C:
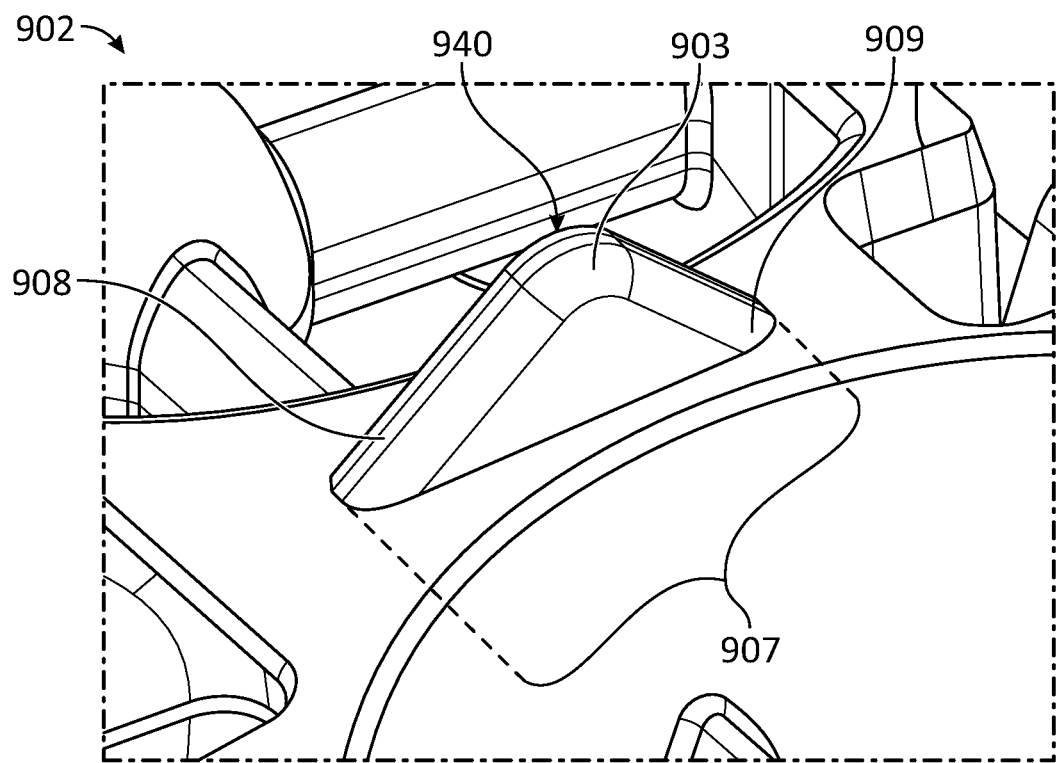
FIG. 9C illustrates a detailed view of a skid assembly in accordance with one or more embodiments of the disclosure.

FIGS. 9A-C illustrate example embodiments of an airframe assembly 500 for a UAV or unmanned aircraft system (UAS) including a skid assembly, as described herein. As shown in FIG. 9A, airframe assembly 500 includes a skid assembly 902 disposed on a bottom surface of airframe assembly 500 (e.g., on bottom airframe assembly 400). In various embodiments, skid assembly 902 may be implemented by and/or include a skid member 903 coupled to and extending from a bottom surface of airframe assembly 500, as shown, where skid member 903 is configured to contact and/or slide along a solid and/or liquid surface while propulsion system 124 is energized and UAV/mobile platform 110 is in motion, and where skid assembly 902 is configured to allow airframe assembly 500 to skid along the solid and/or liquid surface at a specified approximate UAV skid height set, at least in part, by a height of skid member 902 (e.g., shown in FIG. 9A by arrow 906) as it protrudes from airframe assembly 500. Elements of skid assembly 902, including skid member 903, may be shaped and/or constructed of a material that allows airframe assembly 500 to skid along a surface taking advantage of the ground effect to reduce power output required to hover above and/or travel along such surface.

In a specific embodiment, skid assembly 902 and/or elements of skid assembly 902 may be coupled to and extend from a rear portion of the bottom surface of airframe assembly 500, such that skid assembly 902 is positioned along a midline of airframe assembly 500 between a center of airframe assembly 500 and a rear extent of airframe assembly 500, similar to the positioning shown in FIGS. 9A-B (e.g., roughly between ¼ and ⅕$^{th}$ the length of airframe assembly 500 from a rear extent of airframe assembly 500 towards a center of airframe assembly 500). In such embodiment, controller 112 and/or base station 130 may be configured to travel forward (e.g., to the left in FIG. 9A) by pitching airframe assembly 500 down (e.g., counterclockwise in FIG. 9A) to generate lateral-forward thrust while retaining the overall thrust gain associated with ground effect by also substantially maintaining contact between skid member 903 and an underlying solid or liquid and generally planar surface. As such, skid assembly 902 allows airframe assembly 500 to skid along such surface at an approximate UAV skid height (e.g., relative to the underlying surface) set, at least in part, by height 906 of skid member 903. In various embodiments, maintaining contact between skid member 903 and an underlying surface may include controlling supplying just enough thrust (e.g., by propulsion system 124) to overcome surface friction between skid member 903 and the underlying surface.

In embodiments where airframe assembly 500 is traveling relatively quickly over such surface, the side profile of the gap between airframe assembly 500 and the underlying surface may be wedge shaped, such that the front bottom surface of airframe assembly 500 is slightly closer to the underlying surface, but the rear bottom surface of airframe assembly 500 (e.g., and the bottom edges of any rotor ducts implemented within airframe assembly 500) is still maintained at the UAV skid height. In embodiments where airframe assembly is being yawed (e.g., to steer a UAV implemented by airframe assembly 500), skid member 903 may be used as a pivot point (e.g., as opposed to a center of airframe assembly 500 and/or a center of mass of the UAV) so as to maintain contact with the underlying surface and reduce power expended as thrust to complete the yawing/steering.

More generally, skid assembly 902 and/or elements of skid assembly 902 may also or alternatively be coupled to and extend from a top surface of airframe assembly 500, for example, or from one or more side surfaces of airframe assembly 500, so as to more easily allow airframe assembly 500 to skid along a ceiling or wall while airframe assembly 500 is oriented horizontally relative to the local gravity down direction. In other embodiments, a UAV implemented with airframe assembly 500 may be configured use propulsion system 124 to orient airframe assembly 500 roughly parallel to a substantially horizontal, vertical, or sloped surface, with skid assembly 902 disposed between a bottom surface of airframe assembly 500 and the substantially horizontal, vertical, or sloped environmental surface, and to skid airframe assembly 500 along such surface while maintaining such parallel orientation of airframe assembly 500 (e.g., adjusted slightly to allow for lateral thrust and/or motion roughly parallel to the surface). In such embodiment, the ground effect (or a similar aerodynamic effect) may be used to reduce overall power required to maintain such parallel orientation while traversing the adjacent surface. In particular embodiments, skid assembly 902 may be substantially triangular in shape and formed of a material so as to smoothly skid or slide over or through a variety of different types of solid or liquid surfaces in an environment.

In various embodiments, skid member 903 and/or skid assembly 902 may be solid or hollow, may be fixed relative to a surface (e.g., a bottom surface) of airframe assembly 500, and/or may include a sprung element, such as a sprung skid member 903, to reduce risk of physically jarring of airframe assembly 500 and/or snagging onto a surface deviation or transition over which airframe assembly 500 is traveling. For example, as shown in FIG. 9C, skid assembly 902 may include skid member 903 at least partially disposed within a skid assembly recess 907 formed within (e.g., a bottom surface of) airframe assembly 500. Skid assembly 902 may include a spring hinge 908 coupled to and/or between skid member 903 (e.g. a leading edge of skid member 903) and airframe assembly 500. Spring hinge 908 may be configured to bias skid member 903 out of skid member recess 907 and up to a hinge stop 909 of skid assembly 902 and away from airframe assembly 500. Skid member 903 may be configured to at least partially depress into skid assembly recess 907 as the UAV/airframe assembly 500 skids along a liquid or solid environmental surface, as described herein. In related embodiments, skid assembly 902 may include an actuator configured to retract skid member 903 into airframe assembly 500 so as to remove related aerodynamic inefficiencies during non-ground-effect-impacted flight (e.g., flight higher than the UAV skid height above an underlying surface).

In some embodiments, skid assembly 902 may include a surface sensor 940 (e.g., shown in FIG. 9C) communicatively coupled to a controller 112 of the UAV and configured to collect a sample from or adjacent to a surface as the UAV skids along a surface. In some embodiments, surface sensor 940 may be implemented as an electrical, chemical, spectral, and/or other type of sensor selected and/or configured to detect the presence, concentration, and/or other characteristics of a variety of different substances or types of substances, for example, and such substances may include any of a number of different types of substances, such as any of the critical chemical, biological, radiological, nuclear, and explosive or other similar relatively dangerous CBRNE type substances and/or substance characteristics. Controller 112 may be configured to receive surface sample data from surface sensor 940, for example, and to determine a presence, concentration, and/or other characteristic of one or more substances from or adjacent to the sampled environmental surface based on the collected sample from the surface sensor. Controller 112 may also be configured to communicate such characteristics to base station 130 or other user device, as described herein. In alternative embodiments, surface sensor 940 may be implemented as a chemical swab or scrape-cavity or other type of sample collector configured to collect a physical sample for further analysis, such as at or by base station 130.

As an illustrative example, UAV/mobile platform 110 may be used to monitor methane emissions from landfills by skidding along a surface of the landfill to detect a presence and/or concentration of the methane using surface sensor 940 of UAV 110. As another illustrative example, UAV 110 may skid along a roadway, walkway, or waterway/water channel to detect surface contamination on the roadway, walkway, or waterway/water channel. For example, UAV 110 may be configured to skid ahead of a convoy to detect any surface contaminations in front of the convoy before the convoy enters or runs over a surface contamination. In some embodiments, UAV 110 may include multi and/or hyperspectral imaging devices configured to facilitate such precautionary detections. As a further illustrative example, UAV 110 may be configured to aid in in mine detection by detecting explosives and/or other chemicals (e.g., analytes) known to be used in terrestrial or water mines by skidding in front of a convoy to detect such indicative substances along a planned route of the convoy. In specific embodiments, surface sensor 940 may include metal detection capabilities (e.g., an inductive metal detector sensor and/or a hall effect sensor) to detect hidden IEDs, trip wires, etc. along a route of the convoy. Surface sensor 940 may also be or may include a ground-penetrating radar subsystem to facilitate detection and/or localization of such devices. In yet another illustrative example, UAV 110 may be configured for undercarriage vehicle inspection. For example, UAV 110 may be configured to skid underneath a vehicle to examine its undercarriage, such as at security checkpoints. In such instances, UAV 110 may include one or more imaging modules oriented so as to capture images of such undercarriage as UAV 110 skids underneath the vehicle. In specific embodiments, controller 112 may be configured to execute an artificial intelligence-based inspection autopilot and/or anomaly detector configured to automatically search and examine a vehicle undercarriage and reliably detect the presence of anomalous and/or potentially explosive devices with limited or no input from an operator.

In various embodiments, and as shown in FIG. 9B, airframe assembly 500 may include one or more landing feet 904a and 904b, which may be configured to stably orient airframe assembly 500 before takeoff or after landing, for example, and which may be configured to provide such stationary stabilization with or without structural assistance from skid assembly 902. In the embodiment shown in FIG. 9B, three points of surface contact provided by landing feet 904a and 904b and skid assembly 902 allow for easy rotational movement when the two points of surface contact provided by landing feet 904a and 904b are removed by controlling propulsion system 124 to lift and/or orient airframe assembly 500, such as to maintain a minimum spatial separation between landing feet 904a and 904b and an underlying solid and/or liquid surface while skid member 903 is in physical contact with such solid and/or liquid surface. For example, UAV 110 may be configured to change its heading by lifting landing feet 904a and 904b above surface contact and rotating airframe assembly 500 while a single surface contact exists at skid assembly 902. In some embodiments, a weight of a payload of the UAV may be distributed (e.g., near an end in which skid assembly 902 is disposed) to facilitate skidding without risking contact of landing feet 904a and 904b and/or other structure of airframe assembly 500 with an underlying surface.

In some embodiments, landing feet 904a and 904b may be substantially cylindrical and/or peg shaped, for example, and may be fixed relative to airframe assembly 500 or may be configured to retract into airframe assembly 500 (e.g., operable to extend and retract as needed). For example, during a skidding operation of the UAV, landing feet 904a and 904b may retract into airframe assembly 500 to reduce drag or likelihood of unintentionally catching a surface anomaly or transition along a ground skidding surface. According to some embodiments, landing feet 904a and 904b may be implemented as additional skid assemblies and be used to support a weight of the UAV during specified minimal motion such that a reduced propeller thrust can maneuver, translate, and/or reorient the UAV across a relatively smooth surface. Although two landing feet are depicted in FIG. 9B, fewer or additional landing feet are contemplated to suit a desired use and/or arrangement of UAV 110. The landing feet may be disposed at various locations on bottom airframe assembly 400 to distribute a weight of the UAV, and in some cases its payload, to suit a desired application. For example, in FIG. 9B, skid assembly 902 and landing feet 904a and 904b are arranged so that skid member 903 extends from a front bottom surface of airframe assembly 500 and landing feet 904a and 904b extend from opposing left and right rear bottom surfaces of airframe assembly 500. In alternative embodiments, the positions of skid assembly 902 and landing feet 904a and 904b may be opposite that shown in FIG. 9B (e.g., relative to a center and forward orientation of airframe assembly 500), as illustrated by alternative skid assembly 902b and landing feet 904c and 904d (e.g., shown in dashed lines in FIG. 9B).

In a use case example, skid assembly 902 and landing feet 904a, and 904b may allow for the UAV to fly into a building to execute a survey mission within an interior of the building. The UAV may fly within the building during certain portions of the survey mission or for certain events such as to traverse an obstacle encountered in the building (e.g., stairs, fallen objects, furniture, etc.). During other portions of the survey mission, the UAV may skid along a ground surface within the building. By reducing a fly time of the mission and using skidding for certain portions of the mission, the UAV may use its battery life efficiently. In other words, in some embodiments, the UAV may optimize energy efficiency by balancing skidding the UAV along the surface and flying in an airspace. For example, controller 112 may be configured to control propulsion system 124 of UAV 110 to navigate UAV 110 within a designated monitoring area comprising a solid and/or liquid surface while selectively skidding airframe assembly 500 along the solid and/or liquid surface at a specified approximate UAV skid height by controlling physical contact between skid member 902 and the solid and/or liquid surface, as described herein. Controller 112 may also be configured to selectively skid UAV 110 (e.g., skid or fly) based, at least in part, on a desired propulsion power efficiency for UAV 110 associated with a time ratio of skidding motion of UAV 110 to flight of UAV 110 within the designated monitoring area.

It will be appreciated that skidding may simplify autonomous requirements of UAV 110 in some cases. For example, when the UAV 110 flies into an obstacle (e.g., a wall), recovery from the impact may require power, computational analysis, and/or mechanical stresses. However, in instances where UAV 110 is skidding during a mission and runs into an obstacle, UAV 110 may quickly detect the impact with the obstacle and simply stop propulsion without relying on extensive flight control algorithms and/or sensor polling and sensor data analysis. It will further be appreciated that UAV 110 may use a ground effect between airframe assembly 500 and an underlying or adjacent surface to achieve motion over or along substantially smooth surfaces with relatively little power expenditure. For example, the presence of a roughly planar environmental surface relatively close to a propeller disk and roughly perpendicular to its downstream thrust may increase a pressure differential between the volume above the propeller disk and the volume between airframe assembly 500 and the adjacent environmental surface, and thus increase the effective thrust at a given power consumption by propulsion system 124. Under certain conditions, skidding may use at least twenty-five percent less power than flying over the same distance without skidding. In some embodiments, the ground effect may be used advantageously to achieve a desired propulsion power efficiency, for example, by selectively skidding (e.g., where possible given the environmental conditions) more often than flying without skidding, to as to increase a time ratio of skidding motion of UAV 110 to flight of UAV 110, such as within a designated monitoring area.

It should be appreciated that skid assembly 902 and landing feet 904a and 904b may be implemented in various UAVs and UASs and accompanying architectures and is not limited to just those shown and described in FIGS. 1-9C.

Figure 10:
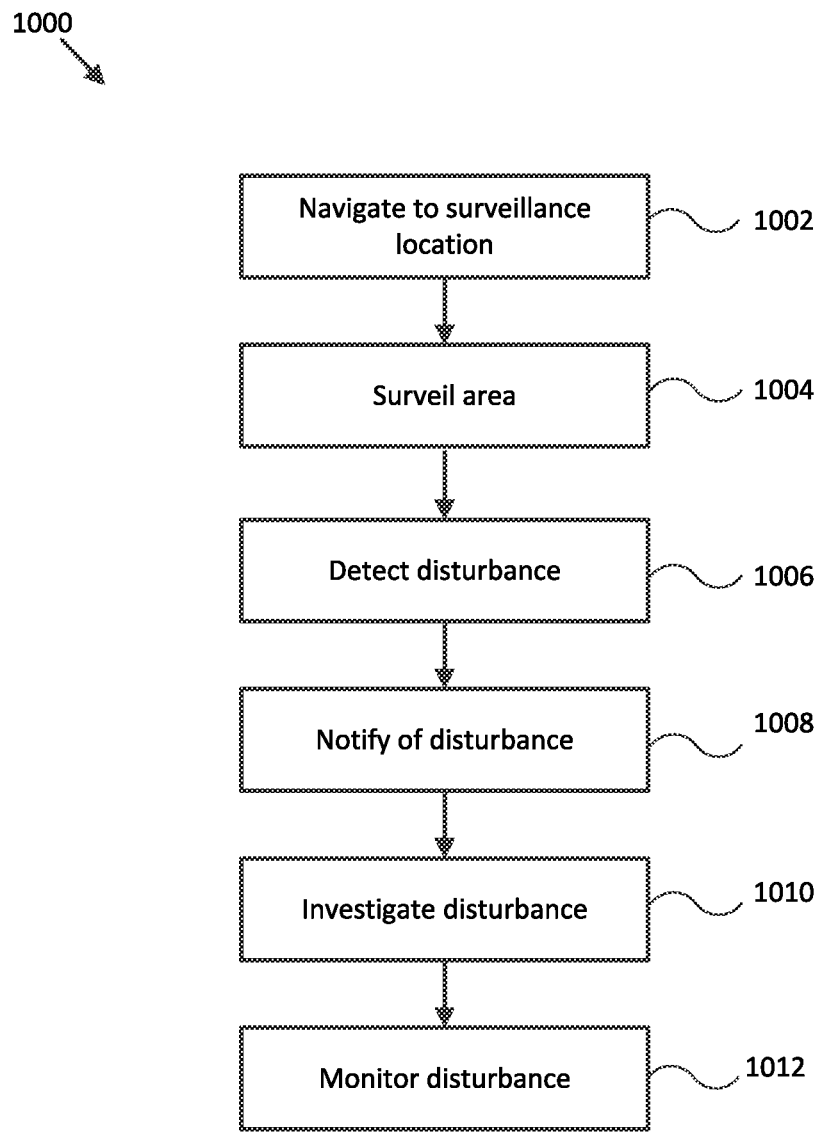
FIG. 10 illustrates a flow diagram of a process for using a UAV in accordance with one or more embodiments of the disclosure.

FIG. 10 illustrates a flow diagram of a process 1000 for surveilling an environment (e.g., a designated monitoring area) in accordance with various embodiments of the disclosure. It should be appreciated that any step, sub-step, sub-process, or block of process 1000 may be performed in an order or arrangement different from the embodiments illustrated by FIG. 10. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 1000 is described with reference to systems, processes, control loops, and images described in reference to FIGS. 1-12, process 1000 may be performed by other systems different from those systems and according to different processes, control loops, and images and including a different selection of electronic devices, sensors, assemblies, mobile structures, and/or mobile structure attributes, for example.

At block 1002, a UAV may navigate to a surveillance location, such as a surveillance location within a designated monitoring area. Prior to navigating to the surveillance location, UAV 110 may be in a charging location where UAV 110 may charge its battery, for example. Alternatively, UAV 110 may have finished clearing a newly acquired building or area before being assigned to a designated monitoring area and/or surveillance location at or along a perimeter around the building or area. In some embodiments, the surveillance location may be a designated surveillance location or monitoring area containing such surveillance location that is assigned to the UAV by a security system (e.g., an embodiment of system 100). For example, a security system may include a plurality of UAVs, base stations, user devices, and other elements, where each UAV may have an assigned surveillance location and/or designated monitoring area (e.g., geocoordinate position, referential location programmed and stored in memory, etc.) to which the UAV may navigate to begin surveilling a monitoring area/environment.

In some cases, the surveillance location and/or monitoring area may be a dynamically rotating location or area in that UAV 110 may move between a number of surveillance locations defining a perimeter or route within a monitoring area/environment. In this regard, several UAVs may be assigned initial surveillance locations within an environment and the UAVs may rotate surveillance locations and/or monitoring areas according to a predetermined shift timing. As the UAVs rotate locations, the UAVs may be able to survey various intermediate areas between their respective surveillance locations and/or monitoring areas. In several embodiments, the shift timing may be randomly generated so as to not be predictable by an intruder. Likewise, the rotation between the various surveillance locations and/or monitoring areas may be random such that shift movement of the individual UAVs becomes unpredictable. In other cases, the surveillance UAVs may remain at their assigned surveillance locations and/or monitoring areas for a duration of time (e.g., a night time shift, a daytime nightshift, certain hours, days, minutes, etc.).

According to various embodiments, the monitoring areas/environment may include a variety of terrains, buildings (e.g., museums, apartments, office spaces, warehouses, etc.), vehicles (e.g., watercraft), and/or bodies of water. In some cases, if the environment includes an interior of a building, outdoor terrain, and/or onboard a watercraft, the UAV may navigate to the surveillance location and/or monitoring area by skidding using skid assembly 902 and taking advantage of the ground effect, as described herein. For example, increased lift and decreased aerodynamic drag may be leveraged in a skidding operation near a ground surface to arrive at the surveillance location and/or monitoring areas. By skidding and through use of the ground effect, UAV 110 may be able to preserve energy in comparison to flying to the surveillance location and/or monitoring area. In some cases, a combination of skidding and flying may be performed to navigate to the surveillance location and/or monitoring area. For example, UAV 110 may skid until it reaches an obstacle that cannot be traversed without flying, and in such case, UAV 110 may activate a flight operation to traverse the obstacle. In this regard, UAV 110 may balance a skidding operation with a flight operation in order to optimize propulsion power efficiency.

Once in the surveillance location, UAV 110 may come to rest in the surveillance location and/or monitoring area using landing feet 904a and 904b to remain in contact with a ground floor or other surface. By coming to rest at the surveillance location and/or within the monitoring area, UAV 110 may be able to preserve a remaining battery life. If the surveillance location and/or monitoring area is in or over a body of water, UAV 110 may navigate to the surveillance location and/or monitoring area by flying, skidding, and/or navigating the water, as described herein. In such case, skid assembly 902 may be shaped to form a splayed keel to allow UAV 110 to navigate and skid over water. Such splayed keel may include a roughly horizontal flat splayed surface at a tip of skid member 903, such that lateral motion causes skid member 903 to generate a vertical force substantially opposite gravity and allow airframe assembly 500 to hydroplane over the water surface while traveling forward (e.g., while pitched down slightly to generate forward lateral thrust).

In some embodiments, UAV 110 may determine its location based on location data provided by a GNSS receiver, for example, or by characteristics of wireless communications with base station 130. For example, UAV 110 may use base station 130 as a point of reference for a relative position of UAV 110. For example, UAV 110 may determine that it is in the appropriate surveillance location and/or monitoring area (e.g., when it is floating in water away from a watercraft) by communicating with the watercraft wirelessly and using various characteristics (e.g., time delay, power attenuation) of the wireless communications to determine its distance from the watercraft. In some embodiments, where a plurality of UAVs is assigned several surveillance locations and/or monitoring areas about a watercraft, the UAVs may communicate wirelessly with each other as well as the watercraft to determine their respective locations within a relative coordinate system by using a mesh network including both the UAVs and the watercraft. In some instances, triangulation may be used by base station 130 and/or the UAVs to determine that the UAVs are in the proper surveillance locations and/or monitoring areas.

At block 1004, UAV 110 surveils the surveillance area and/or monitoring area. For example, UAV 110 may be in a surveillance mode at the surveillance location in which UAV 110 may activate one or more environmental sensors to actively monitor the surveillance area and/or monitoring area. For example, UAV 110 may include one or more environmental sensors coupled to or within airframe assembly 500 and related circuitry configured to perform and/or facilitate (e.g., with controller 112) various monitoring tasks such as intelligent video and audio analytics as well as other sensor analytics. In some embodiments, UAV 110 may surveil the surveillance area and/or monitoring area by evaluating image frames captured by a visible light imaging module of UAV 110 to determine that an object has entered an image frame. In a use case, the visible light imaging module may be aligned to capture a field of view of a designated entry or exit direction of a building, surveillance area, and/or monitoring area. UAV 110 may detect when a target or object has entered or exited an area based on images captured of the entry or exit. Other frames of interest may likewise be surveilled in the surveillance area.

In some embodiments, UAV 110 may evaluate thermal image frames captured by a thermal imaging module to determine that a person has entered the environment. In some embodiments, where UAV 110 is stationed at a surveillance location in water, UAV 110 may use an active sonar transducer to emit an acoustic signal or pulse of sound into the water. If an object is in the path of the sound pulse, the sound may bounce off the object and return an echo to the sonar transducer indicating a possible disturbance in the water. In some embodiments, UAV 110 may use a radar to transmit radio signals and evaluate return signals using the Doppler effect, for example, to determine whether there is a disturbance in an environment.

At block 1006, UAV 110 may detect a disturbance. The disturbance may be loiterers, people and/or vehicles intruding into forbidden areas (e.g., buildings, private or protected perimeters), abandonment or removal of objects, and/or foreign animals, objects, vehicles, or approaching vessels. In some cases, the disturbance may be innocuous. For example, a marine animal may be detected even though the marine animal would be innocuous to a watercraft. In some embodiments, UAV 110 may detect the disturbance by evaluating image frames captured by a visible light imaging module of UAV 110 to determine that an object has entered an image frame. In an example use case, the visible light imaging module may be oriented to capture a field of view of a designated entry or exit direction of a building and/or monitoring area. UAV 110 may detect when a target or object has entered or exited an area based on images captured of the entry or exit. Other frames of interest may likewise be focused on by UAV 110 to detect disturbances, such as a blind spot of a surveillance area where stationary surveillance cameras have an obstructed or non-existent view.

In some embodiments, UAV 110 may evaluate thermal image frames captured by a thermal imaging module to determine that an object has entered the environment. For example, thermal radiation identified in the environment may be above a certain specified threshold established by a previous condition of the environment, which may indicate that a foreign object has entered the environment. According to some embodiments, when UAV 110 is situated in water, UAV 110 may use an active sonar transducer to emit an acoustic signal or pulse of sound into the water. If an object is in the path of the sound pulse, the sound may bounce off the object and return an echo to the sonar transducer, which can indicate a possible disturbance in the water. In some embodiments, UAV 110 may use a radar to transmit radio signals and evaluate return signals using the Doppler effect, for example, to detect a disturbance in the environment.

In various embodiments, controller 112 of UAV 110 may be configured to detect a disturbance within the designated monitoring area based, at least in part, on environmental sensor data provided by at least one of the one or more environmental sensors. The one or more environmental sensors may include a visible spectrum imaging module and/or a thermal imaging module; and the detecting the disturbance in the environment is based, at least in part, on visible spectrum image data and/or thermal image data provided by the visible spectrum imaging module and/or the thermal imaging module.

At block 1008, UAV 110 may notify of the disturbance. For example, UAV 110 and additional UAVs surveilling the environment may be in wireless communication with base station 130. Base station 130 may be a mobile user device in some embodiments. In other embodiments, base station 130 may be one or more servers. Base station 130 may be able to provide a notification to a user (e.g., via a user device) of the detected disturbance. For example, base station 130 may activate an alarm associated with the environment, send an electronic communication (e.g., email, text message, phone call, etc.) to devices associated with a team of users (e.g., security personnel team). In various embodiments, controller 112 of UAV 110 may be configured to generate a disturbance notification based, at least in part, on a portion of the environmental sensor data associated with the detected disturbance, as identified in block 1106, and transmit the generated disturbance notification to base station 130.

At block 1010, UAV 110 may investigate the disturbance to assess a level of security risk of the disturbance. For example, UAV 110 may investigate a disturbance in response to detecting the disturbance. In various embodiments, one or more sensors may provide a direction or navigational route in which UAV 110 may travel to further investigate the disturbance. Once UAV 110 surveys the location where the disturbance was detected, it may identify whether the disturbance is innocuous or a risk (e.g., security risk). For example, UAV 110 may compare a captured visible image frame that includes the disturbance to base reference image frames that have a person therein to determine that a person is present in the captured visible image frame. Additionally, a thermal imaging module may be used to capture a thermal image of the disturbance to determine whether the disturbance has an infrared signature corresponding to a human. UAV 110 may be programmed to provide an updated notification if the disturbance is determined to pose a security risk. In this regard, a first notification may indicate that a disturbance was detected, and a second notification may indicate that the disturbance has been identified as an unknown person or thing. In some embodiments, the second notification may indicate that the disturbance was investigated and found to be innocuous.

For example, the visible light imaging module or thermal imaging module may be used to determine that the disturbance was a mouse or other presence identified as innocuous. Thus, in that case, after the first notification UAV 110 may provide a second notification indicating that the disturbance was only a mouse. In this regard, a shape and infrared signature of the object may be evaluated to determine a security risk of the object. For example, UAV 110 may compare infrared signatures of disturbances to stored reference infrared signatures of people, animals, or other things to evaluate the disturbance. In various embodiments, video and/or audio captured by UAV 110 may be sent to base station 130 to allow for a user to determine whether the disturbance poses a security risk. The user may provide further instructions to UAV 110 as to whether to monitor the disturbance further or ignore the disturbance and continue surveilling as normal.

At block 1012, UAV 110 monitors the disturbance. For example, if UAV 110 determines that the disturbance poses a security risk, UAV 110 may monitor the disturbance. Monitoring the disturbance may include moving into a better location to observe the disturbance or following the disturbance to further understand the severity of its security risk. In some embodiments, UAV 110 may have a plurality of levels associated with the extent to which UAV 110 monitors the disturbance. For example, disturbances with greater security risk may be monitored more closely while disturbances with less security risk may be monitored less closely. In one embodiment, if the disturbance is identified as an intruder, UAV 110 may activate a high level of monitoring. On the other hand, if the disturbance is identified as innocuous such as a small animal, UAV 110 may activate a low level or monitoring or even ignore the disturbance. In related embodiments, controller 112 may be configured to control propulsion system 124 and/or the one or more environmental sensors of UAV 110 to maintain a monitoring proximity to a detected disturbance and/or monitor a position or other characteristic of the disturbance within a designated monitoring area over a period of time and/or as the disturbance travels through the designated monitoring area, as described herein. In specific embodiments, such controlling propulsion system 124 of UAV 110 to navigate UAV 110 within the designated monitoring area comprises navigating UAV 110 to a surveillance location within the designated monitoring area.

In various embodiments, UAV 110 may be configured to skid and/or fly in a battery efficient manner while monitoring the disturbance. For example, UAV 110 may skid across the environmental surface, maintaining a safe distance away from an intruder so as to be able to view or sense the intruder's actions while staying beyond striking distance (e.g., a predetermined distance) from the intruder. According to some embodiments, UAV 110 may determine that UAV 110 must transition to a flying mode in order to closely monitor the intruder. For example, UAV 110 may skid as it follows and monitors the intruder, but when the intruder changes elevation such as by descending or ascending upon stairs, UAV 110 may transition to a flying mode of operation to be able to continue to monitor the intruder. UAV 110 may maintain a visual line of sight on the intruder while reporting back to security personnel the current location of the intruder (e.g., the intruder's location relative to UAV 110 own location), visible images of the intruder, recorded audio of the intruder, and other data gathered by UAV 110 about the intruder. It is noted that, as used herein, "intruder," "object," "target," "disturbance," and so forth are used herein for illustrative purposes and may generally be interchangeable to refer to a presence identified in an environment.

Figure 11:
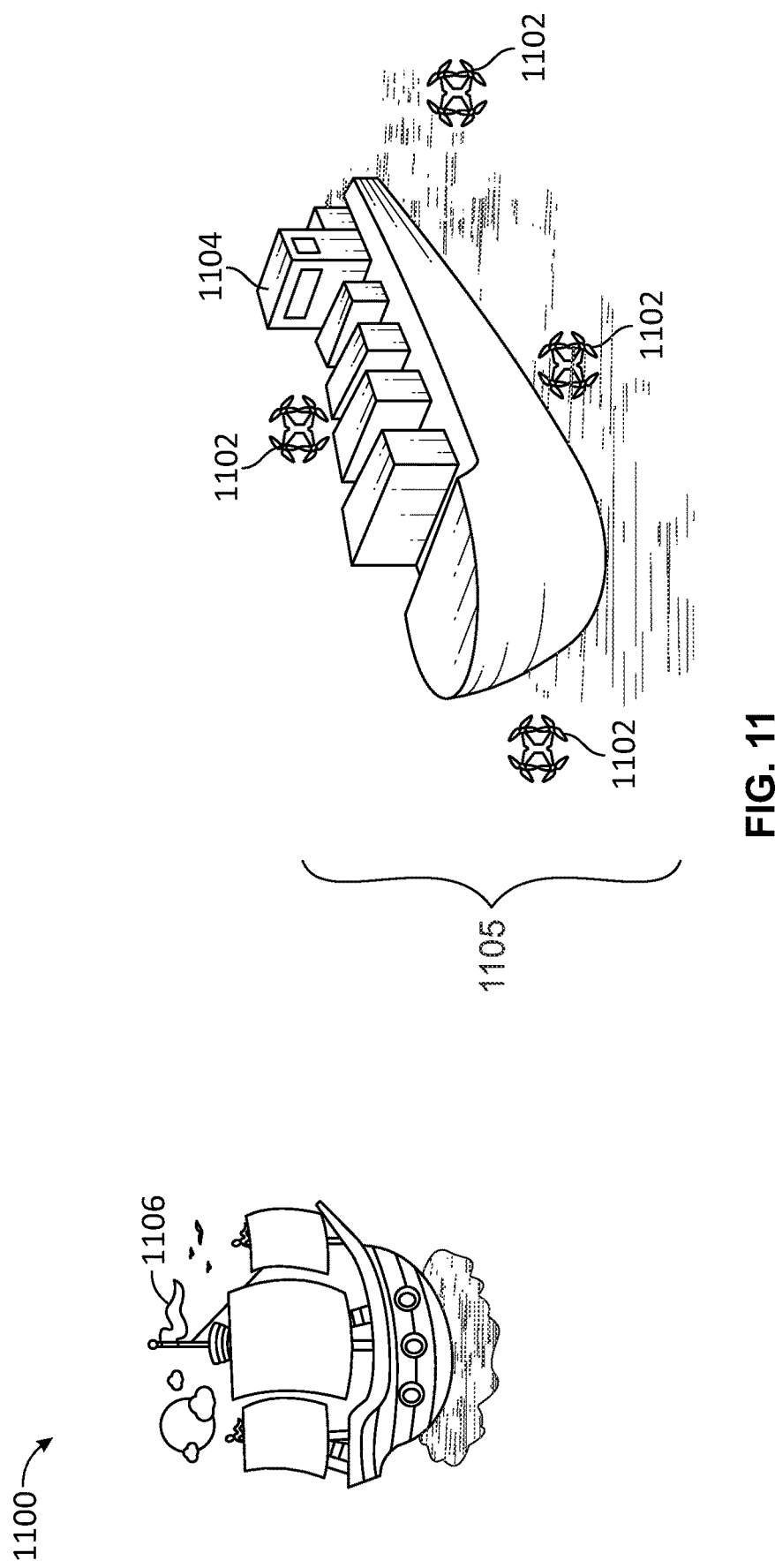
FIG. 11 illustrates an example environment in which UAVs may surveil in accordance with one or more embodiments of the disclosure.

FIG. 11 illustrates an example environment 1100 in which UAVs 1102 may surveil. As shown in FIG. 11, UAVs 1102 may be assigned to various surveillance locations and/or designated monitoring areas about watercraft 1104. UAVs 1102 may surveil or designated monitoring areas/environment 1100 according to process 1000 discussed above. For example, during a night shift, UAVs 1102 may navigate from their battery charging stations to respective surveillance locations and/or designated monitoring areas about watercraft 1104. UAVs 1102 may surveil the surveillance areas and/or designated monitoring areas about the watercraft 1104 while security personnel onboard watercraft 1104 monitor environment 1100 from watercraft 1104. As an illustrative example, UAVs 1102 may provide monitor feeds to watercraft 1104 such as video, images, audio, radar tracking results, sonar results, etc. so that security personnel onboard watercraft 1104 can expand their surveillance of designated monitoring areas about watercraft 1104.

In one embodiment, one or more of UAVs 1102 may detect a disturbance 1106 in environment 1100. For example, disturbance 1106 may be another watercraft. Upon detecting disturbance 1106, UAVs 1102 may notify watercraft 1104 (e.g., a base station or other central device on watercraft 1104) of the detected disturbance 1106. Upon notification of disturbance 1106, watercraft 1104 may sound an alarm for security personnel onboard watercraft 1104. In some cases, watercraft 1104 may send text messages, emails or make phone calls to security personnel associated with watercraft 1104 to alert them of disturbance 1106.

After notifying watercraft 1104 of disturbance 1106, UAVs 1102 may investigate the disturbance further. For example, UAVs 1102 may capture video or images of disturbance 1106 (e.g., using a visible light imaging module or thermal imaging module), capture audio of disturbance 1106 (e.g., using microphones), and/or determine a distance and velocity of disturbance 1106 (e.g., using a radar device and/or sonar device). UAVs 1102 may continue to monitor disturbance 1106 and provide further updates to watercraft 1104 depending on an estimated security risk of disturbance 1106. For example, if UAV 1102 determines that one or more observations gathered from investigating disturbance 1106 indicates that disturbance 1106 may be a security risk, UAVs 1102 may escalate to a relatively high level of monitoring in which UAVs 1102 closely follow disturbance 1106 and communicate observations of disturbance 1106 back to watercraft 1104 (e.g., base station 120 onboard watercraft 1104).

Figure 12:
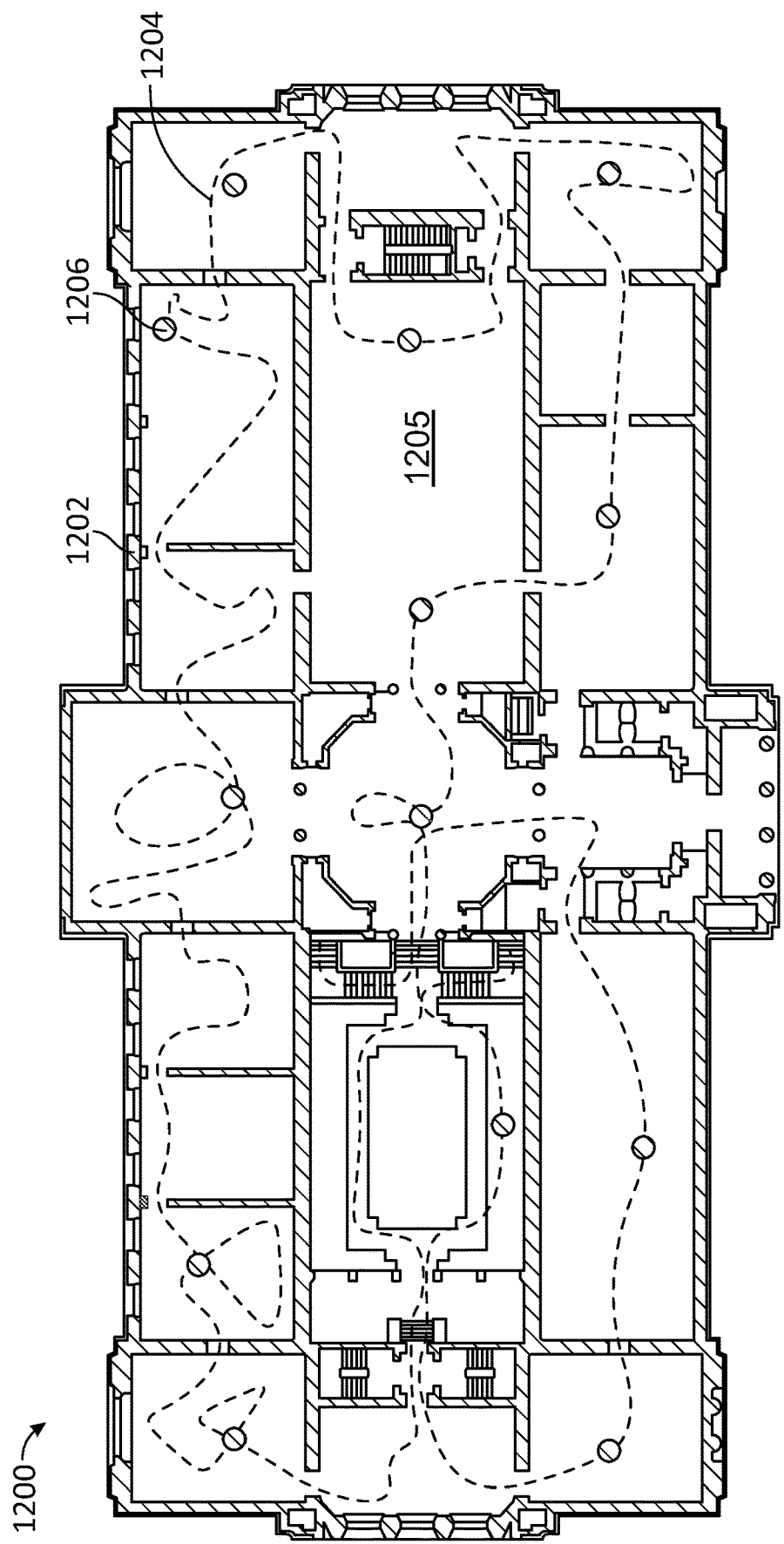
FIG. 12 illustrates an example environment in which a UAV has navigated in accordance with one or more embodiments of the disclosure.

FIG. 12 illustrates an example environment 1200 in which a UAV has been designated to monitor. As shown in FIG. 12, UAV 110 is configured to navigate an interior of a building 1202 along path 1204 and according to or pausing at various surveillance locations 1206 while employing a combination of skidding and flying to increase overall propulsion power efficiency, as described herein. Skidding may include using skid assembly 902 and the resulting ground effect to fly close to a ground surface within building 1202 such that UAV 110 experiences increased lift and decreased aerodynamic draft. Skid assembly 902 may be used to maintain operational flight of the UAV at an appropriate level above the ground surface to take full advantage of such ground effect. At each surveillance location 1206, UAV 110 may be configured to pause and/or land, for example, and/or reorient in place (e.g., pirouette) to scan the environment adjacent such surveillance location 1206 (e.g., with in the designated monitoring area/interior of building 1202), using one or more environmental sensors, for one or more disturbances and/or different types of disturbances, as described herein. In some embodiments, skid assembly 902 may include various sensors that may be used to monitor a surface within building 1202 for various substances. For example, skid assembly 902 may include a methane sensing device configured to sense methane emissions as the UAV skids along a surface. In some embodiments, the UAV may be configured to detect contamination along pathway 1204 of building interior 1202. Other environments are contemplated for use of a UAV implemented with skid assembly 902.

As described herein, embodiments may be configured provide locomotion related structures, systems, and methods for improving power efficiency of a UAV as well as additional techniques for navigating relatively narrow environmental passageways and spaces. For example, in some embodiments, a UAV may include an airframe assembly configured to support/and or protect a propulsion system for the UAV, where the airframe assembly includes a cylindrical rolling guard disposed about, fixed relative to, and/or aligned substantially within a rotor plane of the UAV. Such rotor plane may be the plane in which all rotor blades associated with the propulsion system of the UAV rotate (e.g., where all rotors are substantially aligned parallel to each other and/or corresponding rotor blades all rotate in substantially the same plane), for example, or may be the spatial average of the rotor planes of each individual rotor associated with the propulsion system of the UAV (e.g., where the rotors are not aligned parallel to each other and/or corresponding rotor blades do not all rotate in substantially the same plane). The cylindrical rolling guard may be configured to allow the UAV to roll along an environmental surface adjoining the cylindrical rolling guard. A UAS including the UAV may be configured to maneuver the UAV to place the cylindrical rolling guard in contact with the environmental surface and control the propulsion system of the UAV to roll the UAV along the environmental surface while the cylindrical rolling guard is in contact with the environmental surface. In various embodiments, the UAS may accept operator input controlling aspects of such maneuvers, for example, or the UAV may be configured to autopilot itself according to a flight plan or path that requires such maneuvers.

For example, the UAS and/or UAV may be configured to determine that the UAV, when in a horizontal orientation (e.g., where the rotor plan is substantially horizontal/perpendicular to gravity), is unable to fit through a relatively narrow vertical passageway or flight channel (e.g., narrower than an operational width of the UAV) in an operating environment and continue along a designated flight path or navigational path, for example, or to maneuver behind cover (e.g., to reduce or eliminate visibility of the UAV). In response to determining that the UAV is unable to fly through the relatively narrow flight channel while in a traditional horizontal orientation, the UAS or UAV may maneuver the UAV from the horizontal orientation to a vertical orientation (e.g., where the rotor plane is substantially vertical/parallel to gravity) in which the cylindrical rolling guard is placed in contact with the environmental surface to allow the UAV to fit into and roll vertically through the relatively narrow flight channel. For example, the UAS or UAV may be configured to control each rotor of the propulsion system independently to generate a thrust and/or adjust a torque for each rotor, which may in aggregate generate a torque differential across the UAV sufficient to orient the UAV vertically and roll the UAV along the environmental surface while the cylindrical rolling guard is in contact with the environmental surface to transit through or below the relatively narrow flight channel. Accordingly, embodiments are able to traverse operating environments otherwise impassable while in horizontal flight. Moreover, the power expended to orient and roll the UAV through the relatively narrow flight channel can be substantially less than the power needed to transit a similar horizontal distance while in flight, and so embodiments can increase the operational flexibility of the UAS and/or UAVs of the UAS.

Figure 13A:
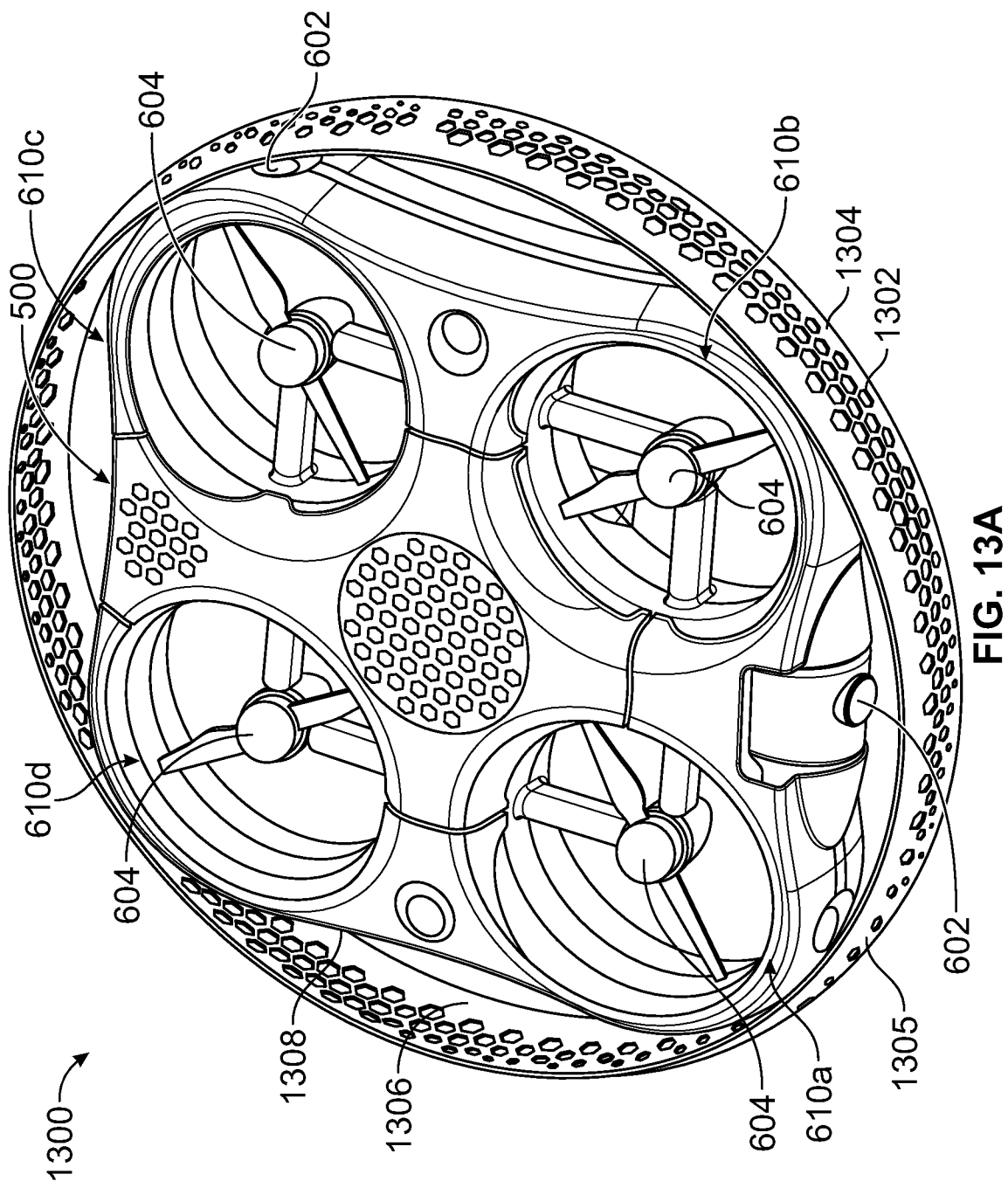
FIG. 13A illustrates a top perspective view of a UAV that includes a rolling guard in accordance with one or more embodiments of the disclosure.

FIG. 13A illustrates a top perspective view of a UAV 1300 in accordance with an embodiment of the present disclosure. For example, UAV 1300 may be, may be part of, or may include mobile platform 110 of FIG. 1. In the embodiment shown in FIG. 13A, UAV 1300 includes a cylindrical rolling guard 1302 disposed about, fixed relative to, and/or aligned substantially within a rotor plane of rotor assemblies 604 for UAV 1300. In one embodiment, rolling guard 1302 may include perforations 1304 that are positioned, sized, and/or aligned with one or more sensors 602 (e.g., imaging modules 142) coupled to and/or within airframe assembly 500 to provide each sensor 602 with a field of view at least partially through perforations 1304 that overlaps with at least a portion of the operating environment (e.g., including any environmental surfaces in view of UAV 1300 and/or sensors 602). Sensors 602 may include a humidity sensor, a wind and/or water temperature sensor, a barometer, an altimeter, a radar system, a proximity sensor, a visible spectrum camera or infrared camera (e.g., imaging modules), an irradiance detector, stereoscopic cameras, and/or other environmental sensors providing measurements and/or other sensor signals that can be displayed to a user and/or used by other devices of UAV 1300 to provide operational control of UAV 1300. For example, the various sensors 602 may be used by UAV 1300 to assist in navigating UAV 1300 about an environment and traversing narrow flight channels in the environment. As another example, the various sensors 602 may assist in determining when UAV 1300 should maneuver from a flying or hovering operation to a rolling operation such as when an operational width of UAV 1300 (e.g., its largest lateral and/or longitudinal dimension) does not allow UAV 1300 to enter a narrow opening or flight channel while flying along a particular flight path.

In some embodiments, rolling guard 1302 may have an inner surface 1306 configured to complement an exterior surface 1308 of airframe assembly 500 of UAV 1300 to facilitate attaching rolling guard 1302 to airframe assembly 500. In some cases, rolling guard 1302 may have a concave cross-section to allow the inner surface 1306 to complement an exterior surface 1308 of airframe assembly 500. Rolling guard 1302 may also have a concave outer surface 1305 to facilitate rolling of UAV 1300. In other cases, rolling guard 1302 may have a ring shape and ring-shaped cross-section or a tire shape and tire-shaped cross-section. Various other shapes and cross-sections for rolling guard 1302 may be implemented to reduce or minimize rolling resistance (e.g., rolling friction, rolling drag) when UAV 1300 is rolling via rolling guard 1302. According to one embodiment, rolling guard 1302 may include a non-slip texture disposed at least partially along outer surface 1305 (e.g., surfaces that come in contact with environmental surfaces) to provide lateral and/or longitudinal traction between cylindrical rolling guard 1302 and environmental surfaces as UAV 1300 rolls along the environmental surfaces.

According to one embodiment, rolling guard 1302 may be formed as a unitary or permanently coupled part of airframe assembly 500. In other embodiments, rolling guard 1302 may be removably attachable to airframe assembly 500. For example, UAV 1300 may be employed for a mission that requires the ability to land and park in narrow gaps where normal UAV landing procedures would not be possible or may be detectable. By attaching rolling guard 1302 to UAV 1300, UAV 1300 may be able to covertly land and park in the narrow gaps during the mission via rolling, as described herein. Moreover, hovering requires generating thrust that exceeds a total weight of UAV 1300 and further requires all rotors to be actively engaged. Conversely, rolling may be performed with activation of as few as two rotors to produce sufficient aggregate torque to roll UAV 1300. Thus, by attaching rolling guard 1302 to airframe assembly 500 of UAV 1300 and rolling during a portion or all of a mission, UAV 1300 may consume relatively less power in comparison to completing an entire mission by flying. In some implementations, rolling guard 1302 may be selectively attached to UAV 1300 for indoor and/or covert missions, and rolling guard 1302 may then be removed to increase range and endurance for outdoor missions.

Figure 13B:
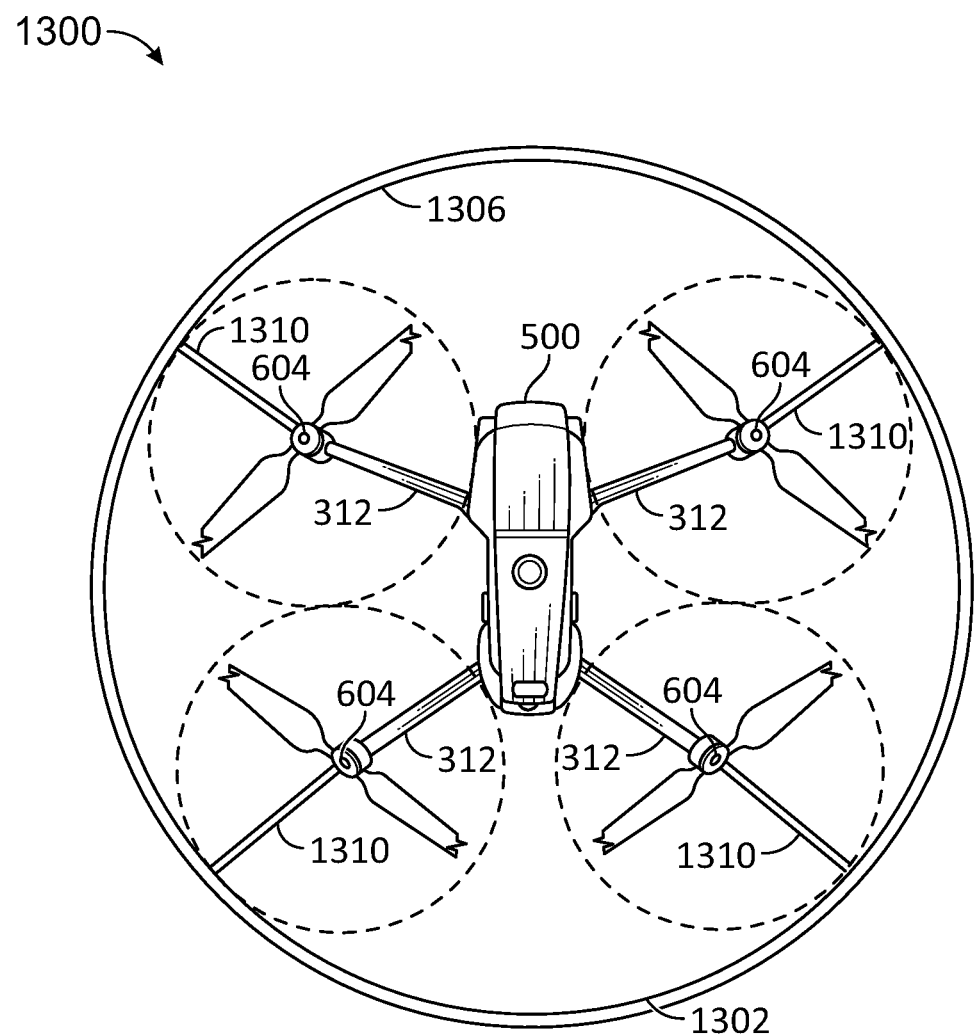
FIG. 13B illustrates a top view of a UAV that includes a rolling guard in accordance with one or more embodiments of the disclosure.

FIG. 13B illustrates a top view of a UAV 1300 in accordance with an embodiment of the present disclosure. In the embodiment shown in FIG. 13B, rolling guard 1302 may be attached to and/or form a part of airframe assembly 500 of UAV 1300 at ends of airframe assembly arms 1310. In some embodiments, airframe assembly arms 1310 may extend from rotor mount supports 312 as unitary components of mount supports 312. In other embodiments, airframe assembly arms 1310 may be part of rolling guard 1302 and extend from inner surface 1306 of rolling guard 1302 to allow rolling guard 1302 to removably attach to airframe assembly 500 via a physical connection between the mount supports 312 and airframe assembly arms 1310. Airframe assembly arms 1310 may extend sufficiently to allow for rotors 604 to freely rotate without contacting rolling guard 1302 as indicated by the dashed circles depicted in FIG. 13B. In embodiments where airframe assembly arms 1310 extend from mount supports 312, rolling guard 1302 may be attached to airframe assembly arms 1310 using fastening devices such as attachment brackets, clamps, clips, snap fasteners, bolts, and so forth. Similarly, in embodiments where airframe assembly arms 1310 extend from inner surface 1306 of rolling guard 1302, airframe assembly arms 1310 may be attached to mount supports 312 using fastening devices to attach rolling guard 1302 to airframe assembly 500.

Figure 14A:
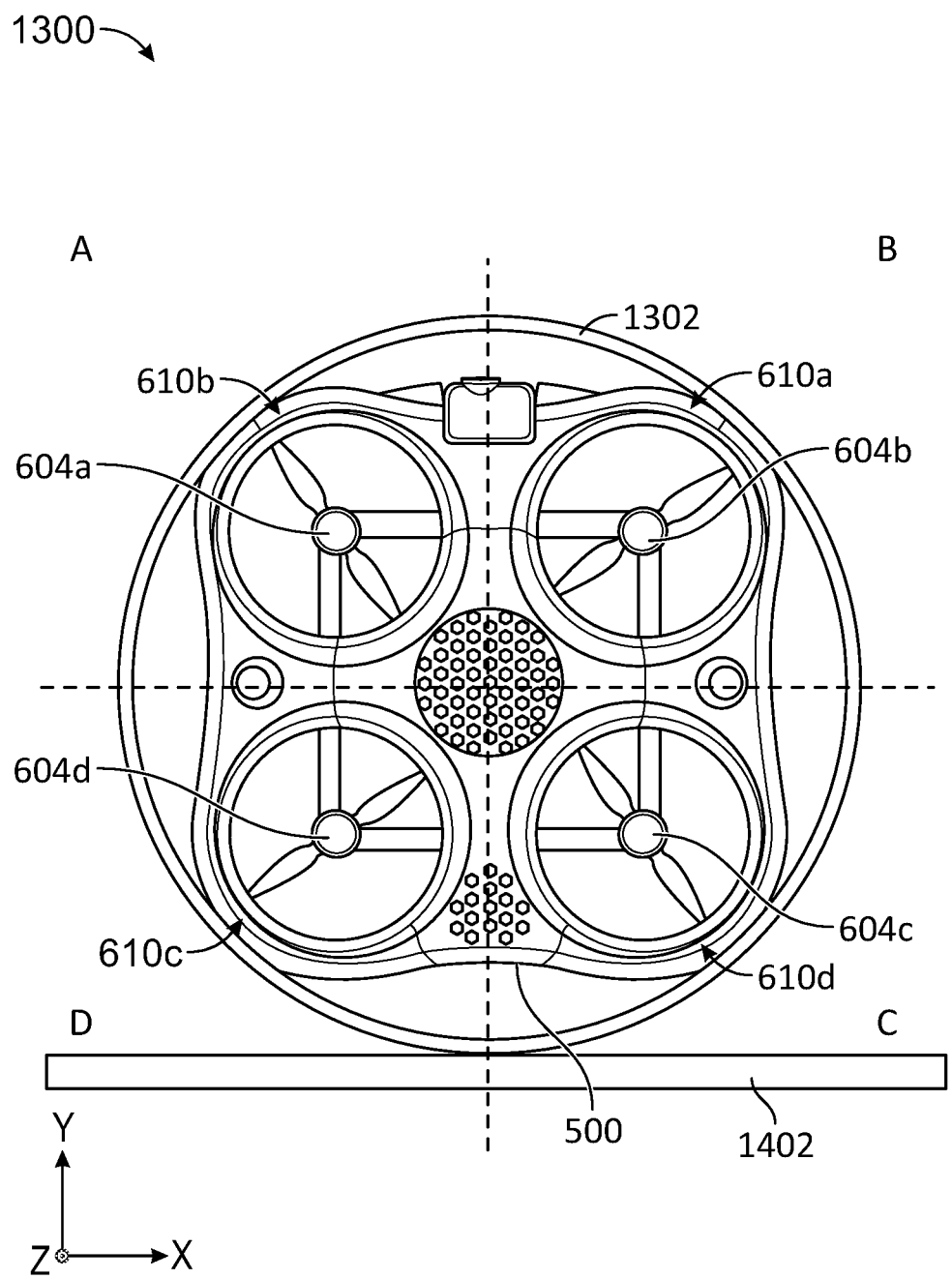
FIG. 14A illustrates a top view of a UAV that includes a rolling guard in accordance with one or more embodiments of the disclosure.

FIG. 14A illustrates a top view of a UAV 1300 in accordance with an embodiment of the present disclosure. UAV 1300 may have a vertical axis that is parallel to the Z-axis shown in FIG. 14A and may have a rotor plane in the XY-plane shown in FIG. 14A. In accordance with various embodiments, control authority of each independent rotor 604a-d may change cyclically during a rolling operation of UAV 1300. For example, rotors 604a and 604b corresponding to the "A" and "B" positions may have the most authority to balance UAV 1300 in an upright rolling or vertical orientation. A torque differential between rotors 604a and 604c corresponding to the "A" and "C" positions (e.g., a first diagonal opposing pair of rotors) and rotors 604b and 604d corresponding to the "B" and "D" positions (e.g., a second diagonal opposing pair of rotors) may produce rolling to the left or right of the page (i.e., in the −X and +X directions). A thrust differential between rotors 604a and 604D corresponding to the "A" and "D" positions (e.g., a first adjacent pair of rotors) and rotors 604b and 604c (e.g., a second adjacent pair of rotors) corresponding to the "B" and "C" positions may turn UAV 1300 in and out of the XY-plane, to provide and/or adjust a roll heading for UAV 1300, as shown.

Figure 14B:
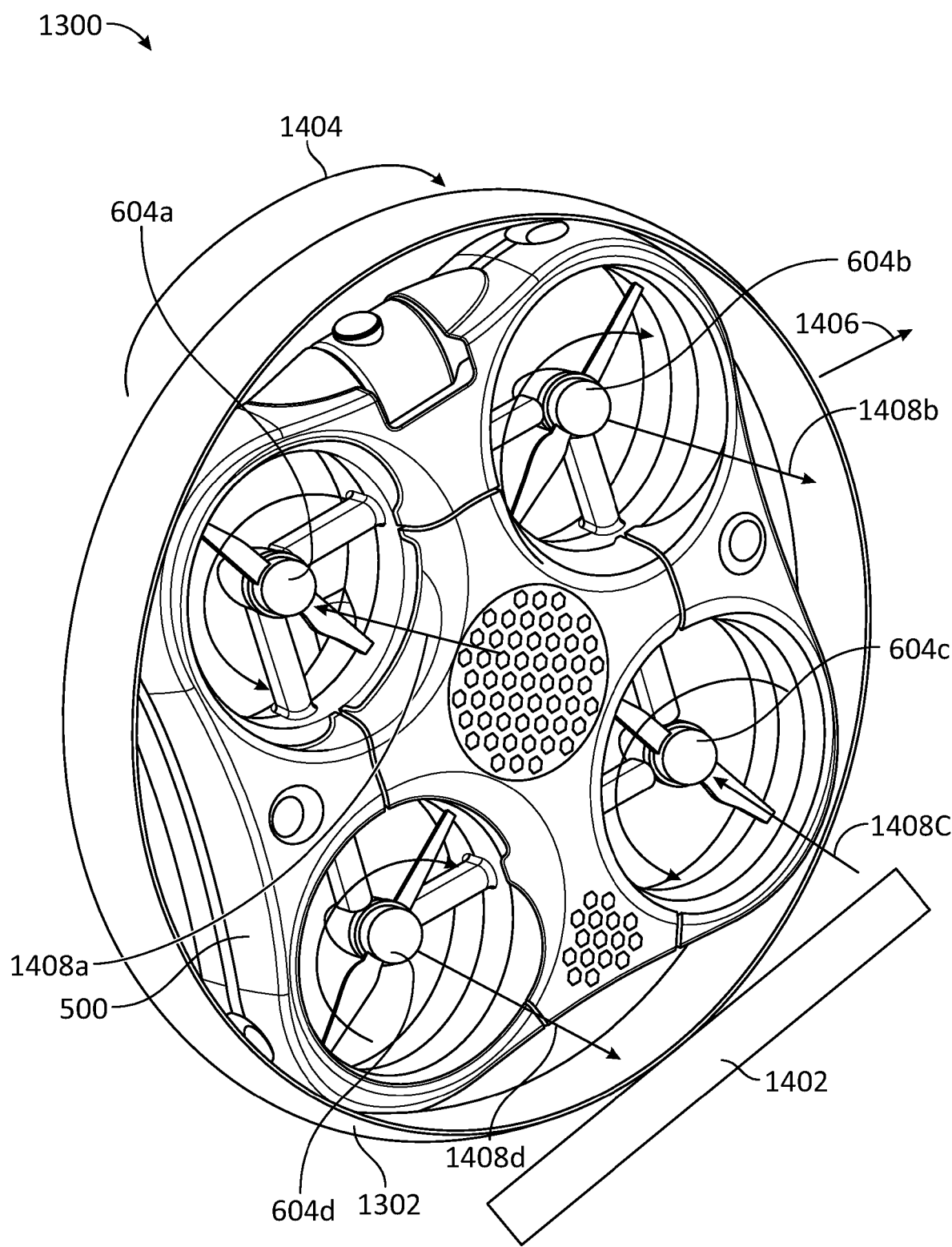
FIG. 14B illustrates a view of a UAV that includes a rolling guard in accordance with one or more embodiments of the disclosure.

Referring to FIG. 14B, when UAV 1300 is rolling (shown by arrow 1404) along an environmental surface 1402, rolling guard 1302 is in contact with environmental surface 1402. UAV 1300 may control reversible motor controllers to produce torque required for rolling 1404, balancing, and steering UAV 1300. As UAV 1300 rolls in direction 1406, rotors 604 cyclically change their authority between controlling motion around three rotational axes (e.g., rolling 1404 about the Z-axis of UAV 1300, and balancing and steering about the X and Y-axes of UAV 1300 as shown in FIG. 14A). For example, as shown in the embodiment in FIG. 14B, rotors 604b and 604d may rotate clockwise and increase in their revolutions per minute, thus increasing thrust 1408b and 1408d and providing their corresponding reaction torque. Rotors 604a and 604c may rotate counter-clockwise and may decrease in their revolutions per minute, thus decreasing thrust 1408a and 1408c and providing their corresponding reaction torque. A total thrust may remain the same to keep UAV 1300 balanced, however, a generated torque differential may produce rolling motion 1404 in direction 1406 while rolling guard 1302 of UAV 1300 is in contact with environmental surface 1402. In this regard, operation of pairs of counter-rotating rotors that could be used produce a torque differential for yawing UAV 1300 during normal flight, for example, may also be used to roll 1404 UAV 1300, as shown.

Figure 14C:
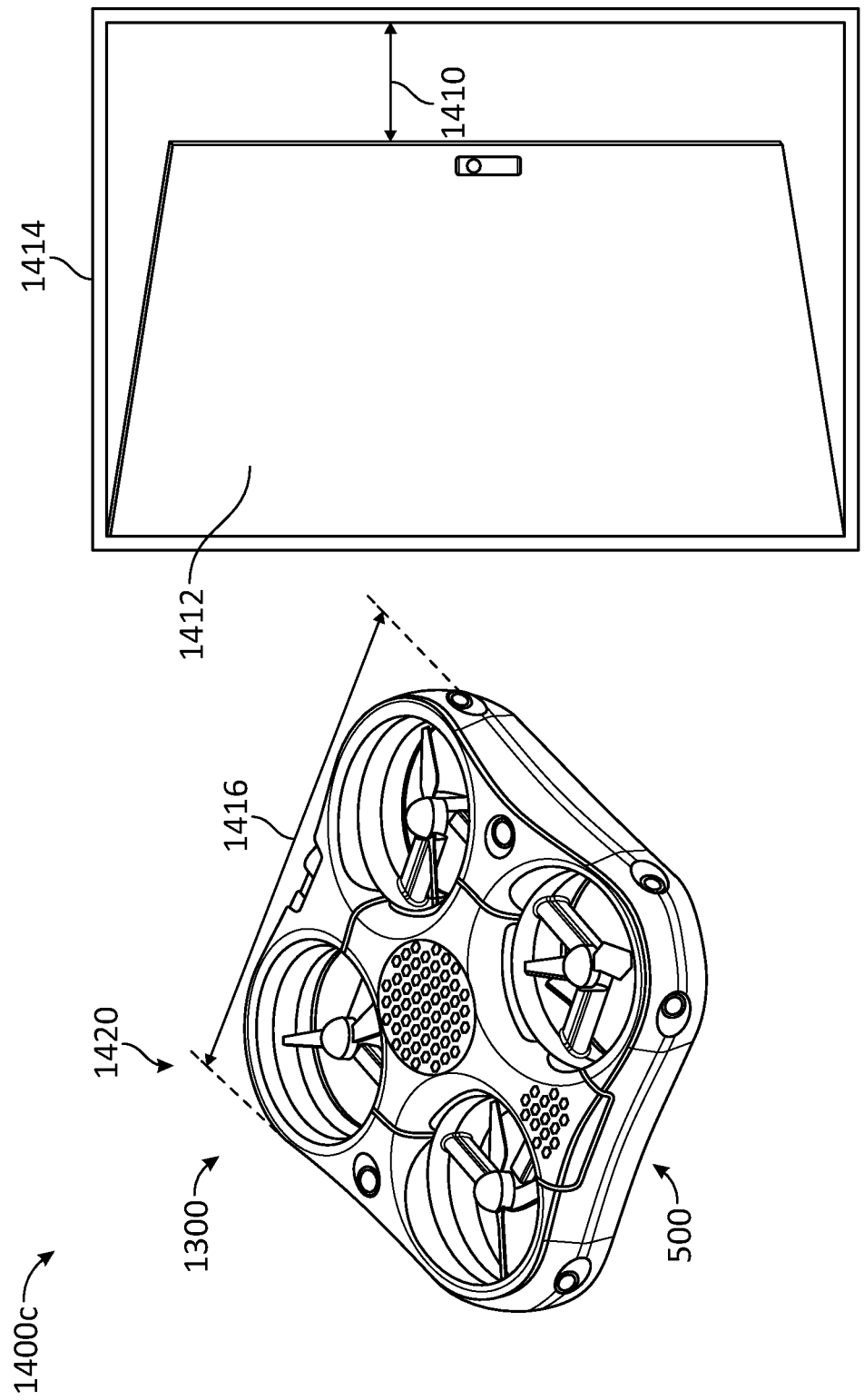
FIG. 14C illustrates a view of a UAV in an example environment in accordance with one or more embodiments of the disclosure.
Figure 14D:
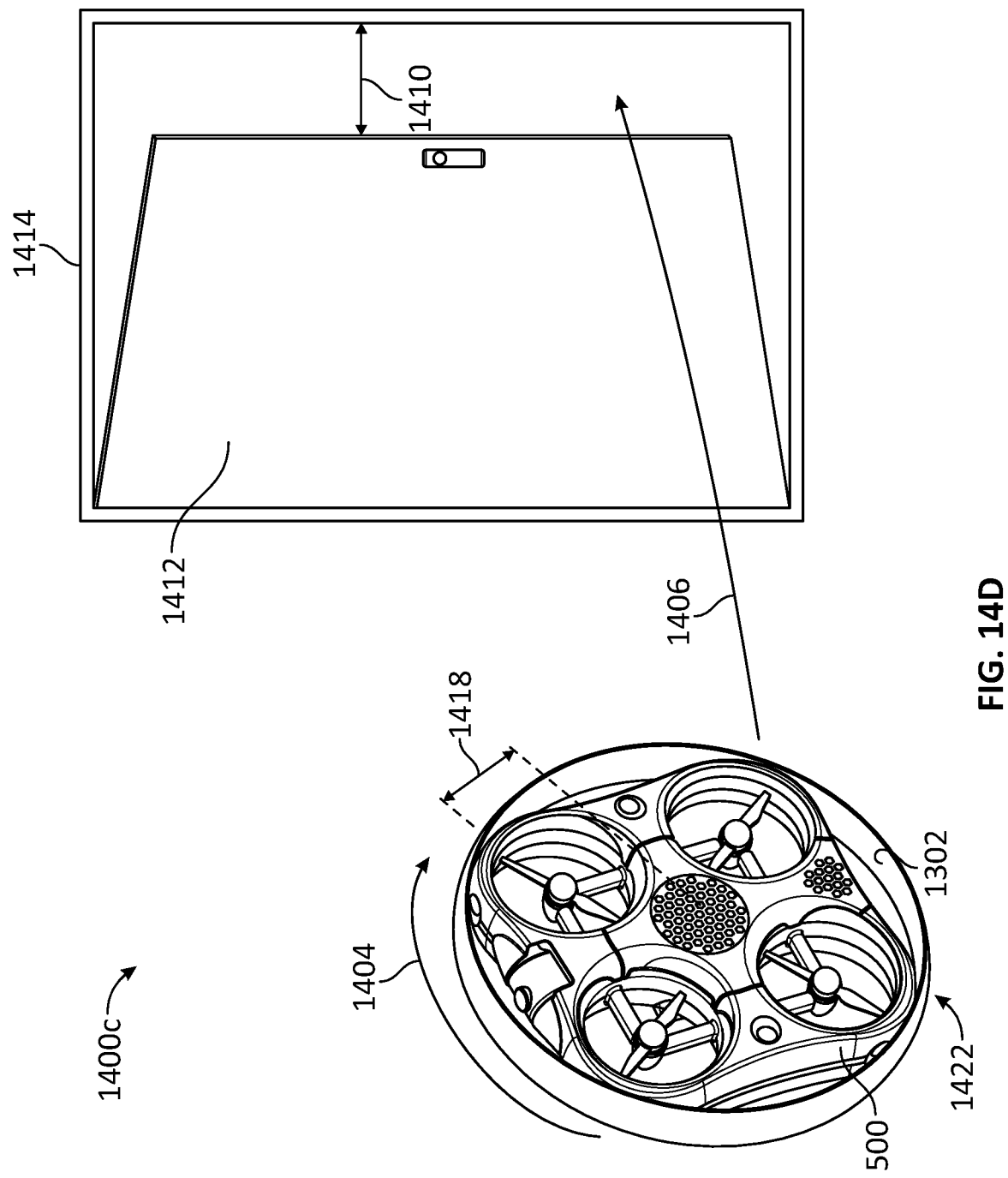
FIG. 14D illustrates a view of a UAV that includes a rolling guard and is rolling about the example environment of FIG. 14C.

FIGS. 14C and 14D illustrate an example operating environment 1400c in which UAV 1300 may operate in accordance with one or more embodiments of the present disclosure. Operating environment 1400c may include a relatively narrow vertical opening or flight channel 1410 such as between an ajar door 1412 and a door frame 1414. The span 1416 (e.g., operational width) of UAV 1300 in a horizontal orientation 1420 or substantially horizontal orientation such as when hovering or flying may be too large for UAV 1300 to pass through flight channel 1410 while in horizontal orientation 1420. However, as shown in FIG. 14D, the span 1418 of UAV 1300 having a rolling guard 1302 and in a vertical orientation 1422 or substantially vertical orientation (e.g., a rolling orientation), such as when rolling 1404, may allow for UAV 1300 to roll through or beneath flight channel 1410 untouched or with minimal contact with the boundaries of the narrow opening 1410. In various embodiments, the rolling orientation may be vertical or non-vertical, depending on rolling characteristics of an underlying environmental surface, for example, and/or depending on the shape, width, and/or orientation of flight channel 1410. In some embodiments, the rolling orientation may include a roll heading, as described herein.

Figure 15:
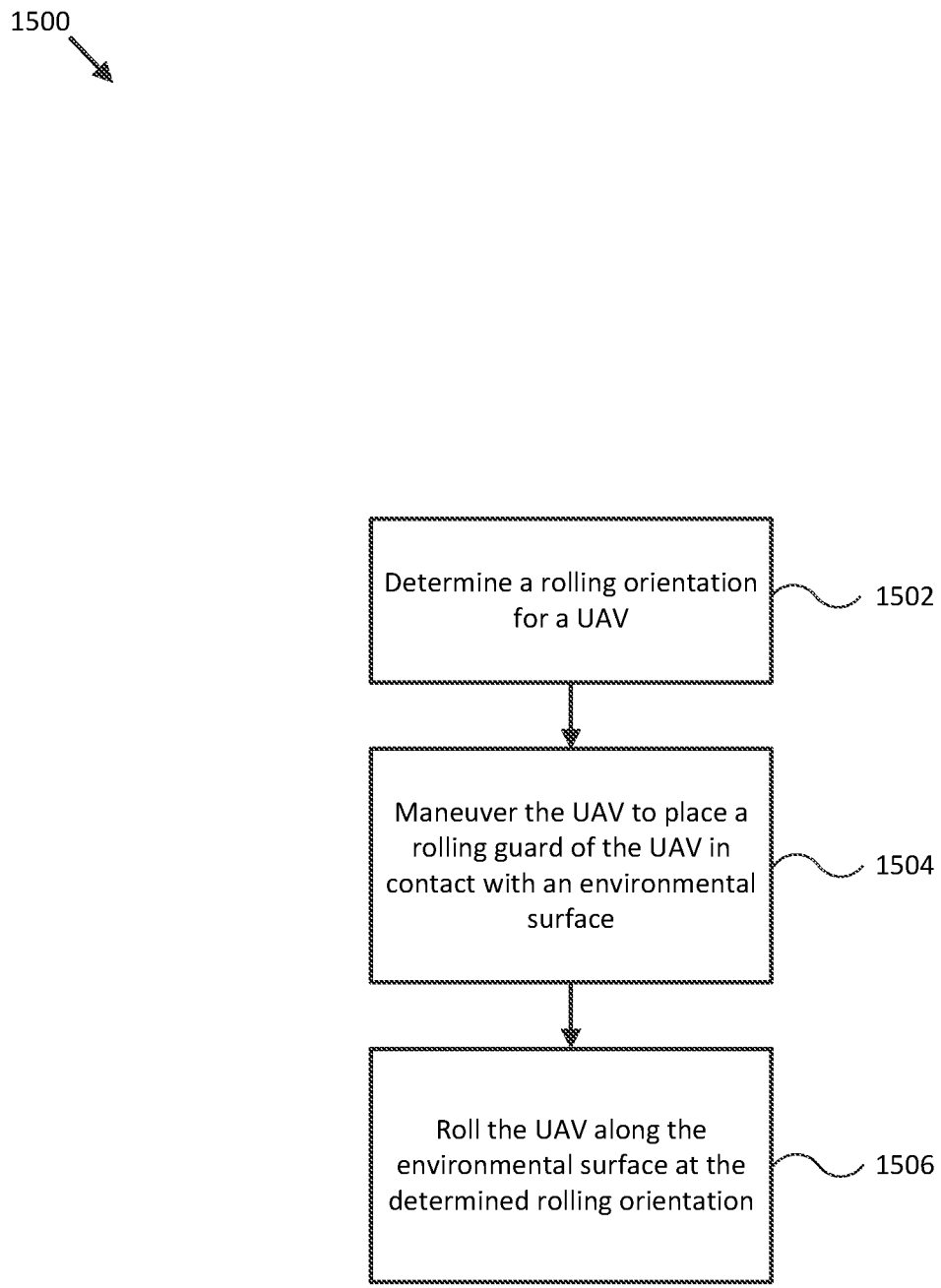
FIG. 15 illustrates a flow diagram of a process for operating a UAV in accordance with one or more embodiments of the disclosure.

FIG. 15 illustrates a flow diagram of a process 1500 for operating a UAV 1300 by rolling motion in accordance with embodiments of the disclosure. It should be appreciated that any step, sub-step, sub-process, or block of process 1500 may be performed in an order or arrangement different from the embodiments illustrated by FIG. 15. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 1500 is described with reference to systems, processes, control loops, and images described in reference to FIGS. 1-14D, process 1500 may be performed by other systems different from those systems and according to different processes, control loops, and images and including a different selection of electronic devices, sensors, assemblies, mobile structures, and/or mobile structure attributes, for example. It should be appreciated that any step, sub-step, sub-process, or block of process 1500 may be performed by UAV 1300 (e.g., a logic device and/or controller of UAV 1300) and/or a base station (e.g., base station 130) in communication with and/or controlling UAV 1300.

At block 1502, a rolling orientation for UAV 1300 is determined. For example, controller 112, base station 130, and/or other elements of system 100 may be configured to determine a rolling orientation for UAV 1300 corresponding to at least a portion of an environmental surface in view of or otherwise within an operating environment associated with UAV 1300. In some embodiments, system 100 may be configured to receive image data corresponding to the at least portion of the environmental surface from imaging system 140, determine one or more rolling characteristics of the at least portion of the environmental surface based, at least in part, on the received image data, and determine the rolling orientation for the UAV based, at least in part, on the determined one or more rolling characteristics of the at least portion of the environmental surface. For example, such rolling characteristics may include a surface type or estimated grip of the environmental surface, a grade or slope of the environmental surface, a target rolling path across the environmental surface, an estimated flight channel width associated with the at least portion of the environmental surface, and/or variations in and/or combinations of these characteristics. A rolling orientation may be determined to minimize a power output through a rolling operation, for example, to orient UAV 1300 to fit a particular flight channel (e.g., a non-vertical flight channel), to orient UAV 1300 to grip a particular environmental surface, and/or to compensate for other environmental conditions, as described herein.

In some embodiments, controller 112 of UAV 1300 may be configured to determine such rolling orientation without communication to base station 140, for example, and essentially autopilot UAV 1300 according to a preselected flight path or monitoring or survey directive. In other embodiments, controller 112 may be configured to provide sensor data (e.g., image data) to base station 140, for example, and receive the rolling orientation from base station 140 (e.g., where base station 140 evaluates the rolling characteristics and/or any environmental conditions, determines the appropriate rolling orientation for UAV 1300, and communicates the rolling orientation to UAV 1300 in the form of control signal to be relayed to propulsion system 124, for example, or in the form of an orientation value for UAV 1300, where controller 112 controls operation of propulsion system 124 according to the received rolling orientation).

At block 1504, UAV 1300 is maneuvered to place rolling guard 1302 in contact with environmental surface 1402. For example, controller 112, base station 130, and/or other elements of system 100 may be configured to maneuver UAV 1300 to place cylindrical rolling guard 1302 of airframe assembly 500 in contact with at least a portion of environmental surface 1402. In general, environmental surface 1402 may be horizontal, inclined, declined, or vertical. In some embodiments, UAV 1300 and/or system 100 may place cylindrical rolling guard 1302 in contact with environmental surface 1402 subsequent to determining that UAV 1300 is unable to fit through a relatively flight channel along a flight or navigational path or fit into a narrow space for cover while UAV 1300 is in horizontal orientation 1420. When UAV 1300 and/or system 100 places cylindrical rolling guard 1302 in contact with environmental surface 1402, UAV 1300 may be in a vertical rolling orientation, for example, or in a non-vertical rolling orientation, as described herein.

In some embodiments, UAV 1300 and/or system 100 may use sensors 602 (e.g., imaging modules 142 of imaging system 140) to determine that UAV 1300 is unable to fit through a relatively narrow opening or flight channel in an operating environment when UAV 1300 is in horizontal orientation 1420. For example, sensors 602 may include stereoscopic cameras that UAV 1300 may use to capture an image of the narrow opening or flight channel and, based on the captured image, determine a channel width (e.g., a horizontal channel width) of the relatively narrow flight channel. The determined measurement of the narrow opening or flight channel may be compared to a known operational width 1416 of UAV 1300 in the horizontal orientation 1420 to determine that UAV 1300 is unable to fit through the narrow opening or space while UAV 1300 is in horizontal orientation 1420. UAV 1300 and/or system 100 may also determine that the span 1418 of UAV 1300 in vertical orientation 1422 will fit within the relatively narrow flight channel.

More generally, controller 112 and/or other elements of system 100 may be configured to determine a flight path of UAV 1300 transits a flight channel disposed over the environmental surface and including a channel width (e.g., a horizontal channel width) narrower than an operational width of UAV 130. In such embodiments, maneuvering UAV 1300 to place cylindrical rolling guard 1302 of airframe assembly 500 in contact with the at least portion of the environmental surface may include controlling propulsion system 124 to maneuver UAV 1300 from a substantially horizontal orientation to the rolling orientation determined in block 1502, and at a designated imaged portion of the environmental surface. In related embodiments, determining the flight path of UAV 1300 transits the flight channel may include receiving image data corresponding to the environmental surface, the flight path, and/or the flight channel and determining the channel width is narrower than the operational width of UAV 1300 based, at least in part, on the received image data, as described herein. In alternative embodiments, such image data may be supplemented or supplanted with sonar data and/or other sensor data corresponding to environmental conditions within the operating environment of UAV 1300.

At block 1506, UAV 1300 is rolled along an environmental surface at the rolling orientation determined in block 1502. For example, controller 112, base station 130, and/or other elements of system 100 may be configured to roll airframe assembly 500 of UAV 1300 along environmental surface 1402 at approximately the rolling orientation determined in block 1502 while cylindrical rolling guard 1302 is in contact with environmental surface 1402. In various embodiments, rolling airframe assembly 500 of UAV 1300 along environmental surface 1402 at approximately the rolling orientation determined in block 1502 may include controlling propulsion system 124 to roll airframe assembly 500 along environmental surface 1402 through flight channel 1410.

In some embodiments, propulsion system 124 may include a plurality of rotors 604, and UAV 1300 may independently control each rotor 604 to generate a thrust for each rotor 604 and adjust a torque for each rotor 604, which in aggregate generates a torque differential across UAV 1300 sufficient to roll UAV 1300 along environmental surface 1402 while cylindrical rolling guard 1302 is in physical contact with environmental surface 1402. In an embodiment where UAV 1300 has four rotors, the torque differential may be between a first aggregate torque corresponding to a first diagonal opposing pair of the four rotors, such as rotors 604*b* and 604*d* shown in FIG. 14B, and a second aggregate torque corresponding to a second diagonal opposing pair of the four rotors, such as rotors 604*a* and 604*c* shown in FIG. 14B.

In some embodiments, UAV 1300 may adjust a heading of UAV 1300 while operating in a rolling orientation 1422 by controlling propulsion system 124 of UAV 1300. For example, to adjust a heading of UAV 1300, UAV 1300 may generate a thrust differential across UAV 1300 between a first aggregate thrust corresponding to a first adjacent pair of rotors, such as rotors 604*a* and 604*d* shown in FIG. 14A, and a second aggregate thrust corresponding to a second adjacent pair of rotors, such as rotors 604*b* and 604*c* shown in FIG. 14A. By adjusting the roll heading of UAV 1300, UAV 1300 may be able to steer in a desired direction 1406 while rolling 1404.

Figure 16:
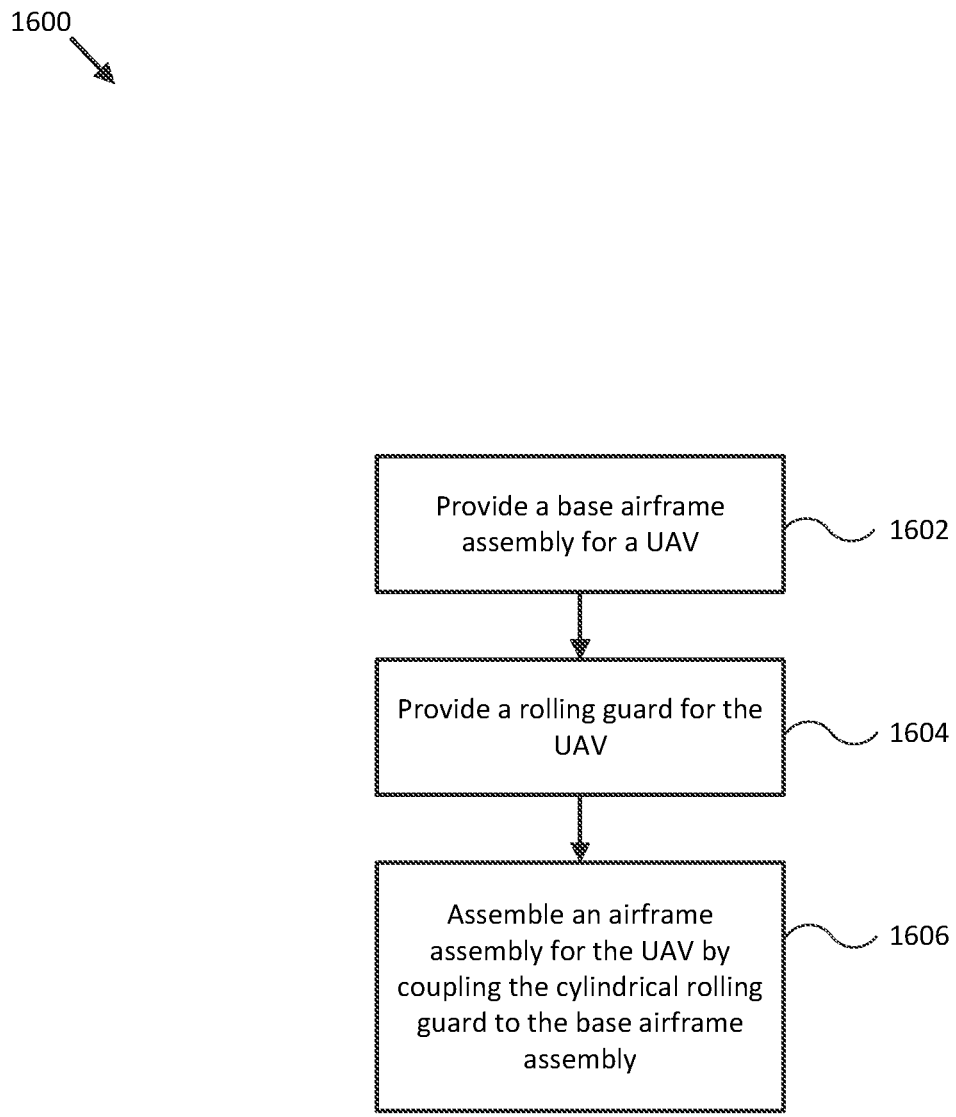
FIG. 16 illustrates a flow diagram of a process for assembling a UAV in accordance with one or more embodiments of the disclosure.

FIG. 16 illustrates a flow diagram of a process 1600 for assembling UAV 1300 in accordance with various embodiments of the disclosure. It should be appreciated that any step, sub-step, sub-process, or block of process 1600 may be performed in an order or arrangement different from the embodiments illustrated by FIG. 16. For example, in other embodiments, one or more blocks may be omitted from or added to the process 1600.

At block 1602, a base airframe assembly for UAV 1300 is provided. For example, base airframe 500 as shown in FIG. 5 may be assembled according to process 800 of FIG. 8. At block 1604, a rolling guard for UAV 1300 is provided. For example, cylindrical rolling guard 1302 may be injection molded, machined, stamped, additively manufactured, and/or otherwise formed out of plastic, metal, polymer, and/or combinations of these, so as to be permanently or removably attached to base airframe assembly provided in block 1602. At block 1606, integrated airframe assembly 500 of FIG. 13A is assembled by permanently or detachably coupling rolling guard 1302 provided in block 1604 to base airframe assembly 500 (of FIG. 5) provided in block 1602. In alternative embodiments, cylindrical rolling guard 1302 may be formed integrally with one or more elements of base airframe assembly 500, for example, and the entirely of components may be assembled together using a process similar to process 800 of FIG. 8.

For example, in reference to FIG. 13A, rolling guard 1302 may be formed with an inner surface 1306 configured to complement an exterior surface 1308 of airframe assembly 500 of UAV 1300 to facilitate attaching rolling guard 1302 to airframe assembly 500 according to an embodiment. In some cases, rolling guard 1302 may be implemented with a concave cross-section to allow the inner surface 1306 to complement an exterior surface 1308 of airframe assembly 500 such that rolling guard 1302 may be able to "snap" onto the airframe assembly and be securely held in place for rolling operations. As another example, in reference to FIG. 13B, rolling guard 1302 may be attached to airframe assembly 500 of UAV 1300 at ends of arms 1310. In some embodiments, arms 1310 may extend from mount supports 312 as a unitary component of mount supports 312. In other embodiments, arms 1310 may be part of rolling guard 1302 and extend from inner surface 1306 of rolling guard 1302 to allow rolling guard 1302 to removably attach to airframe assembly 500 via a physical connection between mount supports 312 and arms 1310. Arms 1310 may extend with sufficient clearance to allow for rotors 604 to freely rotate without contacting rolling guard 1302. In embodiments where arms 1310 extend from mount supports 312, rolling guard 1302 may be attached to arms 1310 using fastening devices such as attachment brackets, clamps, clips, snap fasteners, bolts, and other fasteners. Similarly, in embodiments where arms 1310 extend from the inner surface 1306 of rolling guard 1302, arms 1310 may be attached to mount supports 312 using fastening devices to attach or couple rolling guard 1302 to airframe assembly 500, as described herein.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. An unmanned aerial vehicle (UAV) comprising:
an airframe assembly configured to support and/or protect a propulsion system for the UAV; and
a skid assembly comprising a skid member coupled to and extending from a bottom surface of the airframe assembly, wherein:
the skid member is configured to contact and/or slide along a solid and/or liquid surface while the propulsion system is energized and the UAV is in motion, and
the skid assembly is configured to allow the airframe assembly to skid along the solid and/or liquid surface at a specified approximate UAV skid height set, at least in part, by a height of the skid member;
wherein the UAV comprises a plurality of surface contact regions for physically contacting the solid and/or liquid surface to support the UAV before takeoff or after landing; and
the UAV further comprises a logic device configured to control the propulsion system to allow the airframe assembly to skid along the solid and/or liquid surface when surface contact is removed at one or more of the surface contact regions.

2. An unmanned aerial vehicle (UAV) comprising:
an airframe assembly configured to support and/or protect a propulsion system for the UAV; and
a skid assembly comprising a skid member coupled to and extending from a bottom surface of the airframe assembly, wherein:
the skid member is configured to contact and/or slide along a solid and/or liquid surface while the propulsion system is energized and the UAV is in motion,
the skid assembly is configured to allow the airframe assembly to skid along the solid and/or liquid surface at a specified approximate UAV skid height set, at least in part, by a height of the skid member;
the skid member is fixed relative to the bottom surface of the airframe assembly;
the skid member is at least partially hollow;
wherein the airframe assembly comprises:
a cylindrical rolling guard fixed relative to a rotor plane of the UAV and configured to allow the UAV to roll along an environmental surface in contact with the cylindrical rolling guard; and a logic device configured to communicate with the propulsion system for the UAV, wherein the logic device is configured to:
   determine a rolling orientation for the UAV corresponding to at least a portion of the environmental surface;
   maneuver the UAV to place the cylindrical rolling guard of the airframe assembly in contact with the at least portion of the environmental surface; and
   roll the airframe assembly of the UAV along the environmental surface at approximately the determined rolling orientation while the cylindrical rolling guard is in contact with the environmental surface.

3. The UAV of claim 2, further comprising an imaging system coupled to and/or within the airframe assembly of the UAV and configured to capture image data corresponding to the at least portion of the environmental surface, wherein:
the skid assembly comprises a surface sensor configured to sample the environmental surface as the UAV skids along the surface and provide corresponding surface sample data to the logic device; and
the logic device is configured to:
   receive the image data corresponding to the at least portion of the environmental surface from the imaging system;
   determine one or more rolling characteristics of the at least portion of the environmental surface based, at least in part, on the received image data;
   determine the rolling orientation for the UAV based, at least in part, on the determined one or more rolling characteristics of the at least portion of the environmental surface; and
   determine a presence of one or more selected chemical, biological, radioactive, nuclear, and/or explosive substances on or in the surface based, at least in part, on the surface sample data.

4. The UAV of claim 2, wherein:
the cylindrical rolling guard of the airframe assembly comprises one or more perforations aligned with corresponding one or more imaging modules of an imaging system coupled to and/or within the airframe assembly; and
the one or more perforations are positioned and/or sized within the cylindrical rolling guard to provide fields of view for the corresponding one or more imaging modules that overlap with at least the at least portion of the environmental surface, wherein the one or more imaging modules comprises one or more stereoscopic cameras.

5. The UAV of claim 2, wherein:
the cylindrical rolling guard comprises a concave outer surface and an inner surface configured to removably attach to at least portions of the airframe assembly;
the cylindrical rolling guard comprises a non-slip texture disposed at least partially along the concave outer surface and configured to provide lateral and/or longitudinal traction between the cylindrical rolling guard and the environmental surface as the UAV rolls along the environmental surface; and
the logic device is configured to:
   selectively skid the UAV based, at least in part, on a desired propulsion power efficiency for the UAV associated with a time ratio of skidding motion of the UAV to flight of the UAV within a designated monitoring area.

6. An unmanned aircraft system (UAS) comprising the UAV of claim 2, wherein:
the UAV further comprises:
   a communications module configured to form a communication link between the UAV and a base station of the UAS; and
   an imaging system coupled to and/or within the airframe assembly of the UAV and configured to capture image data corresponding to the at least portion of the environmental surface; and
the determining the rolling orientation for the UAV comprises:
   receiving the image data corresponding to the at least portion of the environmental surface from the imaging system; and
   providing the image data to the base station via the communication link prior to the receiving the rolling orientation from the bases station; and
   receiving the rolling orientation from the bases station of the UAS via the communication link between the UAV and the base station.

7. The UAV of claim 1, wherein the skid assembly comprises:
a skid member recess formed within the airframe assembly, wherein the skid member is at least partially disposed within the skid assembly recess; and
a spring hinge coupled between the skid member and the airframe assembly and configured to bias the skid member out of the skid member recess and up to a hinge stop of the skid assembly,
wherein the skid member is configured to at least partially depress into the skid member recess as the UAV skids along the solid and/or liquid surface.

8. The UAV of claim 1, wherein:
the airframe assembly comprises:
   a top airframe assembly comprising a top foam airframe core at least partially enclosed within a relatively rigid top airframe shell; and
   a bottom airframe assembly comprising a bottom foam airframe core at least partially enclosed within a relatively rigid bottom airframe shell, wherein the skid member is coupled to and extends from a rear portion of the bottom surface of the bottom airframe shell; and
the UAV further comprises:
   a cylindrical rolling guard fixed relative to a rotor plane of the UAV and configured to allow the UAV to roll along an environmental surface in contact with the cylindrical rolling guard; and
the logic device is configured to:
   determine a flight path of the UAV transits a flight channel disposed over the environmental surface and comprising a horizontal channel width narrower than an operational width of the UAV;
   maneuver the UAV to place a cylindrical rolling guard of the airframe assembly in contact with the at least portion of the environmental surface by controlling the propulsion system to maneuver the UAV from a substantially horizontal orientation to the determined rolling orientation at the at least portion of the environmental surface; and
   roll the airframe assembly of the UAV along the environmental surface at approximately the determined rolling orientation by controlling the propulsion system to roll the airframe assembly along the environmental surface through the flight channel;

the skid assembly comprises a first skid assembly and the skid member comprises a first skid member;

the UAV further comprises at least a second skid assembly comprising a second skid member coupled to and extending from a top or side surface of the airframe assembly;

the top airframe assembly and bottom airframe assembly are coupled to each other and form a plurality of rotor ducts;

the first and/or second skid assembly is disposed at least partially between two adjacent ones of the plurality of rotor ducts; and the UAV further comprises an imaging system coupled to and/or within the airframe assembly of the UAV and configured to capture image data corresponding to the environmental surface, the flight path, and/or the flight channel, wherein the determining the flight path of the UAV comprises:

receiving the image data corresponding to the environmental surface, the flight path, and/or the flight channel; and determining the horizontal channel width is narrower than the operational width of the UAV based, at least in part, on the received image data;

the propulsion system comprises a plurality of rotors coupled to and/or within the airframe assembly and/or coupled to the UAV according to the rotor plane of the UAV; and the rolling the airframe assembly of the UAV along the environmental surface comprises controlling each rotor to generate a thrust for each rotor and to adjust a torque for each rotor that, in the aggregate, orients the UAV approximately at the determined rolling orientation and generates a torque differential across the UAV sufficient to roll the airframe assembly of the UAV along the environmental surface, while the cylindrical rolling guard is in contact with the environmental surface.

9. The UAV of claim 8, wherein:

the plurality of rotors comprises four rotors disposed at least pairwise symmetrically about a center of the UAV; and the torque differential across the UAV is generated between a first aggregate torque associated with a first diagonal opposing pair of the four rotors and a second aggregate torque associated with a second diagonal opposing pair of the four rotors different from the first diagonal opposing pair of the four rotors;

the plurality of rotors comprises at least four rotors; and the rolling the airframe assembly of the UAV along the environmental surface comprises generating a thrust differential across the UAV between a first aggregate thrust associated with a first adjacent pair of rotors and a second aggregate thrust associated with a second adjacent pair of rotors different from the first adjacent pair of rotors, wherein the thrust differential is configured to adjust a roll heading of the UAV while the airframe assembly rolls along the environmental surface.

10. The UAV of claim 1, wherein:

the logic device is coupled within the airframe assembly and configured to:

control the propulsion system of the UAV to navigate the UAV within a designated monitoring area comprising the solid and/or liquid surface while selectively skidding the airframe assembly along the solid and/or liquid surface at the specified approximate UAV skid height by controlling physical contact between the skid member and the solid and/or liquid surface;

wherein the UAV further comprises an imaging system coupled to and/or within the airframe assembly;

wherein one or more of the surface contact regions are provided by one or more landing feet disposed on the bottom surface of the airframe assembly; and the logic device is configured to control the propulsion system of the UAV to maintain a minimum spatial separation between the one or more landing feet and the solid and/or liquid surface while the skid member is in physical contact with the solid and/or liquid surface.

11. The UAV of claim 1, further comprising:

one or more environmental sensors coupled to or within the airframe assembly;

wherein the logic device is coupled within the airframe assembly and configured to communicate wirelessly with a base station associated with the UAV, wherein the logic device is configured to:

control the propulsion system of the UAV to navigate the UAV within a designated monitoring area while substantially maintaining contact between the skid member and the solid and/or liquid surface and skidding the airframe assembly along the solid and/or liquid surface at the specified approximate UAV skid height;

detect a disturbance within the designated monitoring area based, at least in part, on environmental sensor data provided by at least one of the one or more environmental sensors;

generate a disturbance notification based, at least in part, on a portion of the environmental sensor data associated with the detected disturbance; and transmit the generated disturbance notification to the base station, wherein:

the one or more environmental sensors comprises a visible spectrum imaging module and/or a thermal imaging module; and the detecting the disturbance in the environment is based, at least in part, on visible spectrum image data and/or thermal image data provided by the visible spectrum imaging module and/or the thermal imaging module;

wherein the logic device is configured to:

control the propulsion system and/or the one or more environmental sensors of the UAV to maintain a monitoring proximity to the detected disturbance and/or monitor a position or other characteristic of the disturbance within the designated monitoring area over a period of time and/or as the disturbance travels through the designated monitoring area, wherein the controlling the propulsion system of the UAV to navigate the UAV within the designated monitoring area comprises navigating the UAV to a surveillance location within the designated monitoring area.

12. A method comprising:

controlling a propulsion system of an unmanned aerial vehicle (UAV) to navigate the UAV within a designated monitoring area comprising a solid and/or liquid surface, wherein the UAV comprises an airframe assembly configured to support and/or protect the propulsion system and a skid assembly comprising a skid member coupled to and extending from a bottom surface of the airframe assembly, and wherein the skid member is configured to contact and/or slide along a solid and/or liquid surface while the propulsion system is energized and the UAV is in motion; and selectively skidding the airframe assembly along the solid and/or liquid surface at a specified approximate UAV skid height set, at least in part, by a height of the skid member, by controlling physical contact between the skid member and the solid and/or liquid surface;

wherein the airframe assembly comprises landing feet disposed on the bottom surface of the airframe assembly; and the method further comprises controlling the propulsion system of the UAV to maintain a minimum spatial separation between the landing feet and the solid and/or liquid surface while the skid member is in physical contact with the solid and/or liquid surface.

13. The method of claim 12, further comprising:
determining a rolling orientation for an unmanned aerial vehicle (UAV) corresponding to at least a portion of an environmental surface in view of the UAV, wherein:
the skid member is fixed relative to the bottom surface of the airframe assembly and/or the skid member is at least partially hollow; and
the airframe assembly comprises a cylindrical rolling guard fixed relative to a rotor plane of the UAV and configured to allow the UAV to roll along the environmental surface while the cylindrical rolling guard is in contact with the environmental surface;
maneuvering the UAV to place the cylindrical rolling guard of the airframe assembly in contact with the at least portion of the environmental surface; and
rolling the airframe assembly of the UAV along the environmental surface at approximately the determined rolling orientation while the cylindrical rolling guard is in contact with the environmental surface.

14. The method of claim 13, wherein:
the cylindrical rolling guard of the airframe assembly comprises one or more perforations aligned with corresponding one or more imaging modules of an imaging system coupled to and/or within the airframe assembly; and
the one or more perforations are positioned and/or sized within the cylindrical rolling guard to provide fields of view for the corresponding one or more imaging modules that overlap with at least the at least portion of the environmental surface.

15. The method of claim 13, wherein:
the cylindrical rolling guard comprises a concave outer surface and an inner surface configured to removably attach to at least portions of the airframe assembly; and
the cylindrical rolling guard comprises a non-slip texture disposed at least partially along the concave outer surface and configured to provide lateral and/or longitudinal traction between the cylindrical rolling guard and the environmental surface as the UAV rolls along the environmental surface.

16. The method of claim 13, further comprising:
receiving image data corresponding to the at least portion of the environmental surface from an imaging system coupled to and/or within the airframe assembly of the UAV;
determining one or more rolling characteristics of the at least portion of the environmental surface based, at least in part, on the received image data; and
determining the rolling orientation for the UAV based, at least in part, on the determined one or more rolling characteristics of the at least portion of the environmental surface, wherein the skid assembly comprises:
a skid member recess formed within the airframe assembly, wherein the skid member is at least partially disposed within the skid assembly recess; and
a spring hinge coupled between the skid member and the airframe assembly and configured to bias the skid member out of the skid member recess and up to a hinge stop of the skid assembly, wherein the skid member is configured to at least partially depress into the skid member recess as the UAV skids along the solid and/or liquid surface.

17. The method of claim 13, further comprising determining a flight path of the UAV transits a flight channel disposed over the environmental surface and comprising a horizontal channel width narrower than an operational width of the UAV, wherein:
the maneuvering the UAV to place the cylindrical rolling guard of the airframe assembly in contact with the at least portion of the environmental surface comprises controlling the propulsion system to maneuver the UAV from a substantially horizontal orientation to the determined rolling orientation at the at least portion of the environmental surface;
the rolling the airframe assembly of the UAV along the environmental surface at approximately the determined rolling orientation comprises controlling the propulsion system to roll the airframe assembly along the environmental surface through the flight channel;
the airframe assembly comprises:
a top airframe assembly comprising a top foam airframe core at least partially enclosed within a relatively rigid top airframe shell; and
a bottom airframe assembly comprising a bottom foam airframe core at least partially enclosed within a relatively rigid bottom airframe shell, wherein the skid member is coupled to and extends from a rear portion of the bottom surface of the bottom airframe shell.

18. The method of claim 13, wherein:
the airframe assembly comprises a top airframe assembly and a bottom airframe assembly that are coupled to each other to form a plurality of rotor ducts;
the skid assembly is disposed between two adjacent ones of the plurality of rotor ducts;
the propulsion system comprises a plurality of rotors coupled to and/or within the airframe assembly and/or coupled to the UAV according to the rotor plane of the UAV; and
the rolling the airframe assembly of the UAV along the environmental surface comprises controlling each rotor to generate a thrust for each rotor and to adjust a torque for each rotor that, in the aggregate, orients the UAV approximately at the determined rolling orientation and generates a torque differential across the UAV sufficient to roll the airframe assembly of the UAV along the environmental surface, while the cylindrical rolling guard is in contact with the environmental surface; wherein:
the plurality of rotors comprises at least four rotors disposed at least pairwise symmetrically about a center of the UAV;
the torque differential across the UAV is generated between a first aggregate torque associated with a first diagonal opposing pair of the four rotors and a second aggregate torque associated with a second diagonal opposing pair of the four rotors different from the first diagonal opposing pair of the four rotors;

the rolling the airframe assembly of the UAV along the environmental surface comprises generating a thrust differential across the UAV between a first aggregate thrust associated with a first adjacent pair of rotors and a second aggregate thrust associated with a second adjacent pair of rotors different from the first adjacent pair of rotors, wherein the thrust differential is configured to adjust a roll heading of the UAV while the airframe assembly rolls along the environmental surface.

19. The method of claim 12, further comprising determining the flight path of the UAV, wherein the determining the flight path comprises:

receiving image data from an imaging system coupled to and/or within the airframe assembly corresponding to the surface, a flight path, and/or a flight channel;

determining a horizontal channel width is narrower than an operational width of the UAV based, at least in part, on the received image data; and determining a presence of one or more substances on or in the surface based, at least in part, on a surface sample data, wherein the skid assembly comprises a surface sensor configured to sample the surface as the UAV skids along the surface and provide corresponding surface sample data;

wherein the selectively skidding the UAV is based, at least in part, on a desired propulsion power efficiency for the UAV associated with a time ratio of skidding motion of the UAV to flight of the UAV within a designated monitoring area.

20. The method of claim 12, wherein:

the UAV comprises one or more environmental sensors coupled to or within the airframe assembly;

the selectively skidding the airframe assembly comprises substantially maintaining contact between the skid member and the solid and/or liquid surface and skidding the airframe assembly along the solid and/or liquid surface at the specified approximate UAV skid height; and the method further comprises:

detecting a disturbance within a designated monitoring area based, at least in part, on environmental sensor data provided by at least one of the one or more environmental sensors;

generating a disturbance notification based, at least in part, on a portion of the environmental sensor data associated with the detected disturbance;

transmitting the generated disturbance notification to a base station associated with the UAV; and controlling the propulsion system and/or the one or more environmental sensors of the UAV to maintain a monitoring proximity to the detected disturbance and/or monitor a position or other characteristic of the disturbance within the designated monitoring area over a period of time and/or as the disturbance travels through the designated monitoring area;

wherein:

the one or more environmental sensors comprises a visible spectrum imaging module and/or a thermal imaging module;

the detecting the disturbance in the environment is based, at least in part, on visible spectrum image data and/or thermal image data provided by the visible spectrum imaging module and/or the thermal imaging module; and the controlling the propulsion system of the UAV to navigate the UAV within the designated monitoring area comprises navigating the UAV to a surveillance location within the designated monitoring area.

\* \* \* \* \*